US012739510B2

(12) United States Patent
Ito

(10) Patent No.: US 12,739,510 B2
(45) Date of Patent: Sep. 15, 2026

(54) IMAGE PROCESSING APPARATUS AND IMAGE PROCESSING METHOD

(71) Applicant: SONY GROUP CORPORATION, Tokyo (JP)

(72) Inventor: Takashi Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 18 days.

(21) Appl. No.: 18/848,932

(22) PCT Filed: Feb. 24, 2023

(86) PCT No.: PCT/JP2023/006809
§ 371 (c)(1),
(2) Date: Sep. 20, 2024

(87) PCT Pub. No.: WO2023/189081
PCT Pub. Date: Oct. 5, 2023

(65) Prior Publication Data

US 2025/0211857 A1 Jun. 26, 2025

(30) Foreign Application Priority Data

Mar. 31, 2022 (JP) ................................ 2022-059634

(51) Int. Cl.
*H04N 23/69* (2023.01)
*G06T 7/20* (2017.01)
*H04N 23/695* (2023.01)

(52) U.S. Cl.
CPC ............... *H04N 23/69* (2023.01); *G06T 7/20* (2013.01); *H04N 23/695* (2023.01); *G06T 2207/20132* (2013.01)

(58) Field of Classification Search
CPC ........ H04N 23/69; H04N 23/695; H04N 7/18; H04N 23/60; G06T 7/20;
(Continued)

(56) References Cited

U.S. PATENT DOCUMENTS 8,085,302 B2 * 12/2011 Zhang .................... H04N 7/188 348/169
2018/0035076 A1 * 2/2018 Arai ...................... H04N 5/144
(Continued)

FOREIGN PATENT DOCUMENTS

JP 2016-163311 A 9/2016
JP 2018-057020 A 4/2018
(Continued)

OTHER PUBLICATIONS

International Search Report and Written Opinion of PCT Application No. PCT/JP2023/006809, issued on May 9, 2023, 09 pages of ISRWO.

*Primary Examiner* — Nhan T Tran
(74) *Attorney, Agent, or Firm* — CHIP LAW GROUP

(57) ABSTRACT

Provided are an apparatus and a method for calculating an imaging ratio for clipping image generation that is an index value for more reliably executing clipping image generation processing including a notable subject from a captured image of a PTZ camera. In a configuration in which an image clipping region including the notable subject is calculated from the captured image of the PTZ camera, and the image of the calculated region is clipped to generate the clipping image, the imaging ratio for clipping image generation is calculated as an index value for executing the clipping image generation processing including the notable subject. Furthermore, a zoom parameter for capturing an image according to the imaging region size of the camera calculated from the imaging ratio for clipping image generation is calculated, and the PTZ camera is caused to execute image capturing to which the calculated parameter is applied.

19 Claims, 29 Drawing Sheets

(58) Field of Classification Search
CPC ........... G06T 2207/20132; G06T 7/246; G06T 2207/30232; G06T 7/10; G03B 15/00
See application file for complete search history.

(56) References Cited

U.S. PATENT DOCUMENTS

2022/0191400 A1* 6/2022 Wada ................... H04N 23/683
2024/0112299 A1* 4/2024 Wu ........................... G06T 3/04

FOREIGN PATENT DOCUMENTS

WO 2016/167016 A1 10/2016
WO 2018/155159 A1 8/2018

* cited by examiner

S05 CAMERA DRIVE
10 PTZ CAMERA
S04 CAMERA DRIVE INSTRUCTION TRANSMISSION
S02 CAPTURED IMAGE TRANSMISSION
30 EXTERNAL APPARATUS (IMAGE ANALYSIS APPARATUS)
S01 IMAGE CAPTURING
21 NOTABLE SUBJECT (FOR EXAMPLE, FOLLOW-UP TARGET)
S03 IMAGE CLIPPING
20 CAPTURED IMAGE
23 CLIPPING REGION
21 NOTABLE SUBJECT (FOR EXAMPLE, FOLLOW-UP TARGET)
22 IMAGING REGION

FIG. 3

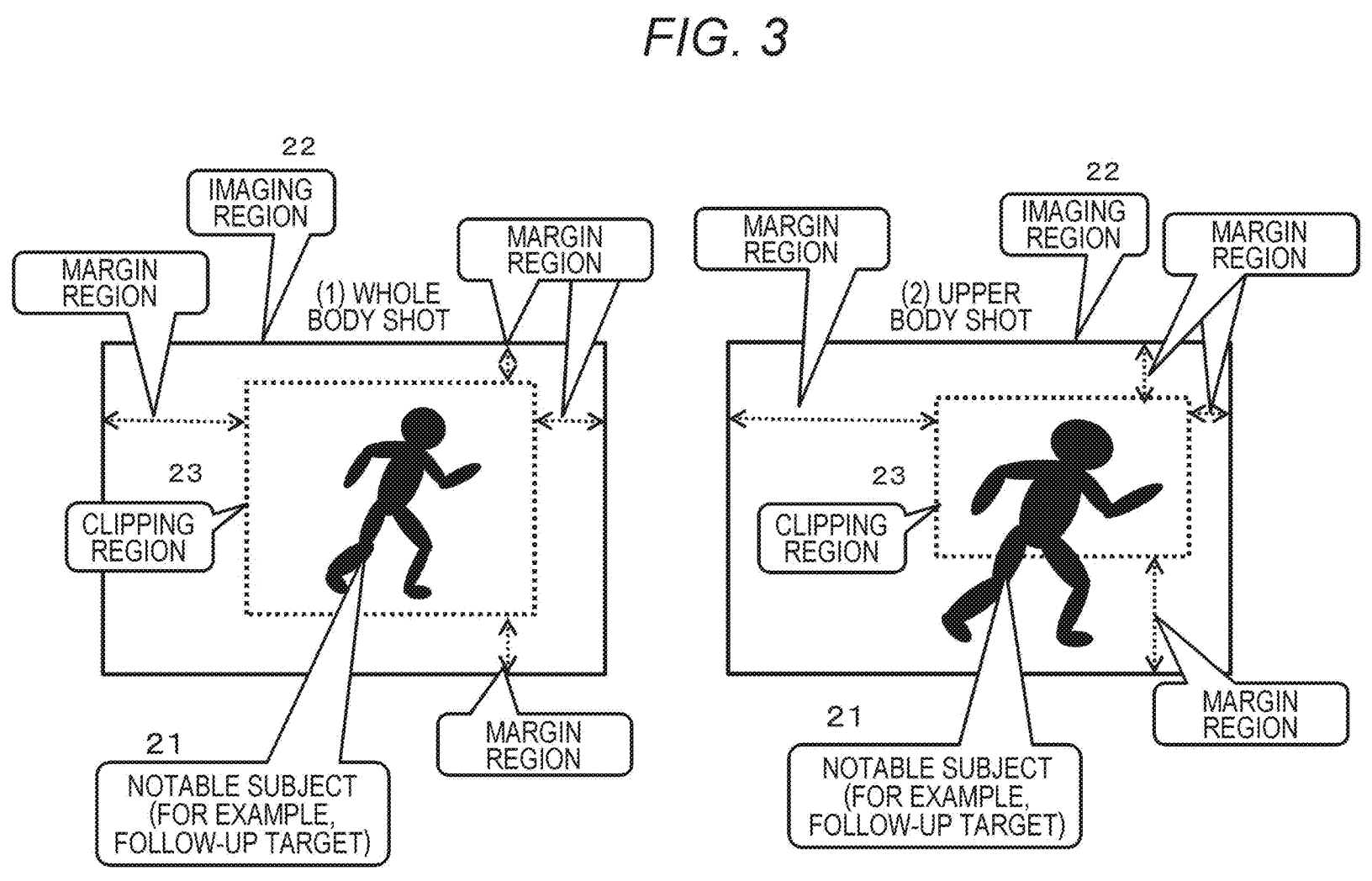

(1) WHOLE BODY SHOT

22
IMAGING REGION
MARGIN REGION
MARGIN REGION
MARGIN REGION
23
CLIPPING REGION
21
NOTABLE SUBJECT (FOR EXAMPLE, FOLLOW-UP TARGET)

(2) UPPER BODY SHOT

22
IMAGING REGION
MARGIN REGION
MARGIN REGION
MARGIN REGION
23
CLIPPING REGION
21
NOTABLE SUBJECT (FOR EXAMPLE, FOLLOW-UP TARGET)

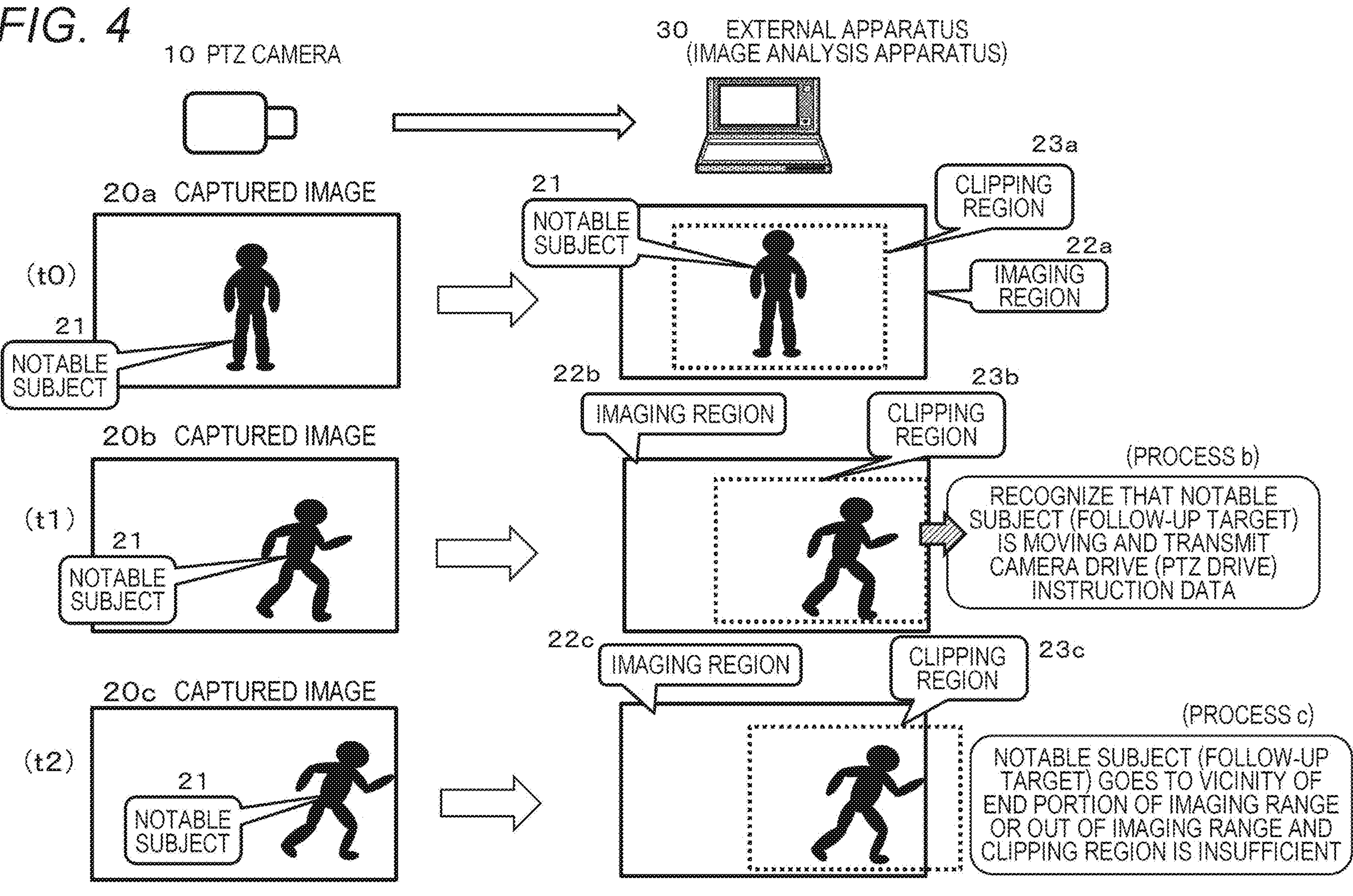
FIG. 4
10 PTZ CAMERA
30 EXTERNAL APPARATUS (IMAGE ANALYSIS APPARATUS)
(t0)
20a CAPTURED IMAGE
21 NOTABLE SUBJECT
21 NOTABLE SUBJECT
23a CLIPPING REGION
22a IMAGING REGION
(t1)
20b CAPTURED IMAGE
21 NOTABLE SUBJECT
22b IMAGING REGION
23b CLIPPING REGION
(PROCESS b)
RECOGNIZE THAT NOTABLE SUBJECT (FOLLOW-UP TARGET) IS MOVING AND TRANSMIT CAMERA DRIVE (PTZ DRIVE) INSTRUCTION DATA
(t2)
20c CAPTURED IMAGE
21 NOTABLE SUBJECT
22c IMAGING REGION
23c CLIPPING REGION
(PROCESS c)
NOTABLE SUBJECT (FOLLOW-UP TARGET) GOES TO VICINITY OF END PORTION OF IMAGING RANGE OR OUT OF IMAGING RANGE AND CLIPPING REGION IS INSUFFICIENT

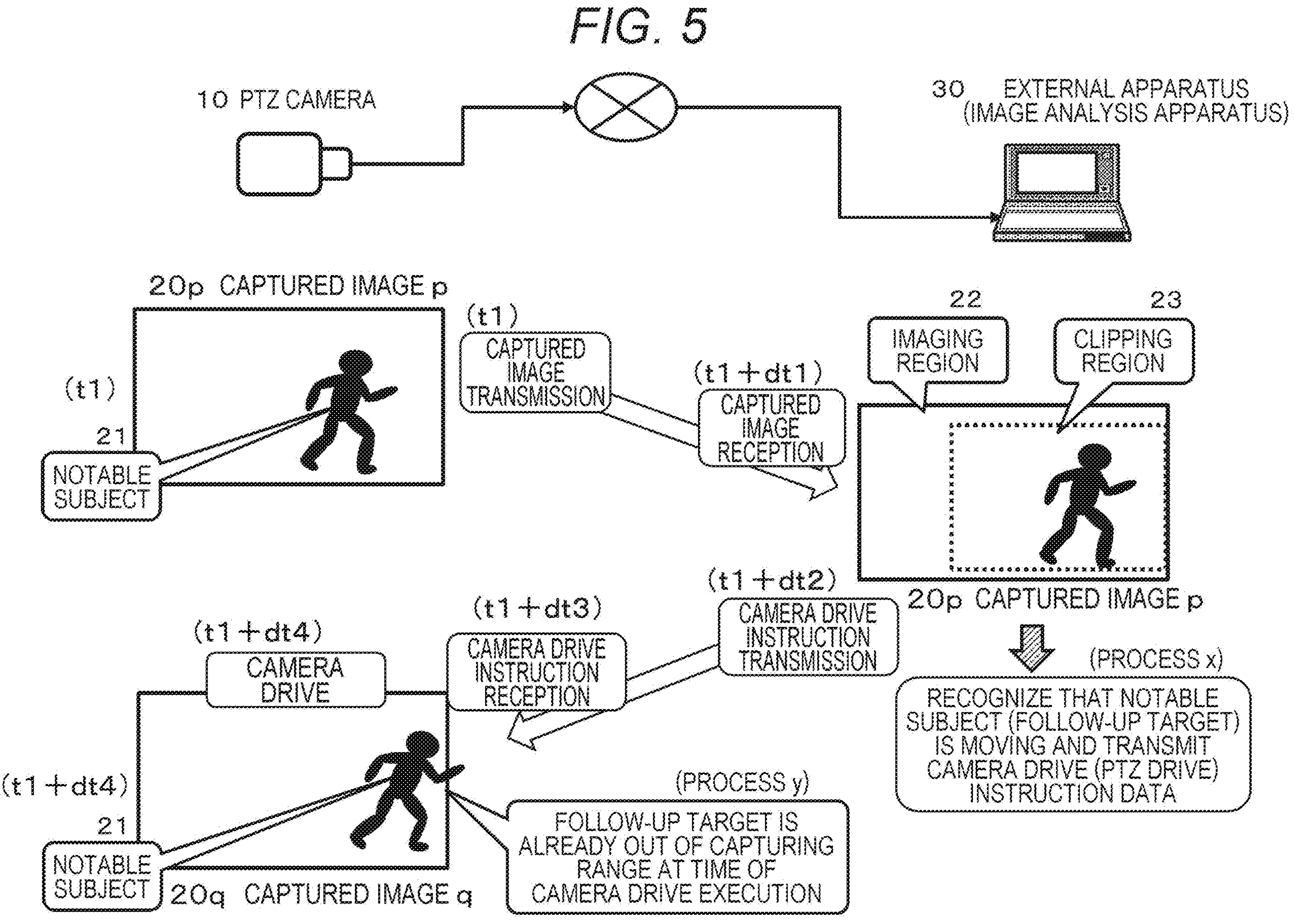
FIG. 5
10 PTZ CAMERA
30 EXTERNAL APPARATUS (IMAGE ANALYSIS APPARATUS)
20p CAPTURED IMAGE p
(t1)
21
NOTABLE SUBJECT
(t1)
CAPTURED IMAGE TRANSMISSION
(t1 + dt1)
CAPTURED IMAGE RECEPTION
22
IMAGING REGION
23
CLIPPING REGION
20p CAPTURED IMAGE p
(PROCESS x)
RECOGNIZE THAT NOTABLE SUBJECT (FOLLOW-UP TARGET) IS MOVING AND TRANSMIT CAMERA DRIVE (PTZ DRIVE) INSTRUCTION DATA
(t1 + dt2)
CAMERA DRIVE INSTRUCTION TRANSMISSION
(t1 + dt3)
CAMERA DRIVE INSTRUCTION RECEPTION
(t1 + dt4)
CAMERA DRIVE
(t1 + dt4)
21
NOTABLE SUBJECT
20q CAPTURED IMAGE q
(PROCESS y)
FOLLOW-UP TARGET IS ALREADY OUT OF CAPTURING RANGE AT TIME OF CAMERA DRIVE EXECUTION

FIG. 6

(a) BEFORE CHANGE IN IMAGING RATIO (b) AFTER CHANGE IN IMAGING RATIO

Fig. 7A

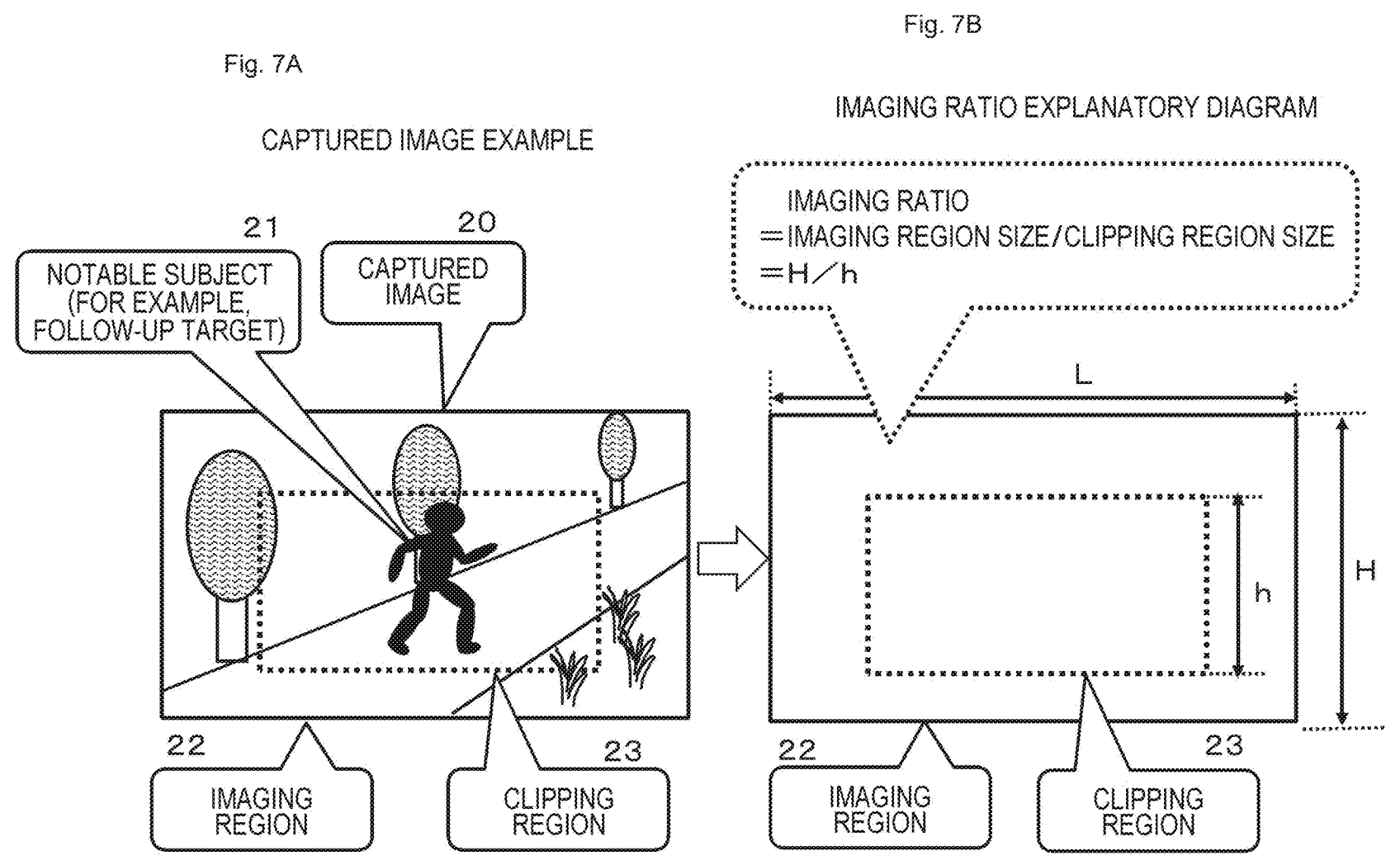

CAPTURED IMAGE EXAMPLE

20 CAPTURED IMAGE

21 NOTABLE SUBJECT (FOR EXAMPLE, FOLLOW-UP TARGET)

22 IMAGING REGION

23 CLIPPING REGION

Fig. 7B

IMAGING RATIO EXPLANATORY DIAGRAM

IMAGING RATIO
=IMAGING REGION SIZE/CLIPPING REGION SIZE
=H/h

L

H h

22 IMAGING REGION

23 CLIPPING REGION

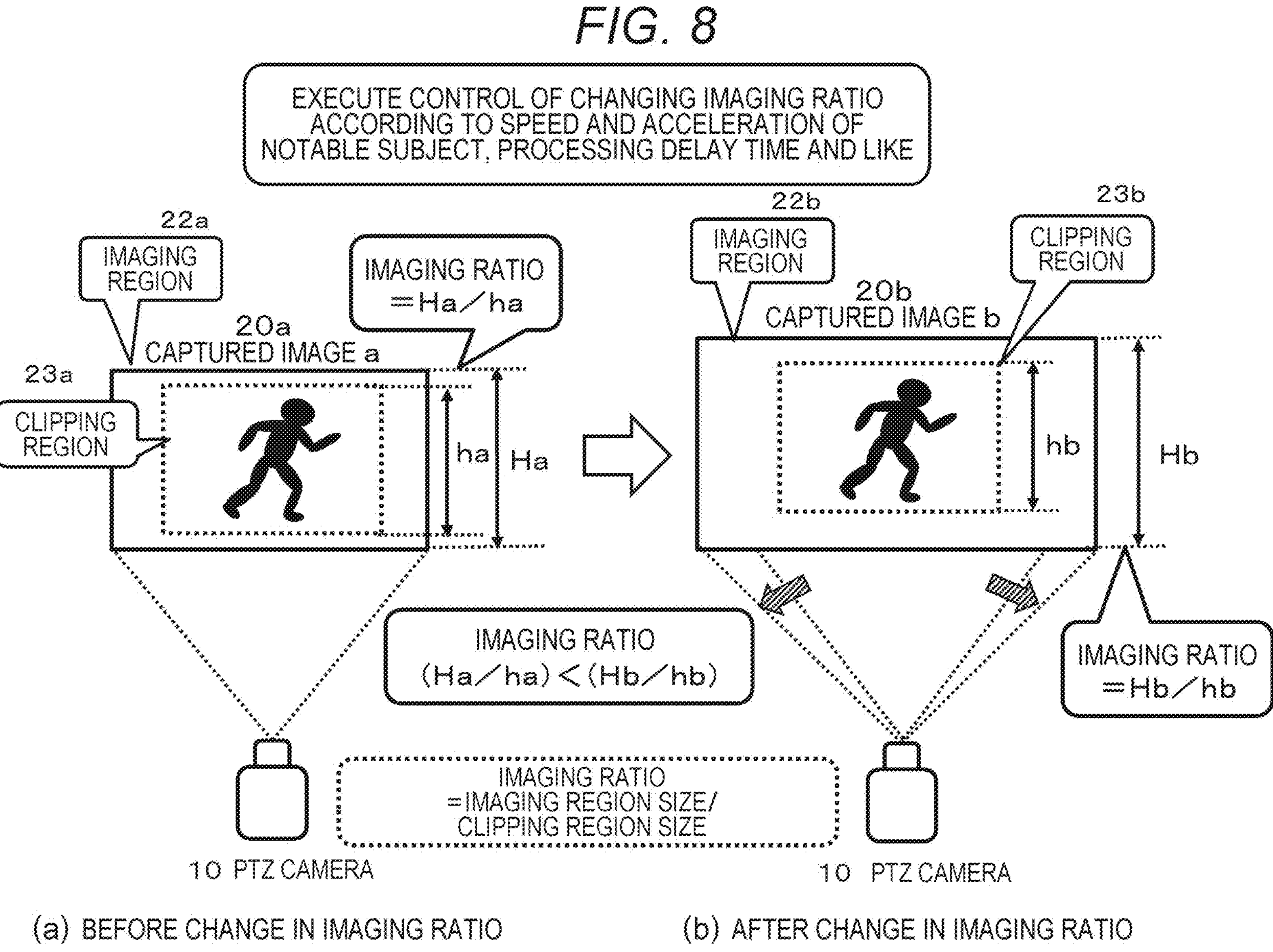
FIG. 8
EXECUTE CONTROL OF CHANGING IMAGING RATIO ACCORDING TO SPEED AND ACCELERATION OF NOTABLE SUBJECT, PROCESSING DELAY TIME AND LIKE
22a
IMAGING REGION
20a
CAPTURED IMAGE a
23a
CLIPPING REGION
IMAGING RATIO =Ha/ha
ha
Ha
22b
IMAGING REGION
20b
CAPTURED IMAGE b
23b
CLIPPING REGION
hb
Hb
IMAGING RATIO (Ha/ha)<(Hb/hb)
IMAGING RATIO =Hb/hb
IMAGING RATIO =IMAGING REGION SIZE/ CLIPPING REGION SIZE
10 PTZ CAMERA
10 PTZ CAMERA
(a) BEFORE CHANGE IN IMAGING RATIO
(b) AFTER CHANGE IN IMAGING RATIO

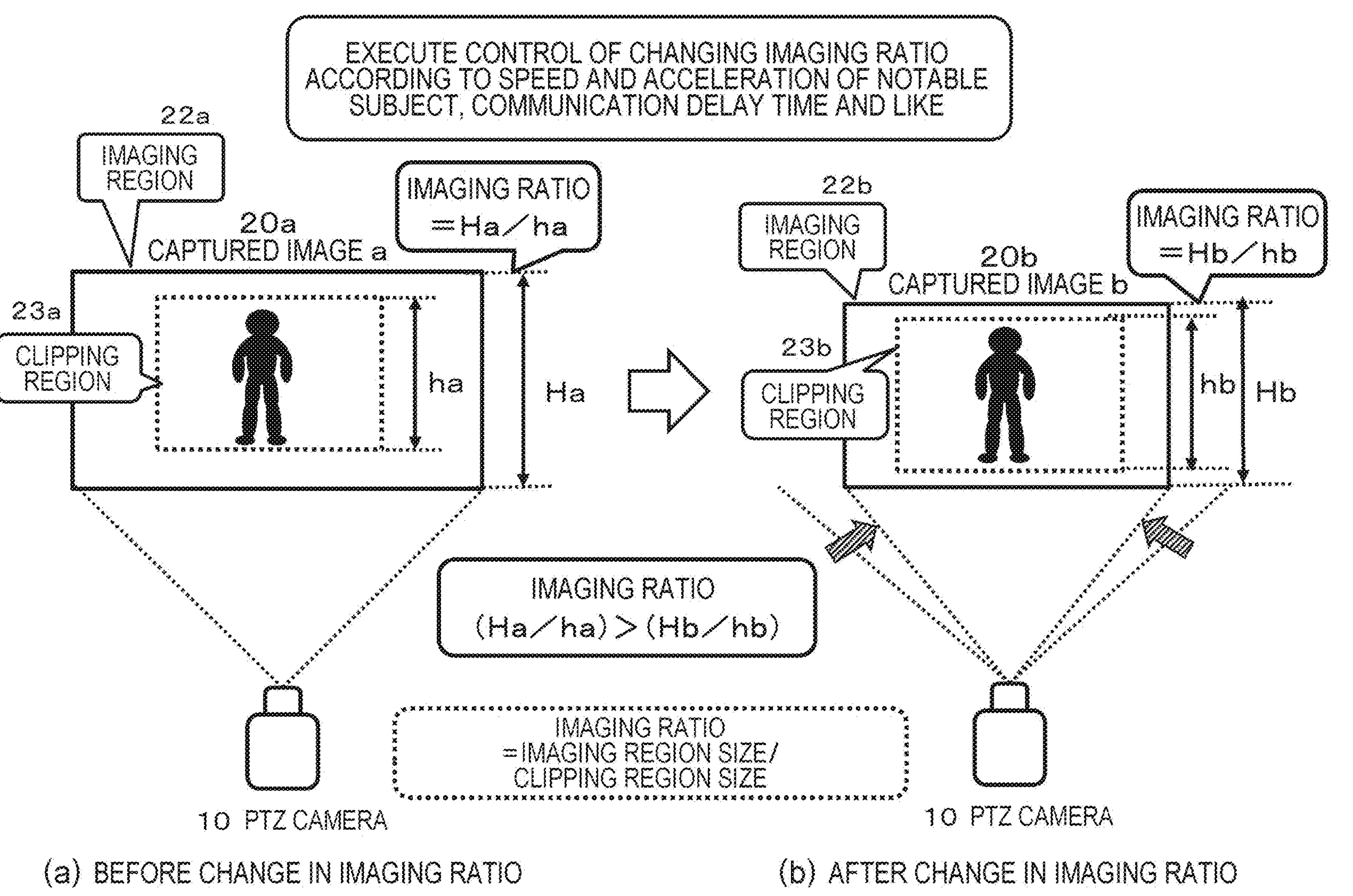
FIG. 9
EXECUTE CONTROL OF CHANGING IMAGING RATIO ACCORDING TO SPEED AND ACCELERATION OF NOTABLE SUBJECT, COMMUNICATION DELAY TIME AND LIKE
22a IMAGING REGION
20a CAPTURED IMAGE a
23a CLIPPING REGION
IMAGING RATIO =Ha/ha
ha
Ha
22b IMAGING REGION
20b CAPTURED IMAGE b
23b CLIPPING REGION
IMAGING RATIO =Hb/hb
hb
Hb
IMAGING RATIO (Ha/ha) > (Hb/hb)
IMAGING RATIO =IMAGING REGION SIZE/ CLIPPING REGION SIZE
10 PTZ CAMERA
10 PTZ CAMERA
(a) BEFORE CHANGE IN IMAGING RATIO
(b) AFTER CHANGE IN IMAGING RATIO (a) DETERMINATION EXAMPLE OF ALLOWABLE MAXIMUM IMAGING RATIO (rMAX)
L
H=2160
h=720
22
IMAGING REGION
23
CLIPPING REGION
ALLOWABLE MAXIMUM IMAGING RATIO (rMAX)
=H/h=2160/720=3

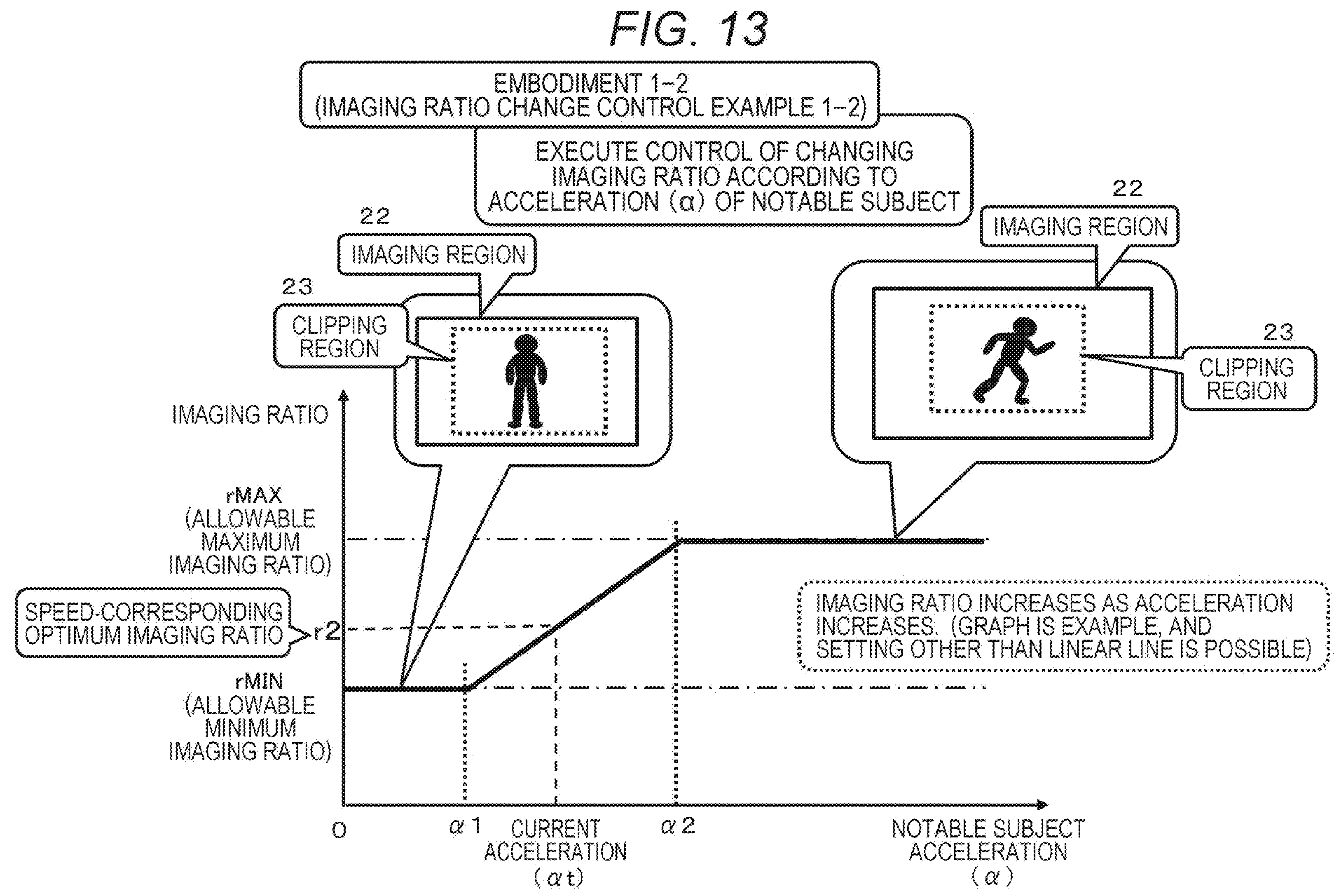

FIG. 13
EMBODIMENT 1-2
(IMAGING RATIO CHANGE CONTROL EXAMPLE 1-2)
EXECUTE CONTROL OF CHANGING IMAGING RATIO ACCORDING TO ACCELERATION (α) OF NOTABLE SUBJECT
22
IMAGING REGION
23
CLIPPING REGION
22
IMAGING REGION
23
CLIPPING REGION
IMAGING RATIO
rMAX (ALLOWABLE MAXIMUM IMAGING RATIO)
SPEED-CORRESPONDING OPTIMUM IMAGING RATIO
r2
rMIN (ALLOWABLE MINIMUM IMAGING RATIO)
IMAGING RATIO INCREASES AS ACCELERATION INCREASES. (GRAPH IS EXAMPLE, AND SETTING OTHER THAN LINEAR LINE IS POSSIBLE)
0
α1
CURRENT ACCELERATION (αt)
α2
NOTABLE SUBJECT ACCELERATION (α)

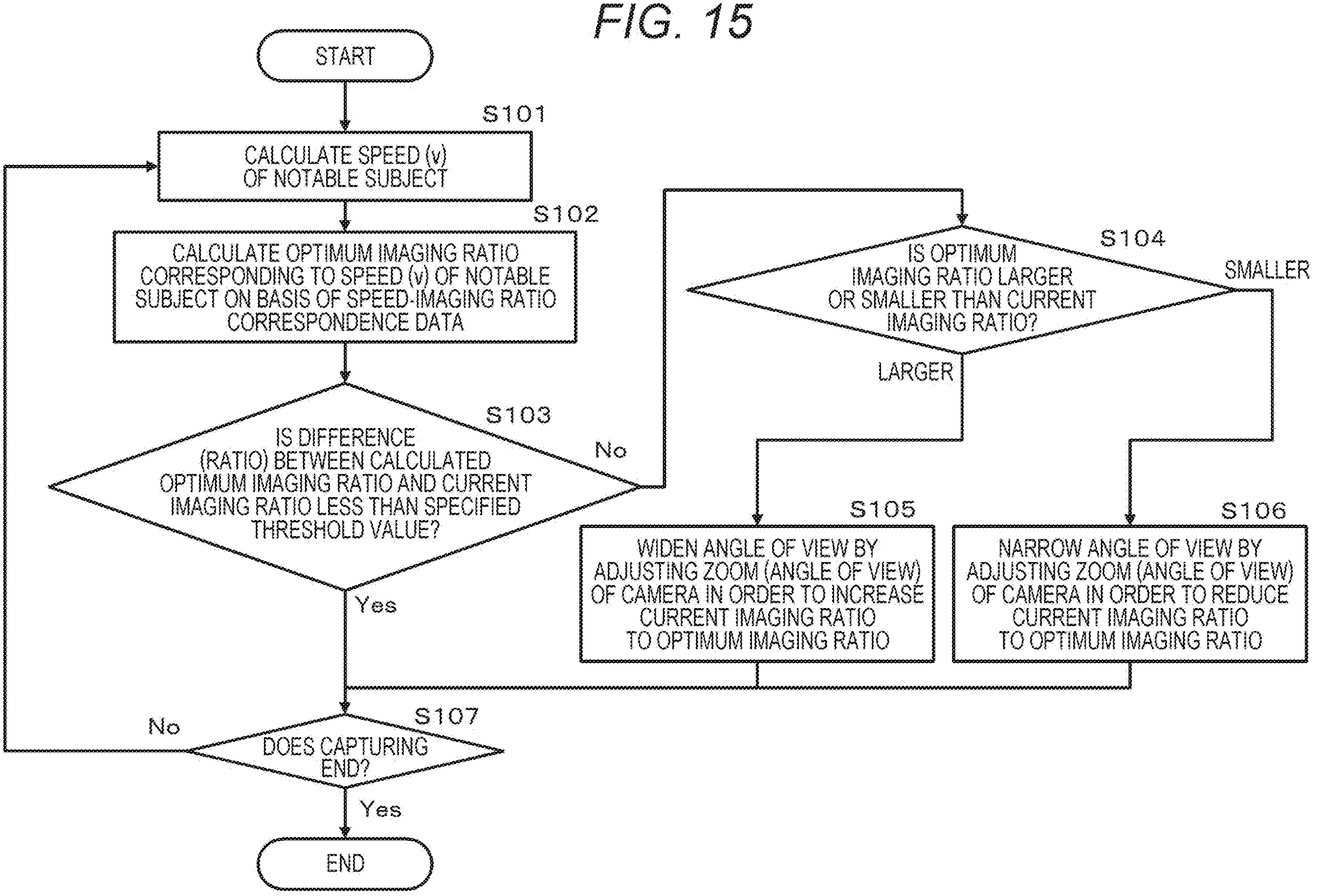
FIG. 15
START
S101
CALCULATE SPEED (v) OF NOTABLE SUBJECT
S102
CALCULATE OPTIMUM IMAGING RATIO CORRESPONDING TO SPEED (v) OF NOTABLE SUBJECT ON BASIS OF SPEED-IMAGING RATIO CORRESPONDENCE DATA
S103
IS DIFFERENCE (RATIO) BETWEEN CALCULATED OPTIMUM IMAGING RATIO AND CURRENT IMAGING RATIO LESS THAN SPECIFIED THRESHOLD VALUE?
No
Yes
S104
IS OPTIMUM IMAGING RATIO LARGER OR SMALLER THAN CURRENT IMAGING RATIO?
SMALLER
LARGER
S105
WIDEN ANGLE OF VIEW BY ADJUSTING ZOOM (ANGLE OF VIEW) OF CAMERA IN ORDER TO INCREASE CURRENT IMAGING RATIO TO OPTIMUM IMAGING RATIO
S106
NARROW ANGLE OF VIEW BY ADJUSTING ZOOM (ANGLE OF VIEW) OF CAMERA IN ORDER TO REDUCE CURRENT IMAGING RATIO TO OPTIMUM IMAGING RATIO
S107
No
DOES CAPTURING END?
Yes
END

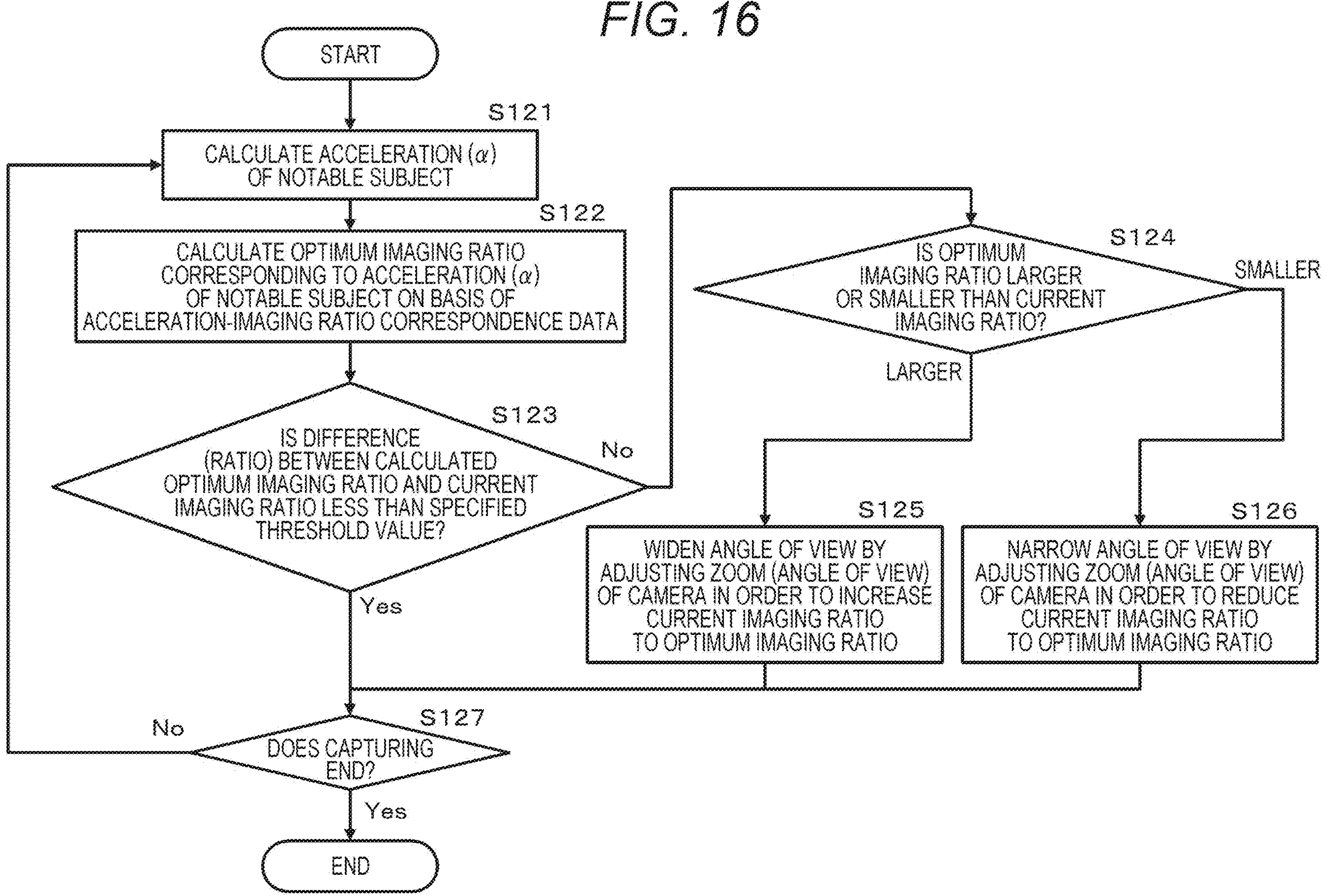
FIG. 16
START
S121
CALCULATE ACCELERATION (α) OF NOTABLE SUBJECT
S122
CALCULATE OPTIMUM IMAGING RATIO CORRESPONDING TO ACCELERATION (α) OF NOTABLE SUBJECT ON BASIS OF ACCELERATION-IMAGING RATIO CORRESPONDENCE DATA
S123
IS DIFFERENCE (RATIO) BETWEEN CALCULATED OPTIMUM IMAGING RATIO AND CURRENT IMAGING RATIO LESS THAN SPECIFIED THRESHOLD VALUE?
No
Yes
S124
IS OPTIMUM IMAGING RATIO LARGER OR SMALLER THAN CURRENT IMAGING RATIO?
SMALLER
LARGER
S125
WIDEN ANGLE OF VIEW BY ADJUSTING ZOOM (ANGLE OF VIEW) OF CAMERA IN ORDER TO INCREASE CURRENT IMAGING RATIO TO OPTIMUM IMAGING RATIO
S126
NARROW ANGLE OF VIEW BY ADJUSTING ZOOM (ANGLE OF VIEW) OF CAMERA IN ORDER TO REDUCE CURRENT IMAGING RATIO TO OPTIMUM IMAGING RATIO
S127
No
DOES CAPTURING END?
Yes
END

FIG. 17

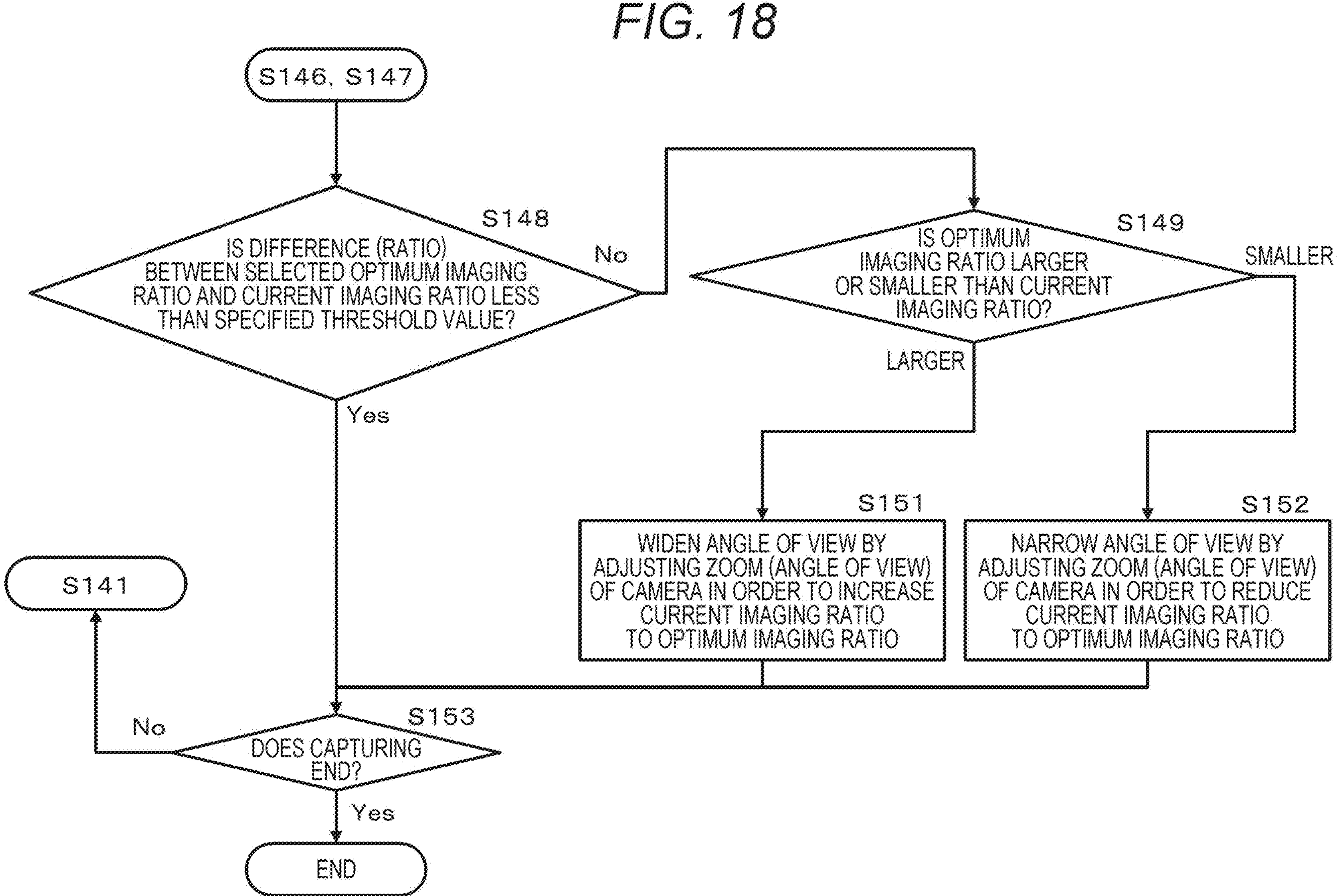
FIG. 18
S146, S147
S148
IS DIFFERENCE (RATIO) BETWEEN SELECTED OPTIMUM IMAGING RATIO AND CURRENT IMAGING RATIO LESS THAN SPECIFIED THRESHOLD VALUE?
No
Yes
S149
IS OPTIMUM IMAGING RATIO LARGER OR SMALLER THAN CURRENT IMAGING RATIO?
SMALLER
LARGER
S151
WIDEN ANGLE OF VIEW BY ADJUSTING ZOOM (ANGLE OF VIEW) OF CAMERA IN ORDER TO INCREASE CURRENT IMAGING RATIO TO OPTIMUM IMAGING RATIO
S152
NARROW ANGLE OF VIEW BY ADJUSTING ZOOM (ANGLE OF VIEW) OF CAMERA IN ORDER TO REDUCE CURRENT IMAGING RATIO TO OPTIMUM IMAGING RATIO
S141
S153
No
DOES CAPTURING END?
Yes
END

FIG. 21

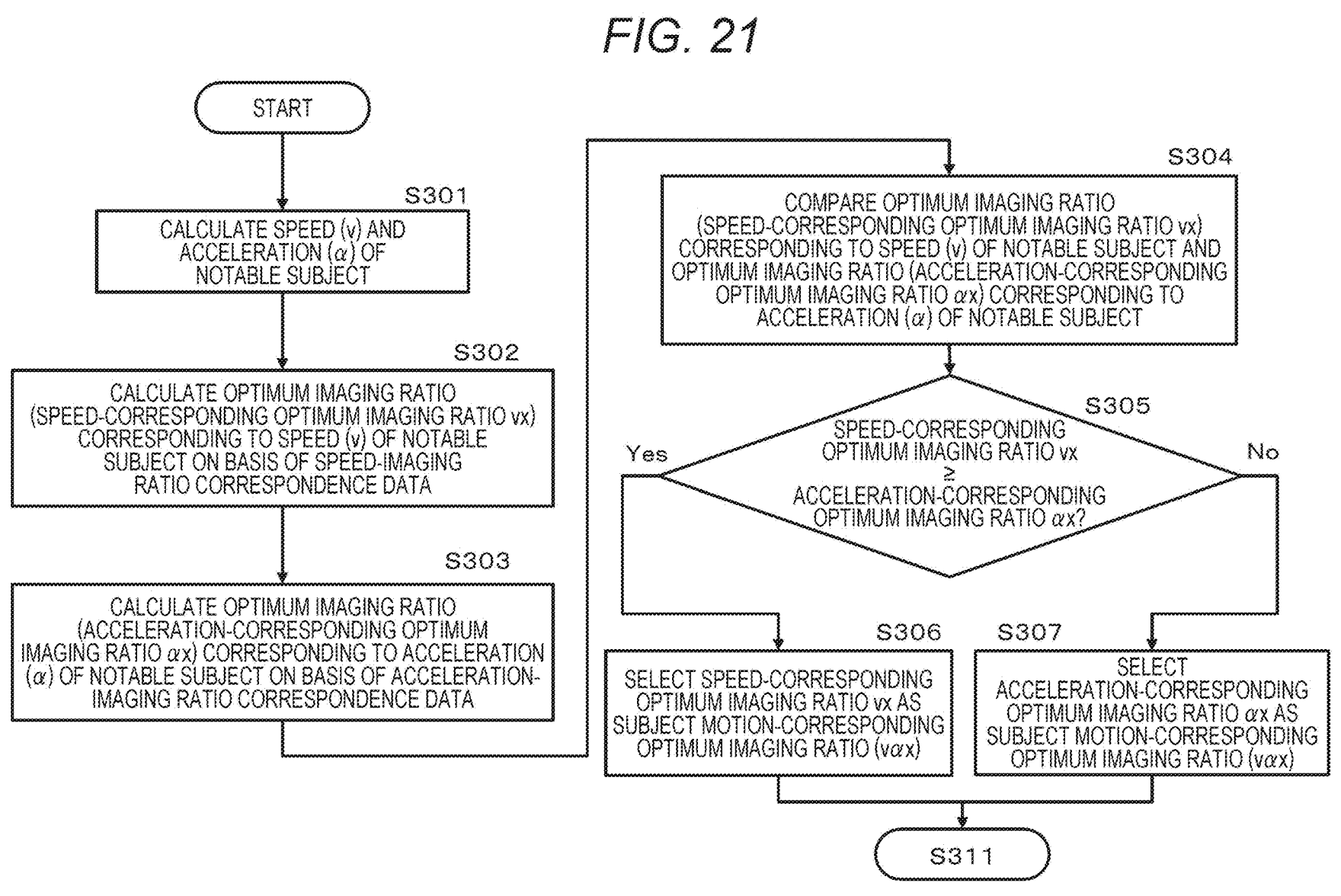

START

S301
CALCULATE SPEED (v) AND ACCELERATION ($\alpha$) OF NOTABLE SUBJECT

S302
CALCULATE OPTIMUM IMAGING RATIO (SPEED-CORRESPONDING OPTIMUM IMAGING RATIO vx) CORRESPONDING TO SPEED (v) OF NOTABLE SUBJECT ON BASIS OF SPEED-IMAGING RATIO CORRESPONDENCE DATA

S303
CALCULATE OPTIMUM IMAGING RATIO (ACCELERATION-CORRESPONDING OPTIMUM IMAGING RATIO $\alpha$x) CORRESPONDING TO ACCELERATION ($\alpha$) OF NOTABLE SUBJECT ON BASIS OF ACCELERATION-IMAGING RATIO CORRESPONDENCE DATA S304
COMPARE OPTIMUM IMAGING RATIO (SPEED-CORRESPONDING OPTIMUM IMAGING RATIO vx) CORRESPONDING TO SPEED (v) OF NOTABLE SUBJECT AND OPTIMUM IMAGING RATIO (ACCELERATION-CORRESPONDING OPTIMUM IMAGING RATIO $\alpha$x) CORRESPONDING TO ACCELERATION ($\alpha$) OF NOTABLE SUBJECT S305
SPEED-CORRESPONDING OPTIMUM IMAGING RATIO vx ≥ ACCELERATION-CORRESPONDING OPTIMUM IMAGING RATIO $\alpha$x?

Yes

No

S306
SELECT SPEED-CORRESPONDING OPTIMUM IMAGING RATIO vx AS SUBJECT MOTION-CORRESPONDING OPTIMUM IMAGING RATIO (v$\alpha$x)

S307
SELECT ACCELERATION-CORRESPONDING OPTIMUM IMAGING RATIO $\alpha$x AS SUBJECT MOTION-CORRESPONDING OPTIMUM IMAGING RATIO (v$\alpha$x)

S311

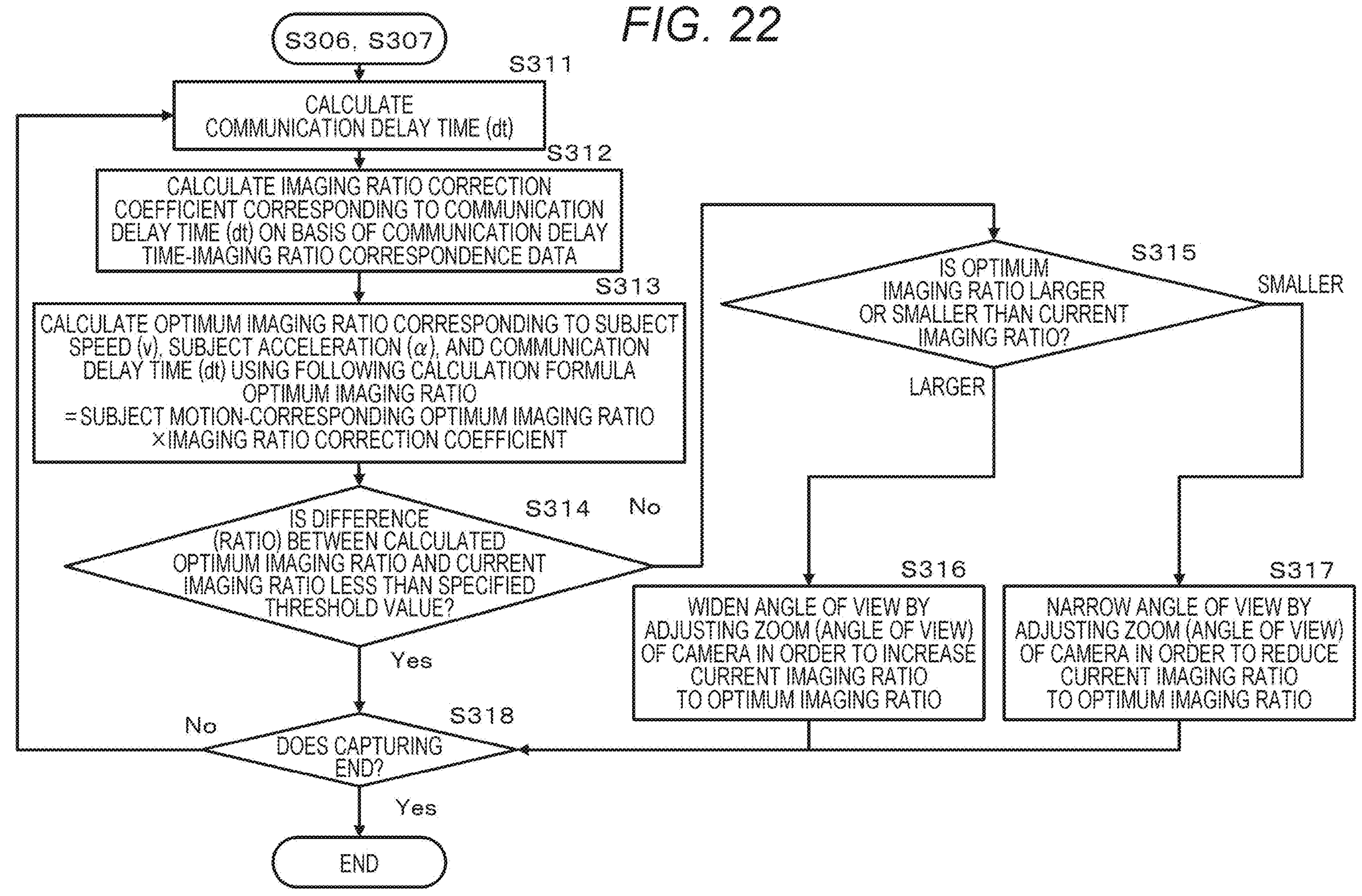
FIG. 22
S306, S307
S311
CALCULATE COMMUNICATION DELAY TIME (dt)
S312
CALCULATE IMAGING RATIO CORRECTION COEFFICIENT CORRESPONDING TO COMMUNICATION DELAY TIME (dt) ON BASIS OF COMMUNICATION DELAY TIME-IMAGING RATIO CORRESPONDENCE DATA
S313
CALCULATE OPTIMUM IMAGING RATIO CORRESPONDING TO SUBJECT SPEED (v), SUBJECT ACCELERATION (α), AND COMMUNICATION DELAY TIME (dt) USING FOLLOWING CALCULATION FORMULA
OPTIMUM IMAGING RATIO
=SUBJECT MOTION-CORRESPONDING OPTIMUM IMAGING RATIO ×IMAGING RATIO CORRECTION COEFFICIENT
S314
IS DIFFERENCE (RATIO) BETWEEN CALCULATED OPTIMUM IMAGING RATIO AND CURRENT IMAGING RATIO LESS THAN SPECIFIED THRESHOLD VALUE?
No
Yes
S315
IS OPTIMUM IMAGING RATIO LARGER OR SMALLER THAN CURRENT IMAGING RATIO?
SMALLER
LARGER
S316
WIDEN ANGLE OF VIEW BY ADJUSTING ZOOM (ANGLE OF VIEW) OF CAMERA IN ORDER TO INCREASE CURRENT IMAGING RATIO TO OPTIMUM IMAGING RATIO
S317
NARROW ANGLE OF VIEW BY ADJUSTING ZOOM (ANGLE OF VIEW) OF CAMERA IN ORDER TO REDUCE CURRENT IMAGING RATIO TO OPTIMUM IMAGING RATIO
S318
No
DOES CAPTURING END?
Yes
END

FIG. 23

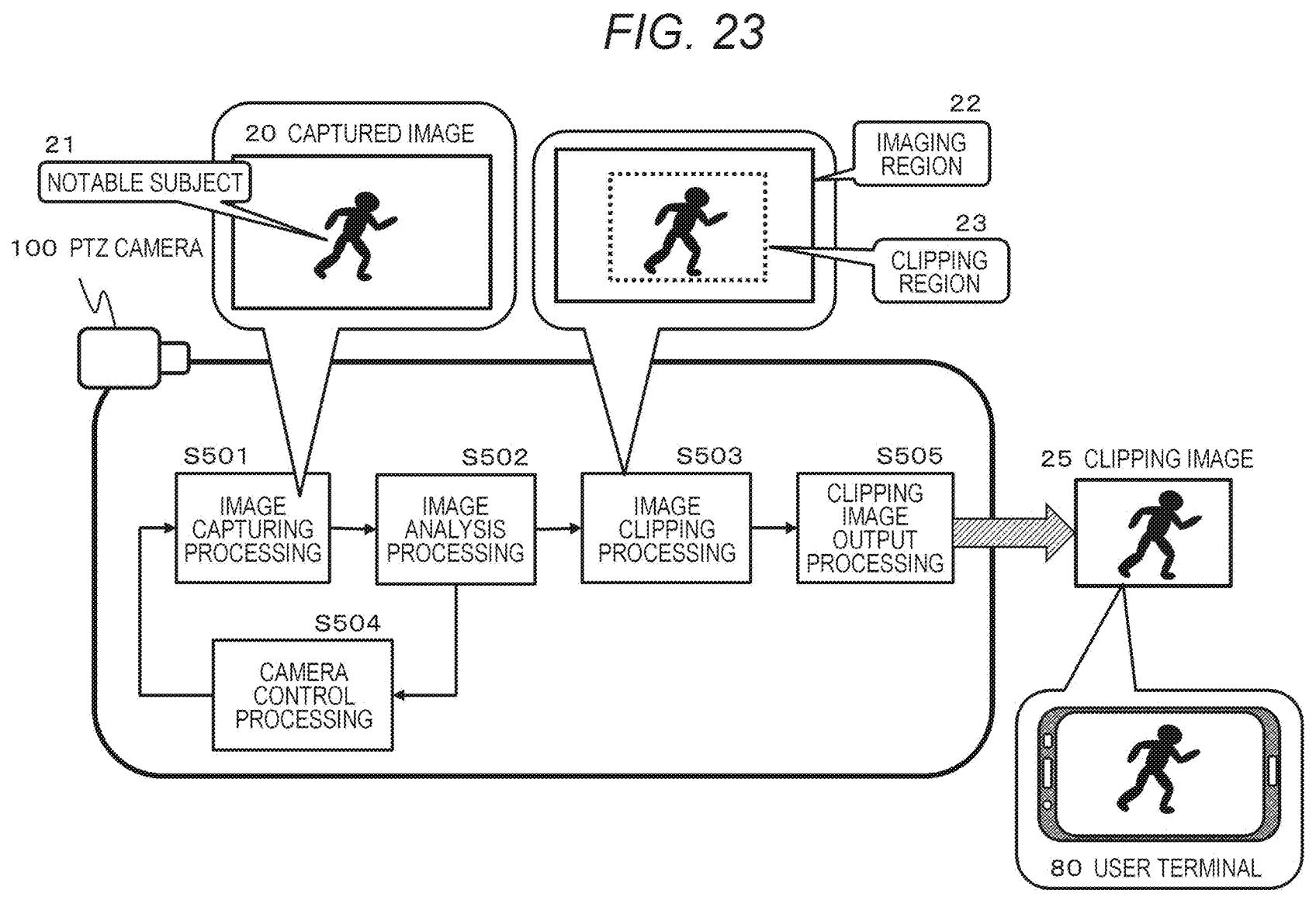

21 NOTABLE SUBJECT
20 CAPTURED IMAGE
22 IMAGING REGION
23 CLIPPING REGION
100 PTZ CAMERA
S501 IMAGE CAPTURING PROCESSING
S502 IMAGE ANALYSIS PROCESSING
S503 IMAGE CLIPPING PROCESSING
S504 CAMERA CONTROL PROCESSING
S505 CLIPPING IMAGE OUTPUT PROCESSING
25 CLIPPING IMAGE
80 USER TERMINAL

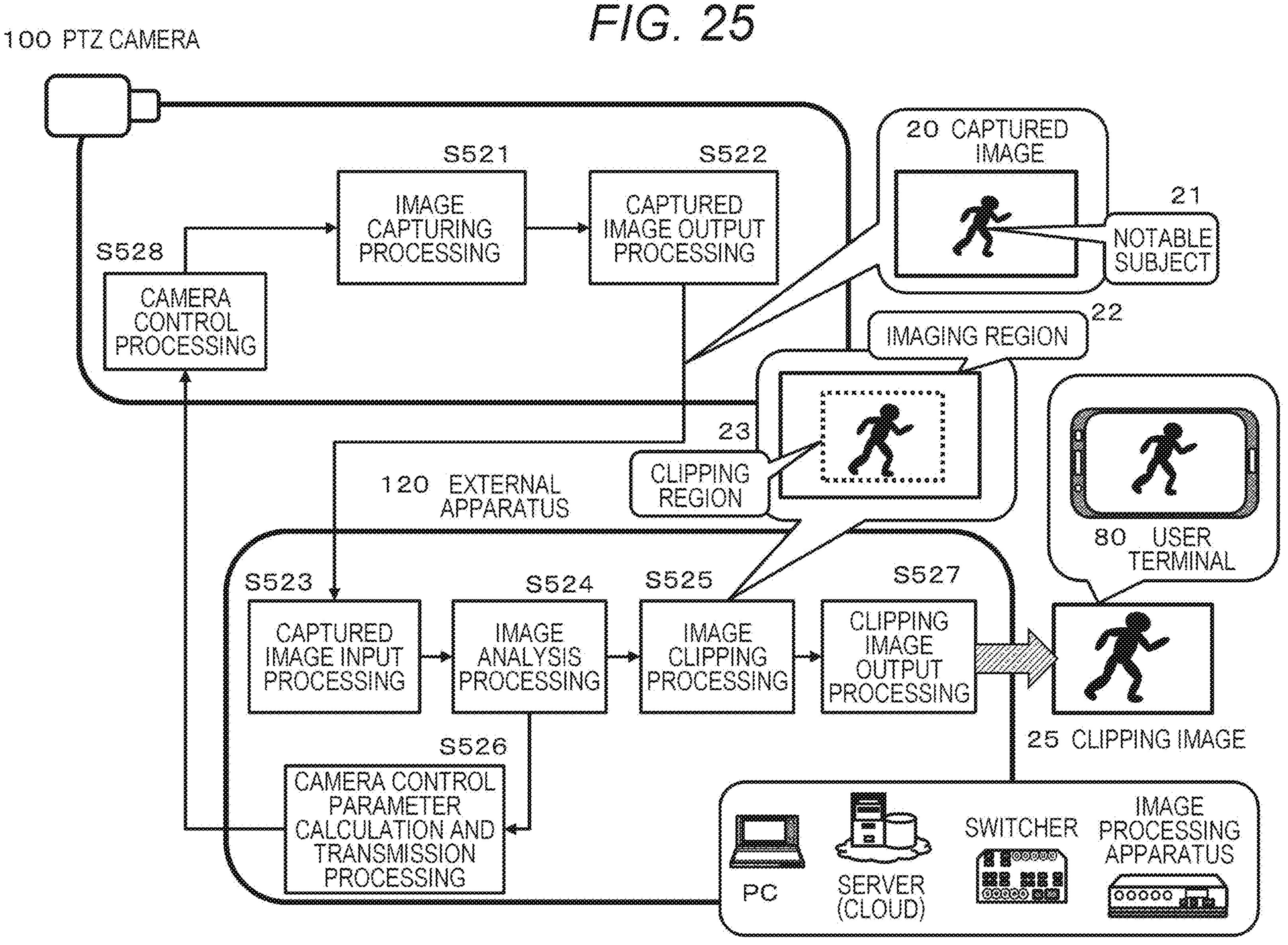
FIG. 25
100 PTZ CAMERA
S521
IMAGE CAPTURING PROCESSING
S522
CAPTURED IMAGE OUTPUT PROCESSING
S528
CAMERA CONTROL PROCESSING
20 CAPTURED IMAGE
21
NOTABLE SUBJECT
22
IMAGING REGION
23
CLIPPING REGION
120 EXTERNAL APPARATUS
S523
CAPTURED IMAGE INPUT PROCESSING
S524
IMAGE ANALYSIS PROCESSING
S525
IMAGE CLIPPING PROCESSING
S527
CLIPPING IMAGE OUTPUT PROCESSING
S526
CAMERA CONTROL PARAMETER CALCULATION AND TRANSMISSION PROCESSING
80 USER TERMINAL
25 CLIPPING IMAGE
PC
SERVER (CLOUD)
SWITCHER
IMAGE PROCESSING APPARATUS

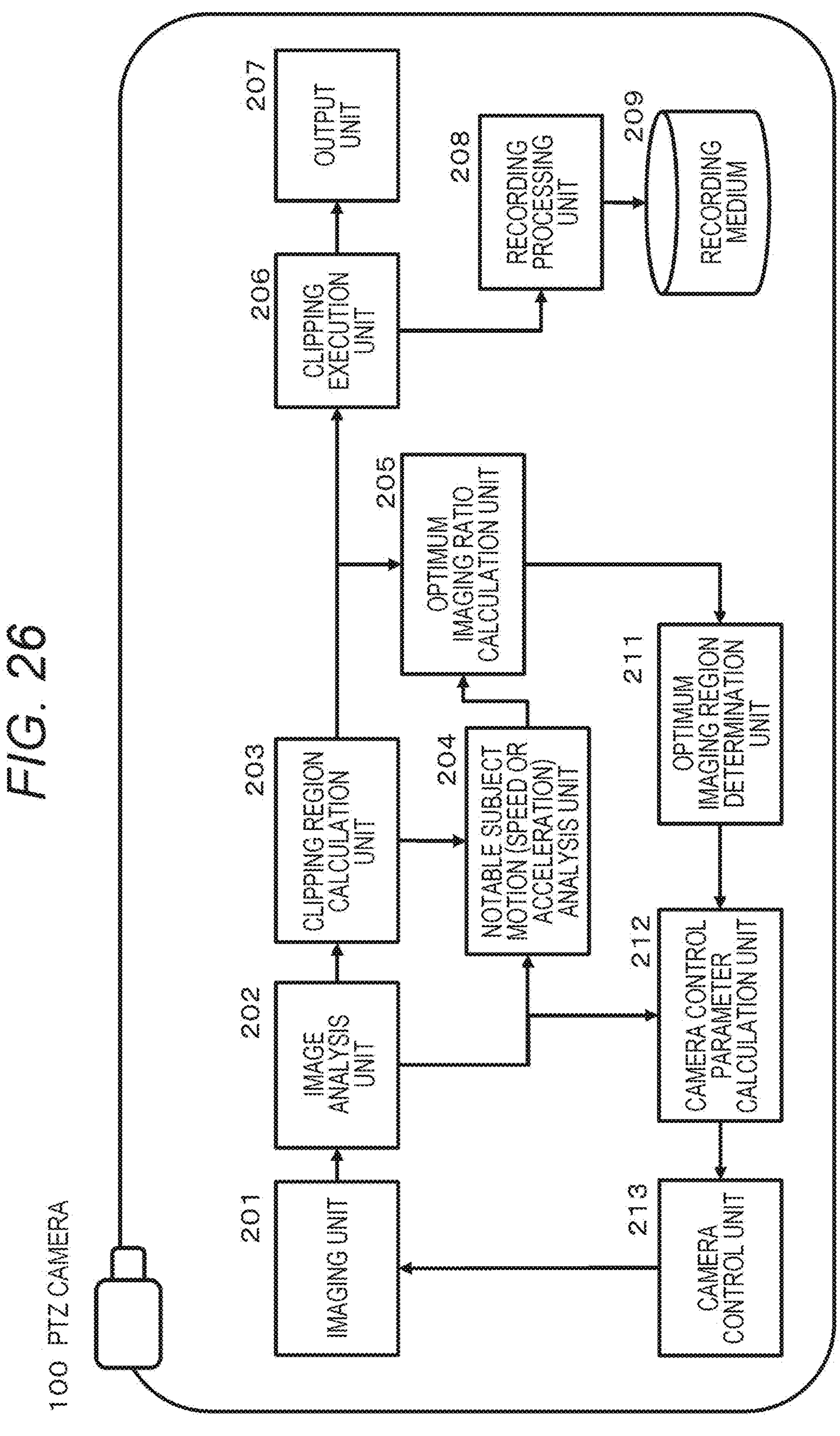
FIG. 26
100 PTZ CAMERA
201 IMAGING UNIT
202 IMAGE ANALYSIS UNIT
203 CLIPPING REGION CALCULATION UNIT
204 NOTABLE SUBJECT MOTION (SPEED OR ACCELERATION) ANALYSIS UNIT
205 OPTIMUM IMAGING RATIO CALCULATION UNIT
206 CLIPPING EXECUTION UNIT
207 OUTPUT UNIT
208 RECORDING PROCESSING UNIT
209 RECORDING MEDIUM
211 OPTIMUM IMAGING REGION DETERMINATION UNIT
212 CAMERA CONTROL PARAMETER CALCULATION UNIT
213 CAMERA CONTROL UNIT

FIG. 27

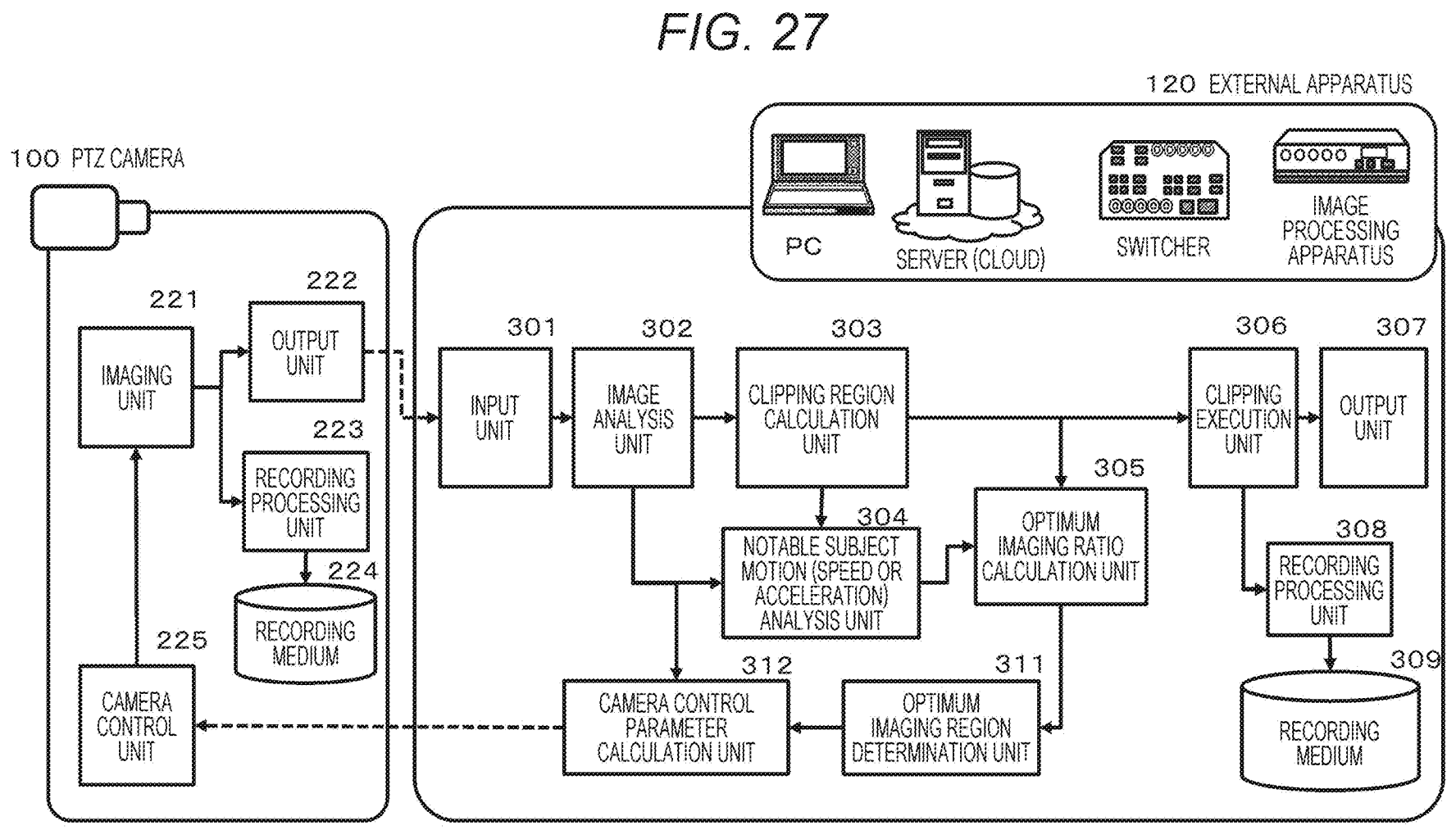

120 EXTERNAL APPARATUS
PC
SERVER (CLOUD)
SWITCHER
IMAGE PROCESSING APPARATUS

301 INPUT UNIT
302 IMAGE ANALYSIS UNIT
303 CLIPPING REGION CALCULATION UNIT
304 NOTABLE SUBJECT MOTION (SPEED OR ACCELERATION) ANALYSIS UNIT
305 OPTIMUM IMAGING RATIO CALCULATION UNIT
306 CLIPPING EXECUTION UNIT
307 OUTPUT UNIT
308 RECORDING PROCESSING UNIT
309 RECORDING MEDIUM
311 OPTIMUM IMAGING REGION DETERMINATION UNIT
312 CAMERA CONTROL PARAMETER CALCULATION UNIT

100 PTZ CAMERA
221 IMAGING UNIT
222 OUTPUT UNIT
223 RECORDING PROCESSING UNIT
224 RECORDING MEDIUM
225 CAMERA CONTROL UNIT

FIG. 28

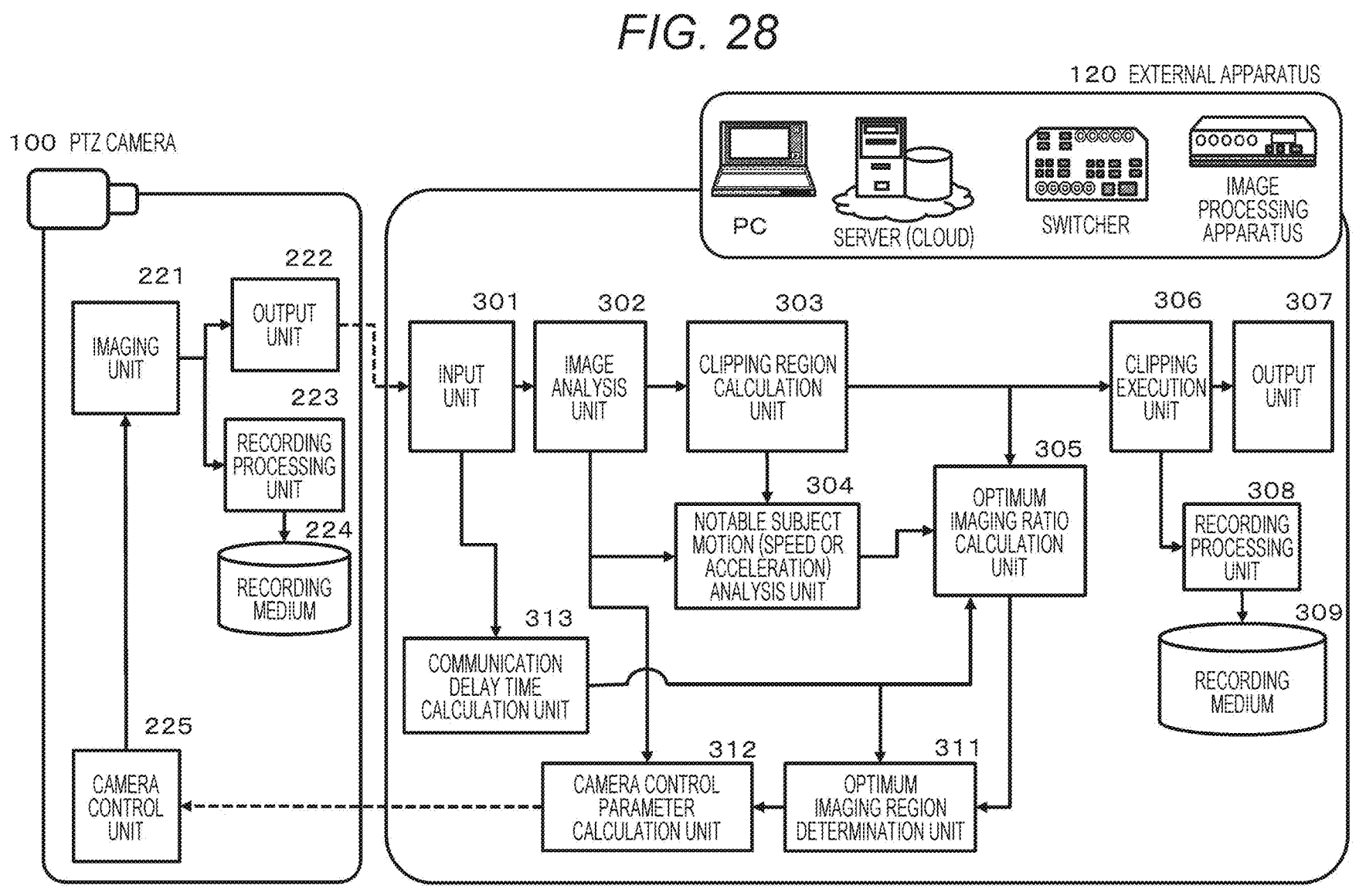

120 EXTERNAL APPARATUS
PC
SERVER (CLOUD)
SWITCHER
IMAGE PROCESSING APPARATUS
301 INPUT UNIT
302 IMAGE ANALYSIS UNIT
303 CLIPPING REGION CALCULATION UNIT
304 NOTABLE SUBJECT MOTION (SPEED OR ACCELERATION) ANALYSIS UNIT
305 OPTIMUM IMAGING RATIO CALCULATION UNIT
306 CLIPPING EXECUTION UNIT
307 OUTPUT UNIT
308 RECORDING PROCESSING UNIT
309 RECORDING MEDIUM
311 OPTIMUM IMAGING REGION DETERMINATION UNIT
312 CAMERA CONTROL PARAMETER CALCULATION UNIT
313 COMMUNICATION DELAY TIME CALCULATION UNIT
100 PTZ CAMERA
221 IMAGING UNIT
222 OUTPUT UNIT
223 RECORDING PROCESSING UNIT
224 RECORDING MEDIUM
225 CAMERA CONTROL UNIT

701
CPU
702
ROM
703
RAM
704
705
INPUT/OUTPUT INTERFACE
706
INPUT UNIT
707
OUTPUT UNIT
708
STORAGE UNIT
709
COMMUNICATION UNIT
710
DRIVE
711
REMOVABLE MEDIUM

IMAGE PROCESSING APPARATUS AND IMAGE PROCESSING METHOD

CROSS REFERENCE TO RELATED APPLICATIONS

This application is a U.S. National Phase of International Patent Application No. PCT/JP2023/006809 filed on Feb. 24, 2023, which claims priority benefit of Japanese Patent Application No. JP 2022-059634 filed in the Japan Patent Office on Mar. 31, 2022. Each of the above-referenced applications is hereby incorporated herein by reference in its entirety.

TECHNICAL FIELD

The present disclosure relates to an image processing apparatus, an image processing method, and a program. More specifically, the present disclosure relates to an image processing apparatus, an image processing method, and a program capable of more reliably performing video generation processing of a notable subject by image clipping while suppressing deterioration in image quality.

BACKGROUND ART

For example, there is a case where processing of generating video data obtained by extracting an image region of a specific notable subject, for example, a follow-up target person, from a captured video using a monitoring camera is requested.

Furthermore, for example, in a sports video such as soccer, there is a case where generation of follow-up video data obtained by clipping an image region of a specific notable subject, for example, a specific player, is required.

As processing of generating such follow-up video data of the notable subject, for example, processing of capturing an image with a large angle of view including the notable subject using a fixed camera and clipping an image region of the notable subject from the captured video to generate the follow-up video data can be performed.

As described above, by capturing an image with a large angle of view including the notable subject using the fixed camera, the notable subject is less likely to move out of the capturing range even if the notable subject slightly moves, and video data following the notable subject can be generated.

For example, in the case of generating a video following one notable player in a soccer game, a video including a wide region such as the whole or half of a soccer coat is captured by a fixed camera, and an image region of the notable player is clipped from each frame of the video, whereby a video similar to that of capturing only the notable player can be generated.

Note that processing of clipping an image region of a notable subject is described in, for example, Patent Document 1 (WO 2016/167016 A).

However, if the image region of the notable player is clipped from the wide region of the captured image captured by the fixed camera in this manner, there arises a problem that the image quality of the clipping image is degraded in a case where the image region of the notable player is small.

In order not to greatly reduce the image quality of the clipping image of the notable subject, the clipping image including the notable subject needs to have an image size equal to or larger than a predetermined number of pixels.

In order to realize generation of a clipping image with suppressed image quality degradation, a method using a PTZ camera is effective.

The PTZ camera can perform pan, tilt, and zoom processing, and can direct the capturing direction of the camera to the notable subject. Even if the notable subject moves, it is possible to perform capturing while maintaining the notable subject within a capturing region of a predetermined image size for a longer period of time.

However, for example, the pan processing of rotating the capturing direction of the PTZ camera in the horizontal direction and the tilt processing of rotating the capturing direction of the camera in the vertical direction require an operation of a mechanical drive mechanism for rotating the camera itself, and there is a problem that a predetermined drive time is required.

Therefore, in a case where the moving speed of the notable subject that is the follow-up target is high, if the time for driving the camera capturing direction to the direction in which the notable subject can be captured becomes long, there is a possibility that the notable subject is lost.

CITATION LIST

Patent Document

Patent Document 1: WO 2016/167016 A

SUMMARY OF THE INVENTION

Problems to be Solved by the Invention

The present disclosure has been made in view of the above problems, for example, and an object of the present disclosure is to provide an image processing apparatus, an image processing method, and a program capable of more reliably performing generation processing of subject follow-up video data accompanied by image clipping while suppressing deterioration in image quality.

An object of an embodiment of the present disclosure is to provide an image processing apparatus, an image processing method, and a program capable of more reliably executing processing of clipping and recording or distributing a partial image region including a notable subject from a captured image of a PTZ camera while suppressing deterioration in image quality.

Solutions to Problems

A first aspect of the present disclosure is an image processing apparatus including:

- a clipping region calculation unit that calculates an image region including a notable subject from a captured image of a camera as an image clipping region;
- a clipping execution unit that clips an image of the image clipping region calculated by the clipping region calculation unit and generate a clipping image;
- an imaging ratio calculation unit that calculate an imaging ratio for clipping image generation that is a size ratio between a size of the clipping image and a size of an imaging region corresponding to an entire image region of the captured image of the camera, as an index value for executing clipping image generation processing including the notable subject; and
- a camera control parameter calculation unit that calculates a camera control parameter for causing the camera to capture an image according to an imaging region size determined on the basis of the imaging ratio for clipping image generation calculated, in which the camera is caused to perform image capturing to which the camera control parameter calculated by the camera control parameter calculation unit is applied.

Further, a second aspect of the present disclosure is an image processing method executed in an image processing apparatus, the method including:

a clipping region calculation step of calculating, by a clipping region calculation unit, an image region including a notable subject from a captured image of a camera as an image clipping region;

a clipping execution step of, by a clipping execution unit, clipping an image of the image clipping region calculated in the clipping region calculation step and generating a clipping image;

an imaging ratio calculation step of calculating, by an imaging ratio calculation unit, an imaging ratio for clipping image generation that is a size ratio between a size of the clipping image and a size of an imaging region corresponding to an entire image region of the captured image of the camera, as an index value for executing clipping image generation processing including the notable subject; and a camera control parameter calculation step of calculating, by a camera control parameter calculation unit, a camera control parameter for causing the camera to capture an image according to an imaging region size determined on the basis of the calculated imaging ratio for clipping image generation, in which the camera is caused to perform image capturing to which the camera control parameter calculated by the camera control parameter calculation unit is applied.

Further, a third aspect of the present disclosure is a program for causing an image processing apparatus to execute image processing, the program causing the image processing apparatus to execute:

a clipping region calculation step of causing a clipping region calculation unit to calculate an image region including a notable subject from a captured image of a camera as an image clipping region;

a clipping execution step of causing a clipping execution unit to clip an image of the image clipping region calculated in the clipping region calculation step and generate a clipping image;

a clipping image generation imaging ratio calculation step of causing an imaging ratio calculation unit to calculate an imaging ratio for clipping image generation that is a size ratio between a size of the clipping image and a size of an imaging region corresponding to an entire image region of the captured image of the camera, as an index value for executing clipping image generation processing including the notable subject; and a camera control parameter calculation step of causing a camera control parameter calculation unit to calculate a camera control parameter for causing the camera to capture an image according to an imaging region size determined on the basis of the calculated imaging ratio for clipping image generation, in which the camera is caused to perform image capturing to which the camera control parameter calculated by the camera control parameter calculation unit is applied.

Note that the program of the present disclosure is, for example, a program that can be provided by a storage medium or a communication medium provided in a computer readable format to an image processing apparatus or a computer system capable of executing various program codes. By providing such a program in a computer-readable format, processing according to the program is implemented on the image processing apparatus or the computer system.

Other objects, features, and advantages of the present disclosure will become apparent from a more detailed description based on embodiments of the present disclosure described later and the accompanying drawings. Note that a system herein is a logical set configuration of a plurality of apparatuses, and is not limited to one in which apparatuses with respective configurations are in the same housing.

According to a configuration of an embodiment of the present disclosure, an apparatus and a method for calculating an optimum imaging ratio (an imaging ratio for clipping image generation) which is an index value for more reliably executing clipping image generation processing including a notable subject from a captured image of a PTZ camera are realized.

Specifically, for example, in the configuration in which the image clipping region including the notable subject is calculated from the captured image of the PTZ camera, and the image of the calculated region is clipped to generate the clipping image, the optimum imaging ratio (imaging ratio for clipping image generation) that is the size ratio of the imaging region of the camera to the clipping image is calculated as the index value for more reliably executing the clipping image generation processing including the notable subject. Furthermore, a zoom parameter for capturing an image according to the imaging region size of the camera calculated from the optimum imaging ratio is calculated, and the PTZ camera is caused to execute image capturing to which the calculated parameter is applied.

With this configuration, an apparatus and a method for calculating an optimum imaging ratio (an imaging ratio for clipping image generation), which is an index value for more reliably executing processing of generating a clipping image including the notable subject from the captured image of the PTZ camera, are realized.

Note that the effects described herein are merely examples and are not limited, and additional effects may also be provided.

BRIEF DESCRIPTION OF DRAWINGS

FIG. 3 is a diagram for explaining a clipping region setting example including a whole body region of a notable subject and a clipping region setting example including only an upper body region of the notable subject.

FIG. 4 is a diagram for explaining a problem in image clipping processing.

FIG. 5 is a diagram for explaining a problem in image clipping processing.

FIG. 6 is a diagram for explaining a specific example of processing executed by the image processing apparatus of the present disclosure.

FIGS. 7A and 7B are diagrams for explaining an imaging ratio.

FIG. 8 is a diagram for explaining a specific example of imaging ratio change processing executed by the image processing apparatus of the present disclosure.

FIG. 9 is a diagram for explaining a specific example of imaging ratio change processing executed by the image processing apparatus of the present disclosure.

FIG. 13 is a diagram for explaining an embodiment of changing the imaging ratio according to the acceleration of the notable subject.

FIG. 15 is a diagram illustrating a flowchart for explaining a processing sequence of an embodiment of changing the imaging ratio according to the speed of the notable subject.

FIG. 16 is a diagram illustrating a flowchart for explaining a processing sequence of an embodiment of changing the imaging ratio according to the acceleration of the notable subject.

FIG. 17 is a diagram illustrating a flowchart for explaining a processing sequence of an embodiment of changing the imaging ratio according to the speed and acceleration of the notable subject.

FIG. 18 is a diagram illustrating a flowchart for explaining a processing sequence of an embodiment of changing the imaging ratio according to the speed and acceleration of the notable subject.

FIG. 21 is a diagram illustrating a flowchart for explaining a processing sequence of an embodiment of changing the imaging ratio according to the speed and acceleration of the notable subject and the communication delay time between the camera and the external apparatus.

FIG. 22 is a diagram illustrating a flowchart for explaining a processing sequence of an embodiment of changing the imaging ratio according to the speed and acceleration of the notable subject and the communication delay time between the camera and the external apparatus.

FIG. 23 is a diagram for explaining a processing example executed by a camera which is an example of the image processing apparatus of the present disclosure.

FIG. 25 is a diagram for explaining configuration examples of a camera and an external apparatus which are an example of the image processing apparatus of the present disclosure, and processing to be executed.

FIG. 26 is a diagram for explaining a configuration example of a camera which is an example of the image processing apparatus of the present disclosure.

FIG. 27 is a diagram for explaining a configuration example of a camera and an external apparatus which are an example of the image processing apparatus of the present disclosure.

FIG. 28 is a diagram for explaining a configuration example of a camera and an external apparatus which are an example of the image processing apparatus of the present disclosure.

MODE FOR CARRYING OUT THE INVENTION

Figure 1:
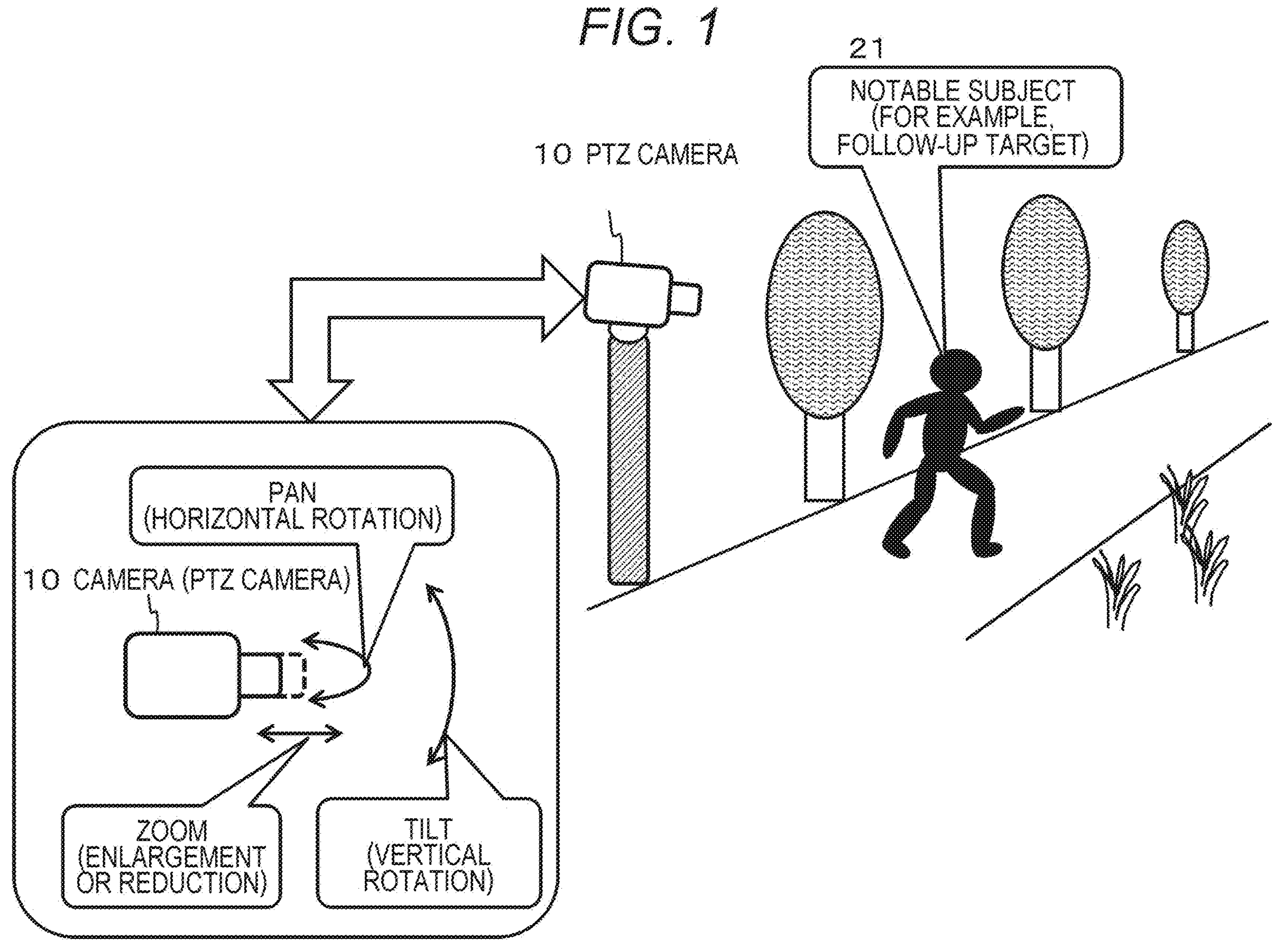
FIG. 1 is a diagram for explaining an outline of processing of generating a follow-up image of a notable subject with image clipping using a PTZ camera.

Hereinafter, details of an image processing apparatus, and an image processing method, and a program of the present disclosure will be described with reference to the drawings. Note that the description will be made according to the following items.

1. Outline of Follow-up Image Generation Processing of Notable Subject With Image Clipping Using PTZ Camera
2. Processing Executed by Image Processing Apparatus of Present Disclosure
3. (Embodiment 1) (Embodiment 1) Embodiment of Changing Imaging Ratio According to at Least One of Speed or Acceleration of Notable Subject 3-1. (Embodiment 1-1) Embodiment of Changing Imaging Ratio According to Speed of Notable Subject 3-2. (Embodiment 1-2) Embodiment of Changing Imaging Ratio According to Acceleration of Notable Subject 3-3. (Embodiment 1-3) Embodiment of Changing Imaging Ratio According to Speed and Acceleration of Notable Subject 4. Sequence of Processing Executed by Image Processing Apparatus of Embodiment 1
5. (Embodiment 2) Embodiment of Changing Imaging Ratio According to Communication Delay Time Between Camera and External Apparatus
6. (Embodiment 3) Embodiment of Changing Imaging Ratio According to Speed and Acceleration of Notable Subject and Communication Delay Time Between Camera and External Apparatus
7. Configuration Example of Image Processing Apparatus of Present Disclosure
8. Detailed Configuration of Image Processing Apparatus of Present Disclosure
9. Hardware Configuration Example of Image Processing Apparatus
10. Summary of Configuration of Present Disclosure

1. Outline of Follow-up Image Generation Processing of Notable Subject With Image Clipping Using PTZ Camera First, with reference to FIG. 1 and subsequent drawings, an outline of follow-up image generation processing of a notable subject with image clipping using a PTZ camera will be described.

As described above, in a case of generating follow-up video data obtained by extracting an image region of a specific follow-up target person from a captured video using a monitoring camera, or in a case of generating follow-up video data obtained by clipping an image region of a specific player from a captured video of a sport such as soccer, it is possible to perform processing of clipping and generating an image region including a notable subject from a captured image of a fixed camera that captures a wide region.

However, if the image region of the notable player is clipped from the wide region of the captured image captured by the fixed camera, the image quality of the clipping image is degraded in a case where the image region of the notable player is small.

In order not to greatly reduce the image quality of the clipping image of the notable subject, it is necessary to set the clipping image including the notable subject to an image size equal to or larger than a predetermined number of pixels, and it is effective to use the PTZ camera in order to realize such capturing processing.

The PTZ camera is a camera capable of performing pan, tilt, and zoom processing. That is, the PTZ camera is a camera capable of performing these processing of:

pan processing of rotating a capturing direction of a camera in a horizontal direction;

tilt processing of rotating a capturing direction of a camera in a vertical direction; and zoom processing of changing (=enlargement and reduction of capturing region) a capturing field angle of the camera.

By using such a PTZ camera, the capturing direction of the camera can be directed to the notable subject, and even if the notable subject moves, it is possible to perform capturing while maintaining the notable subject within a capturing region having a predetermined image size for a longer period of time.

Note that, in recent years, by performing AI analysis using at least one of a machine learning model such as a deap neural network (DNN) which is a multilayer neural network or a rule-based model, processing of detecting and following a specific person from a captured image can be executed with high accuracy.

By using such AI analysis, it is possible to automatically control (control of pan, tilt, and zoom) the PTZ camera and capture a follow-up video of the notable subject.

However, for example, in the pan processing of rotating the capturing direction of the PTZ camera in the horizontal direction and the tilt processing of rotating the capturing direction of the camera in the vertical direction, since the camera itself is rotated, a mechanical drive mechanism needs to be operated, and there is a problem that a predetermined drive time is required.

In a case where the moving speed of the notable subject that is the follow-up target is high, if the time for driving the camera capturing direction to the direction in which the notable subject can be captured becomes long, there is a possibility that the notable subject is lost.

An outline of capturing processing of an image (video (=moving image)) including a notable subject using a PTZ camera and generation processing of a clipping image of the notable subject and problems thereof will be described with reference to FIG. 1 and subsequent drawings.

FIG. 1 illustrates a state in which an image of a notable subject 21, which is a follow-up target person, is captured using a PTZ camera 10.

Note that, in the following description, it is assumed that an "image" includes a video which is a moving image and an image frame constituting the video.

As illustrated in FIG. 1, the PTZ camera 10 can perform pan processing of rotating the camera capturing direction in the horizontal direction, tilt processing of rotating the camera capturing direction in the vertical direction, and zoom processing of changing (=enlargement and reduction of capturing region) the camera capturing field angle.

Figure 2:
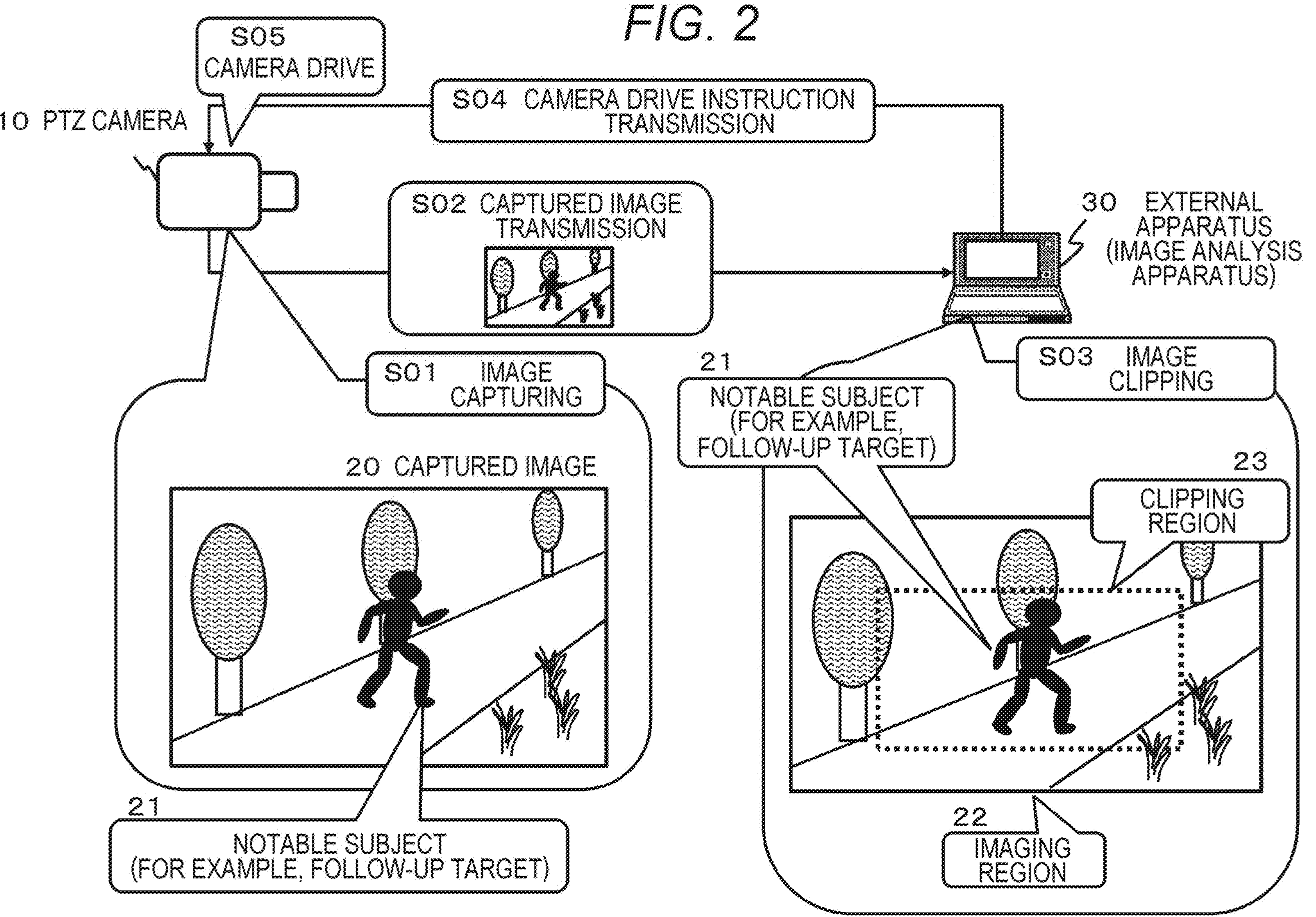
FIG. 2 is a diagram illustrating a configuration example of an image processing system including an external apparatus that generates a clipping image including an image region of a notable subject.

FIG. 2 is a diagram illustrating a configuration example of an image processing system including an external apparatus 30 that receives a captured image of the PTZ camera 10, performs image analysis processing for extracting an image region of a notable subject, and generates a clipping image including the image region of the notable subject.

FIG. 2 illustrates processing steps S01 to S04 executed by the PTZ camera 10 and the external apparatus 30.

Each processing step will be described below.

(Step S01)

First, in step S01, the PTZ camera 10 captures an image. The image is a moving image (video).

A captured image 20 illustrated in the drawing is an example of one image frame of the moving image (video) captured by the PTZ camera 10.

In the captured image 20, for example, a notable subject 21 that is a follow-up target is captured.

(Step S02)

Next, in step S02, the PTZ camera 10 transmits the captured image to the external apparatus 30 that is an execution apparatus of the image analysis processing and the image clipping processing.

(Step S03)

The external apparatus 30 detects the notable subject 21 from the captured image 20 received from the PTZ camera 10, and performs image clipping processing of clipping an image region of the detected notable subject 21.

Note that, for the notable subject 21, for example, a face image, a physical feature, and the like are analyzed in advance in the external apparatus 30, and the acquired feature information is registered in the storage unit. The external apparatus 30 performs image collation processing using these pieces of registered feature information to execute detection processing of the notable subject 21.

Specifically, for example, the notable subject 21 is detected from the captured image 20 by performing AI analysis using at least one of the machine learning model such as the deep neural network and the rule-based model described above.

The external apparatus 30 further executes image clipping processing of clipping an image region of the detected notable subject 21.

As illustrated in the drawing, processing of clipping a partial image region as a clipping region 23 from an imaging region 22 that is a region of the entire captured image 20 is performed.

For example, an image region including the whole body region of the notable subject 21 is set as the clipping region 23, and image clipping is executed.

Note that the setting of the clipping region of the image of the notable subject 21 is defined in advance. That is, the clipping region setting algorithm is defined in advance, and the external apparatus 30 sets the clipping region 23 including the notable subject 21 from the image according to this algorithm and executes the image clipping processing.

There are various types of clipping region setting algorithms. Specifically, for example, a clipping region setting algorithm including the whole body region of the notable subject 21, a clipping region setting algorithm including only the upper body region of the notable subject 21, a clipping region setting algorithm including only the face region of the notable subject 21, or the like is used. Note that the types of clipping region setting algorithms used in the external apparatus 30 are not limited to these examples.

FIG. 3 illustrates a clipping region setting example including the whole body region of the notable subject 21 and a clipping region setting example including only the upper body region of the notable subject 21.

"(1) Whole body shot" illustrated in FIG. 3 illustrates an example of a clipping region setting algorithm including the whole body region of the notable subject 21. The position of the whole body region of the notable subject 21 is set at a substantially central position of the clipping region 23, and a rectangular region in which a predefined length is set on the upper, lower, left, and right sides of the notable subject 21, for example, a margin region of about 10% of the height of the notable subject is set on the upper and lower sides of the notable subject 21, and a margin region of about 50% of the lateral width of the notable subject is set on the left and right sides of the notable subject 21 is set as the clipping region 23.

Furthermore, "(2) upper body shot" illustrated in FIG. 3 illustrates an example of a clipping region setting algorithm including the upper body region of the notable subject 21. The position of the upper body region of the notable subject 21 is set at a substantially central position of the clipping region 23, and a rectangular region in which a margin region of about 10% of the height of the notable subject is set on the notable subject 21 and a margin region of about 30% of the lateral width of the notable subject is set on the left and right of the notable subject 21 is set as the clipping region 23.

For example, as described above, the image clipping region setting algorithm for the notable subject 21 is defined in advance, and the external apparatus 30 sets the clipping region 23 including the notable subject 21 from the image according to the defined algorithm and executes the image clipping processing.

Returning to FIG. 2, processing executed by the PTZ camera 10 and the external apparatus 30 will be continuously described.

In step S03, the external apparatus 30 sets the clipping region 23 in each image frame of the captured image 20 captured by the PTZ camera 10, and generates a clipping image corresponding to each image frame. By reproducing these clipping images corresponding to the respective image frames, it is possible to generate a video centered on the notable subject on which the notable subject 21 is largely projected.

Note that, although not illustrated, the video including the clipping image generated by the external apparatus 30 can be distributed from the external apparatus 30 to a user terminal such as a television or a smartphone, and may be stored in a storage unit in the external apparatus 30.

(Step S04)

The external apparatus 30 further executes image analysis when executing the image clipping processing in step S03. The external apparatus 30 estimates a moving direction and a moving speed of the notable subject 21 detected from the captured image 20, and transmits a camera drive instruction to the PTZ camera 10 on the basis of these estimation results in step S04.

That is, the orientation (pan and tilt setting) of the PTZ camera 10 and the zoom setting information are transmitted such that the PTZ camera 10 can follow and capture the notable subject 21.

(Step S05)

When receiving the camera drive instruction data from the external apparatus 30, the PTZ camera 10 changes and updates the camera orientation (pan and tilt) and the zoom setting on the basis of the received camera drive instruction data in step S05.

By continuously repeating these processes, the PTZ camera 10 can continuously capture the captured image of the notable subject 21, and the external apparatus 30 can detect the notable subject 21 from the captured image received from the PTZ camera 10 and clip the image region of the notable subject 21.

Note that the video constituted by the clipping image is a video in which the notable subject 21 is captured larger than the notable subject 21 in the captured image before being clipped.

However, as described above, in the pan processing of rotating the capturing direction of the PTZ camera 10 in the horizontal direction and the tilt processing of rotating the capturing direction of the camera in the vertical direction, since the camera itself is rotated, it is necessary to operate a mechanical drive mechanism, a predetermined drive time is required, and there is a possibility that the notable subject is lost when the moving speed of the notable subject 21 is fast, and as a result, there is a problem that the clipping processing including the notable subject 21 cannot be performed.

A specific example of this problem will be described with reference to FIG. 4.

FIG. 4 illustrates the PTZ camera 10 and the external apparatus 30 described with reference to FIG. 2.

The PTZ camera 10 captures captured images 20*a* to *c* including the notable subject 21 at times (t0) to (t2) and transmits the captured images to the external apparatus 30.

The external apparatus 30 detects the notable subject 21 from the captured image 20 received from the PTZ camera 10, and performs processing of setting and clipping a clipping region 23 including the whole body region of the notable subject 21 from the imaging region 22 corresponding to the entire region of the captured image 20.

The notable subject 21 in the captured image 20*a* at the time (t0) is stationary. The external apparatus 30 can perform processing of setting and clipping a clipping region 23*a* including the whole body region of the notable subject 21 from the imaging region 22*a* corresponding to the entire region of the captured image 20*a* at the time (t0).

Through the image analysis processing of the captured image 20*a* at the time (t0), the external apparatus 30 confirms that the notable subject 21 is stationary, and does not transmit the drive instruction to the PTZ camera 10.

The notable subject 21 in the captured image 20*b* at the next time (t1) is running in the right direction in the drawing. The external apparatus 30 performs processing of setting and clipping a clipping region 23*b* including the whole body region of the notable subject 21 from the imaging region 22*b* corresponding to the entire region of the captured image 20*b* at time (t1).

Through the image analysis processing of the captured image 20*b* at the time (t1), the external apparatus 30 confirms that the notable subject 21 is running in the right direction in the drawing, and transmits a camera drive (PTZ drive) instruction to the PTZ camera 10 to move the current capturing direction in the right direction.

That is, the processing of (Process b) illustrated in FIG. 4 is executed.

When a camera drive (PTZ drive) instruction is input from the external apparatus 30, the PTZ camera 10 performs a pan operation so as to move the current capturing direction rightward. The captured image of the operation result is the captured image 20*c* at the time (t2).

A part of the notable subject 21 in the captured image 20*c* is near the end portion of the capturing range of the PTZ camera 10 or outside the imaging range.

This is because a pan operation for moving the capturing direction rightward is executed by mechanical driving of the gear mechanism or the like of the PTZ camera 10, which takes time.

As a result, at time (t2), the PTZ camera 10 transmits, to the external apparatus 30, the captured image 20*c* in which a part of the notable subject 21 is out of the capturing range.

As illustrated in (Process c) in FIG. 4, even if the external apparatus 30 attempts to perform processing of setting and clipping a clipping region 23*c* including the whole body region of the notable subject 21 from the imaging region 22*c* corresponding to the entire region of the captured image 20*c* at time (t2), the external apparatus 30 cannot set the clipping region 23*c* including the whole body region of the notable subject 21.

As described above with reference to FIG. 3, for example, the clipping region setting algorithm including the whole body region of the notable subject 21 is defined in advance. That is, an algorithm for clipping a region in which a prescribed margin is set in each of the upper, lower, left, and right directions of the notable subject 21 is defined.

In (Process c) illustrated in FIG. 4, even if image clipping according to this clipping algorithm is to be executed, a prescribed margin cannot be set on the right side of the notable subject 21 (=the moving direction of the notable subject), and as a result, the clipping region 23*c* cannot be set.

Furthermore, in a case where the PTZ camera 10 and the external apparatus 30 are located apart from each other, and there is a possibility of occurrence of a communication delay, the possibility of occurrence of a follow-up error or an image clipping error of the notable subject due to the communication delay is further increased.

With reference to FIG. 5, a specific example of a problem that occurs in an environment where the PTZ camera 10 and the external apparatus 30 are located apart from each other and a communication delay may occur will be described.

FIG. 5 illustrates a PTZ camera 10 similar to that in FIG. 4 and an external apparatus 30. The PTZ camera 10 and the external apparatus 30 illustrated in FIG. 5 are located apart from each other, and are connected via a communication network such as the Internet, for example, and there is a possibility that a communication delay occurs.

The PTZ camera 10 captures a captured image 20*p* including the notable subject 21 at time (t1), and transmits the captured image 20*p* to the external apparatus 30.

However, due to the communication delay of the captured image 20*p*, the external apparatus 30 receives the captured image 20*p* at time (t1+dt1). (dt1) is a time (=communication delay time) required for the communication processing of transmitting the captured image 20*p* from the PTZ camera 10 to the external apparatus 30.

The external apparatus 30 detects the notable subject 21 from the captured image 20*p* received from the PTZ camera 10 at time (t1+dt1), and performs processing of setting and clipping a clipping region 23 including the whole body region of the notable subject 21 from the imaging region 22 corresponding to the entire region of the captured image 20*p*.

Through the image analysis processing of the captured image 20*p*, the external apparatus 30 confirms that the notable subject 21 is running in the right direction in the drawing, and transmits a camera drive (PTZ drive) instruction to the PTZ camera 10 to move the current capturing direction rightward.

That is, the processing of (Process x) illustrated in FIG. 5 is executed.

The transmission timing of the camera drive (PTZ drive) instruction from the external apparatus 30 to the PTZ camera 10 is time (t1+dt2).

The time td2 has already elapsed from the capturing timing (t1) of the captured image.

The PTZ camera 10 receives a camera drive (PTZ drive) instruction from the external apparatus 30 at time (t1+dt3).

A communication delay also occurs in this data communication. (dt3−dt2) corresponds to a time (=communication delay time) required for communication processing of transmitting a camera drive (PTZ drive) instruction from the external apparatus 30 to the PTZ camera 10.

The PTZ camera 10 performs a pan operation so as to move the current capturing direction rightward in accordance with a camera drive (PTZ drive) instruction received from the external apparatus 30. The timing at which the pan operation is completed is the time (t1+dt4), and the captured image after completion of the pan operation is the captured image 20*q*.

A part of the body of the notable subject 21 in the captured image 20*q* is out of the capturing range of the PTZ camera 10.

As described above, when the communication delay with the external apparatus 30 is added to the delay due to the mechanical driving of the PTZ camera 10, the possibility of occurrence of a follow-up error or an image clipping error of the notable subject is further increased.

The processing of the present disclosure solves such a problem, and makes it possible to more reliably execute processing of clipping and recording or distributing a partial image region including the notable subject from the captured image of the PTZ camera while suppressing deterioration in image quality.

Hereinafter, details of the configuration and processing of the image processing apparatus of the present disclosure will be described.

2. Processing Executed by Image Processing Apparatus of Present Disclosure

Hereinafter, processing executed by the image processing apparatus of the present disclosure will be described.

Processing executed by the image processing apparatus of the present disclosure will be described with reference to FIG. 6 and subsequent drawings.

Figure 6:
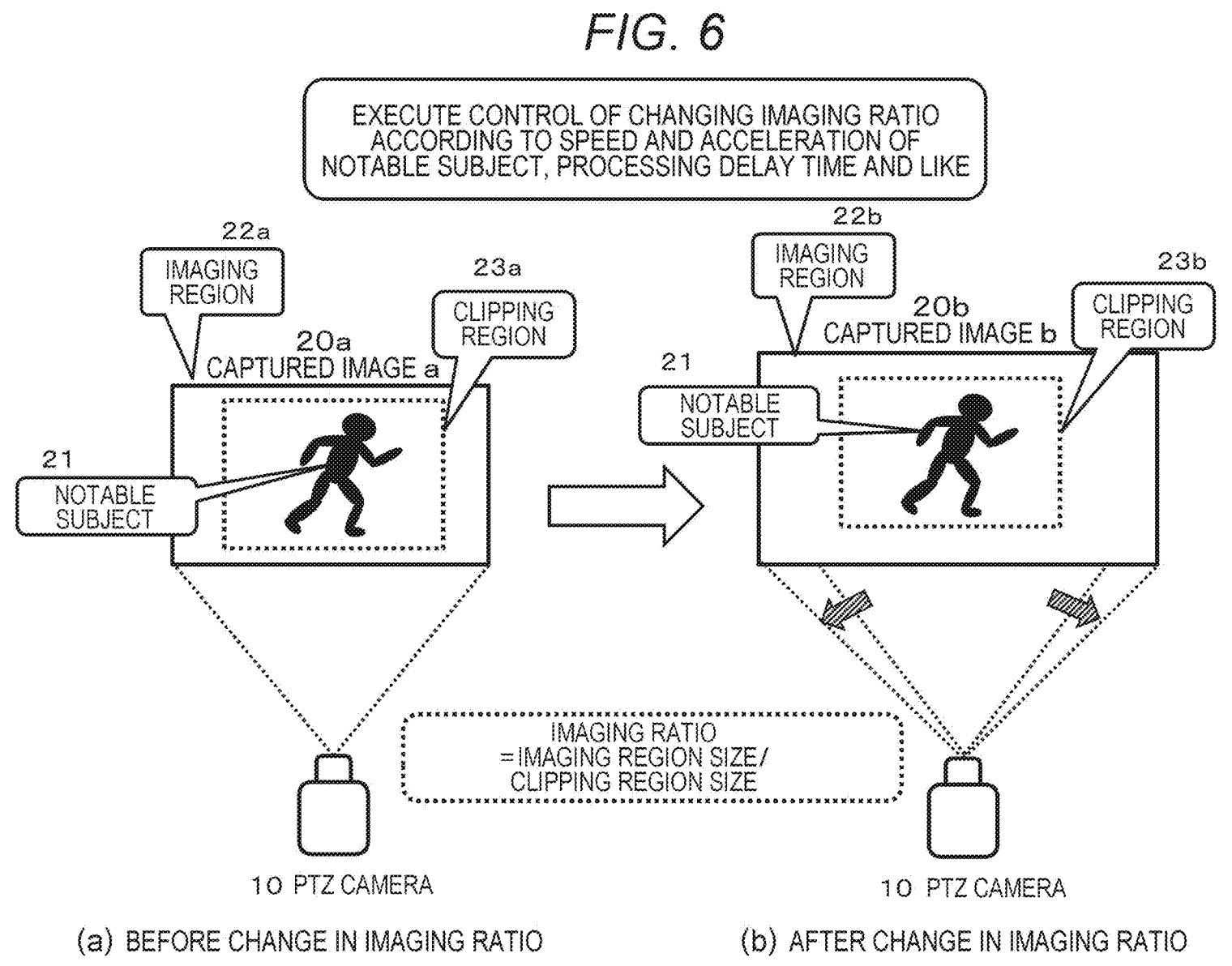

FIG. 6 is a diagram for explaining a specific example of processing executed by the image processing apparatus of the present disclosure.

As illustrated in FIG. 6, the image processing apparatus according to the present disclosure executes control for changing the imaging ratio in accordance with at least one of, for example, a moving speed or acceleration of a notable subject which is a follow-up target, a processing delay time including a communication delay, or the like.

FIG. 6 illustrates the following two image capturing examples by the PTZ camera 10.

(a) Image capturing example before change in imaging ratio (b) Image capturing example after change in imaging ratio In both (a) and (b), the same notable subject 21 is captured, and the notable subject 21 is running and moving in the right direction in the drawing.

Comparing (a) image capturing example before the change in the imaging ratio with (b) image capturing example after the change in the imaging ratio, the ratio between the size of the imaging region 22 corresponding to the entire region of the captured image 20 and the size of the clipping region 23 is different.

The size ratio (imaging ratio) between the size of the imaging region 22*b* and the size of the clipping region 23*b* in (b) image capturing example after the change in the imaging ratio is larger than the size ratio (imaging ratio) between the size of the imaging region 22*a* and the size of the clipping region 23*a* in (a) image capturing example before the change in the imaging ratio.

Specifically, the size of the imaging region 22*b* in (b) image capturing example after the change in the imaging ratio is larger than the size of the imaging region 22*a* in (a) image capturing example before the change in the imaging ratio.

That is, (b) the captured images b and 20*b* after the change in the imaging ratio (=the captured image having the imaging region 22*b*) are images captured with a setting having a wider angle of view than (a) the captured images a and 20*a* before the change in the imaging ratio (=the captured image having the imaging region 22*a*).

As described above, the image processing apparatus of the present disclosure changes the size of the imaging region 22 and the size ratio (imaging ratio) of the clipping region on the basis of whether or not the notable subject 21 which is a follow-up target is moving at a certain speed. Then, in a case where it is detected that the notable subject 21 is moving at a predetermined speed or more, change processing of the "imaging ratio" is performed to make the size ratio between the size of the imaging region 22 and the size of the clipping region 23 larger than that in a case where it is detected that the notable subject 21 is not moving at a predetermined speed or more. That is, the zoom of the PTZ camera 10 is adjusted to perform setting for widening the capturing range, that is, processing for widening the angle of view.

The "imaging ratio" is a ratio of the imaging region size to the clipping region size. That is, imaging ratio=(imaging region size/clipping region size).

The "imaging ratio" will be described with reference to FIGS. 7A and 7B.

FIGS. 7A and 7B illustrates FIG. 7A captured image example and FIG. 7B imaging ratio explanatory diagram.

In FIG. 7A captured image example, a captured image 20 including the notable subject 21 is illustrated. A imaging region 22 corresponds to the entire region of the captured image 20. A clipping region 23 is set in the imaging region 22. The clipping region 23 is set as, for example, a region including the whole body of the notable subject 21.

In FIG. 7B imaging ratio explanatory diagram, only the imaging region 22 illustrated in FIG. 7A captured image example and the rectangular frame of each clipping region 23 are illustrated.

For example, as illustrated in FIG. 7B, the imaging ratio can be calculated as a ratio between the height H of the imaging region 22 (=the entire image region of the captured image 20) and the height h of the clipping region 23.

$$\text{Imaging ratio}=(\text{imaging region size}/\text{clipping region size})=H/h.$$

Note that the aspect ratio of the imaging region 22 and the aspect ratio of the clipping region 23 are the same.

FIG. 8 illustrates a calculation example and a comparative example of the imaging ratio of each of the captured images in FIGS. 6(*a*) and (*b*) described above.

As illustrated in FIG. 8, (a) imaging ratio in the image capturing example before the change in the imaging ratio is $$\text{imaging ratio}=Ha/ha.$$

In addition, (b) imaging ratio in the image capturing example after the change in the imaging ratio is $$\text{imaging ratio}=Hb/hb.$$

Comparing the imaging ratios in these two image capturing examples (a) and (b), (Ha/ha)<(Hb/hb). That is, the imaging ratio (Hb/hb) in the image capturing example after the change in the imaging ratio (b) is changed to a value (large ratio) larger than the imaging ratio (Ha/ha) in the image capturing example after the change in the imaging ratio (a).

As described above, the image processing apparatus of the present disclosure performs control to increase the imaging ratio, for example, in a case where the notable subject is moving at a certain speed. Specifically, processing of widening the angle of view is executed by zoom adjustment of the PTZ camera.

This process expands the range in which the PTZ camera 10 can capture images, and the follow-up capturing can be continued without losing the notable subject 21.

FIG. 9 illustrates an example of changing the imaging ratio different from that in FIG. 8.

Similarly to FIG. 8, FIG. 9 illustrates the following two image capturing examples by the PTZ camera 10.

(a) Image capturing example before change in imaging ratio (b) Image capturing example after change in imaging ratio In both (a) and (b), the same notable subject 21 is captured, but in the example illustrated in FIG. 9, the notable subject 21 is stationary.

As illustrated in FIG. 9, (a) imaging ratio in the image capturing example before the change in the imaging ratio is $$\text{imaging ratio}=Ha/ha.$$

In addition, (b) imaging ratio in the image capturing example after the change in the imaging ratio is $$\text{imaging ratio}=Hb/hb.$$

Comparing the imaging ratios in these two image capturing examples (a) and (b), (Ha/ha)>(Hb/hb). That is, the imaging ratio (Hb/hb) in the image capturing example after the change in the imaging ratio (b) is changed to a value (small ratio) smaller than the imaging ratio (Ha/ha) in the image capturing example after the change in the imaging ratio (a).

As described above, the image processing apparatus of the present disclosure performs control to reduce the imaging ratio, for example, in a case where the notable subject is stationary or in a case where the notable subject remains within a predetermined range for a predetermined time or more. Specifically, processing of narrowing the angle of view is executed by zoom adjustment of the PTZ camera.

This process narrows the range in which the PTZ camera 10 can capture images, and the ratio of the clipping region 23 in the imaging region 22 can be increased. That is, the ratio of the clipping region 23 including the notable subject 21 increases, and as a result, the number of pixels in the image region of the clipping image 23 increases, and the image quality of the clipping image 23 can be improved.

3. (Embodiment 1) Embodiment of Changing Imaging Ratio According to at Least One of Speed or Acceleration of Notable Subject Next, a specific example of processing executed by the image processing apparatus of the present disclosure will be described.

The following embodiments will be sequentially described.

(Embodiment 1) Embodiment of changing imaging ratio according to at least one of speed or acceleration of notable subject (Embodiment 2) Embodiment of changing imaging ratio according to communication delay time between camera and external apparatus (Embodiment 3) Embodiment of changing imaging ratio according to speed and acceleration of notable subject and communication delay time between camera and external apparatus First, as (Embodiment 1), an embodiment of changing the imaging ratio according to at least one of the speed or the acceleration of the notable subject will be described.

Note that Embodiment 1 will be further subdivided into the following embodiments.

(Embodiment 1-1) Embodiment of changing imaging ratio according to speed of notable subject (Embodiment 1-2) Embodiment of changing imaging ratio according to acceleration of notable subject (Embodiment 1-3) Embodiment of changing imaging ratio according to speed and acceleration of notable subject

(3-1. (Embodiment 1-1) Embodiment of Changing Imaging Ratio According to Speed of Notable Subject)

First, an embodiment of changing the imaging ratio according to the speed of the notable subject will be described.

An embodiment of changing the imaging ratio according to the speed of the notable subject will be described with reference to FIG. 10 and subsequent drawings.

Figure 10:
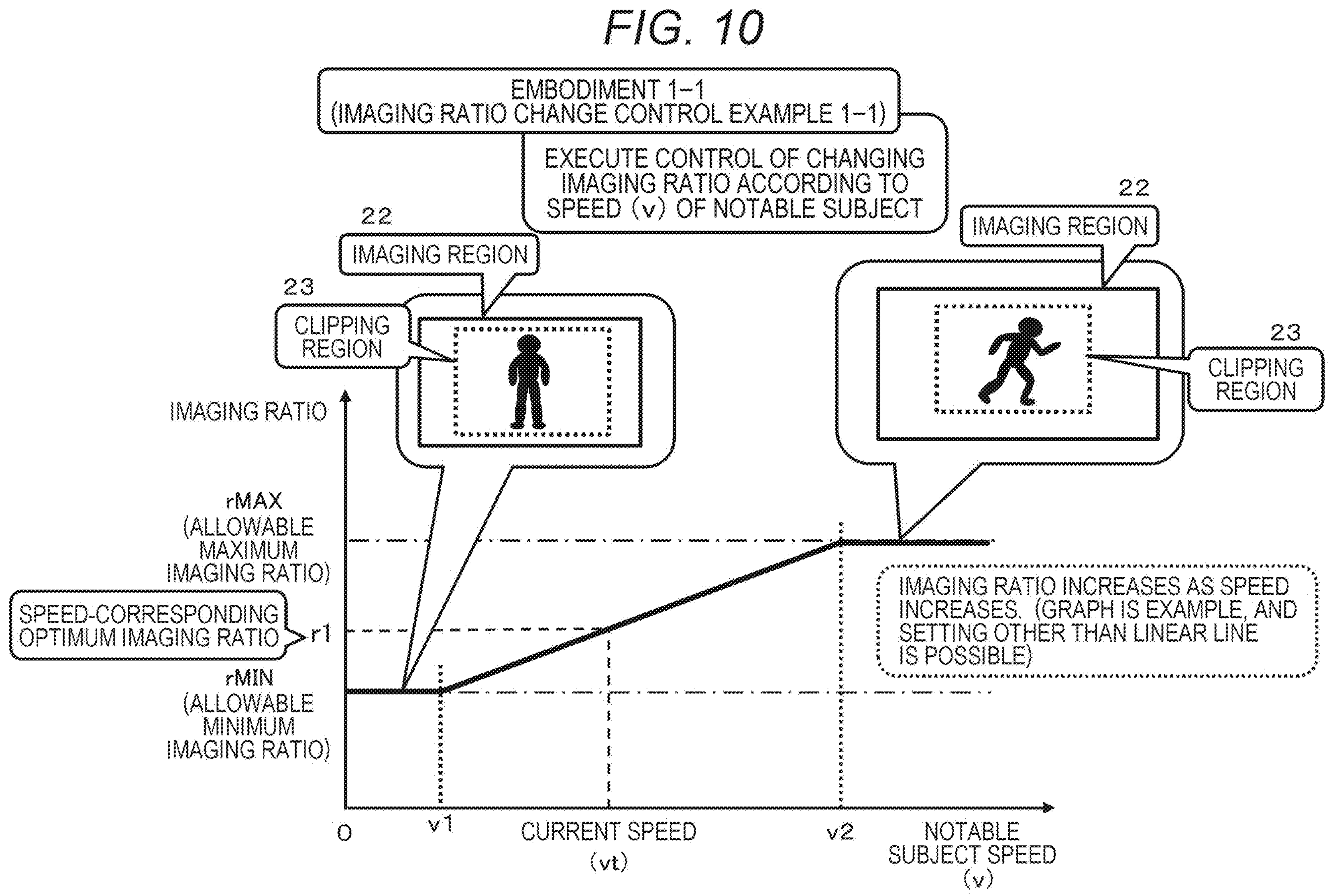
FIG. 10 is a diagram for explaining an embodiment of changing the imaging ratio according to the speed of the notable subject.

The graph illustrated in FIG. 10 is a graph in which the notable subject speed (v) is set on the horizontal axis and the imaging ratio is set on the vertical axis.

Note that the notable subject speed (v) on the horizontal axis is, for example, the speed in the captured image of the PTZ camera 10, and specifically, for example, is the number of moving pixels of the notable subject per unit time, for example, the number of moving pixels per second (pixel/s).

As described above with reference to FIGS. 7A and 7B and the like, the imaging ratio on the vertical axis is a ratio between the height H of the imaging region 22 corresponding to the entire region of the captured image 20 and the height h of the clipping region 23, imaging ratio=(imaging region size/clipping region size)=$H/h$.

The graph illustrated in FIG. 10 is a graph illustrating a change control example of the imaging ratio according to the speed (v) of the notable subject executed by the image processing apparatus of the present disclosure.

The image processing apparatus of the present disclosure changes the imaging ratio as follows according to the speed (v) of the notable subject as illustrated in the graph.

(a) At the speed (v) of the notable subject=0 to v1, the imaging ratio=rMIN (allowable minimum imaging ratio)

(b) At the speed (v) of the notable subject=v1 to v2, the imaging ratio is changed from rMIN (allowable minimum imaging ratio) to rMAX (allowable maximum imaging ratio) according to the speed (v) of the notable subject (c) At the speed (v) of the notable subject=v2~, the imaging ratio=rMAX (allowable maximum imaging ratio)

Note that (b) at the speed (v) of the notable subject=v1 to v2, in the example of the graph illustrated in the drawing, the imaging ratio is set to be linearly changed from rMIN (allowable minimum imaging ratio) to rMAX (allowable maximum imaging ratio), that is, the imaging ratio is set to be changed so as to be proportional to the change in the speed (v) of the notable subject, but this is an example, and for example, the imaging ratio may be increased according to a rising curve drawing a predetermined curve, or the imaging ratio may be changed so as to be exponentially increased with the increase in the speed (v) of the notable subject.

As illustrated in FIG. 10, (a) at the speed (v) of the notable subject=0 to v1, that is, in a case where the notable subject is stationary or the moving speed is less than a predetermined value, the imaging ratio is set to rMIN (allowable minimum imaging ratio), and the difference (ratio) of the size of the imaging region 22 to the size of the clipping region 23 is set to be smaller than the imaging ratio in a case where the speed (v) of the notable subject is greater than v1.

By this processing, the number of pixels of the clipping region 23 can be set larger, and deterioration in image quality of the clipping image can be reduced.

On the other hand, (c) at the speed (v) of the notable subject=v2~, that is, in a case where the moving speed of the notable subject is larger than the predetermined value, the imaging ratio is set to rMAX (allowable maximum imaging ratio), and the difference (ratio) of the size of the imaging region 22 to the size of the clipping region 23 is set to be larger than the imaging ratio in a case where the speed (v) of the notable subject is smaller than v2.

As a result, even in a case where the notable subject moves quickly, the possibility that the notable subject goes out of the capturing range can be reduced, and reliable follow-up processing of the notable subject can be performed.

Note that rMIN (allowable minimum imaging ratio) and rMAX (allowable maximum imaging ratio) illustrated in the graph are predefined ratios.

rMIN (allowable minimum imaging ratio) and rMAX (allowable maximum imaging ratio) may be predefined fixed values, but may be determined according to the state of the scene of the captured image, the setting of the clipping region, the allowable minimum number of pixels of the clipping region 23 (the preset allowable minimum number of pixels), or the like.

A specific example in which rMIN (allowable minimum imaging ratio) and rMAX (allowable maximum imaging ratio) are determined according to the state of the scene of the captured image, the setting of the clipping region, the allowable minimum number of pixels of the clipping region 23, or the like will be described with reference to FIGS. 11A, 11B, 11C, 11D, and 12.

First, rMIN (allowable minimum imaging ratio) will be described with reference to FIGS. 11A, 11B, 11C, and 11D.

rMIN (allowable minimum imaging ratio) is a value indicating a lower limit ratio of how small the imaging region can be set with respect to the clipping region 23.

This rMIN (allowable minimum imaging ratio) is determined in advance before the start of image capturing, but there are various determination processing examples as illustrated in FIGS. 11A, 11B, 11C, and 11D, for example, for the determination processing of this value.

Figures 11A, 11B, 11C, 11D:
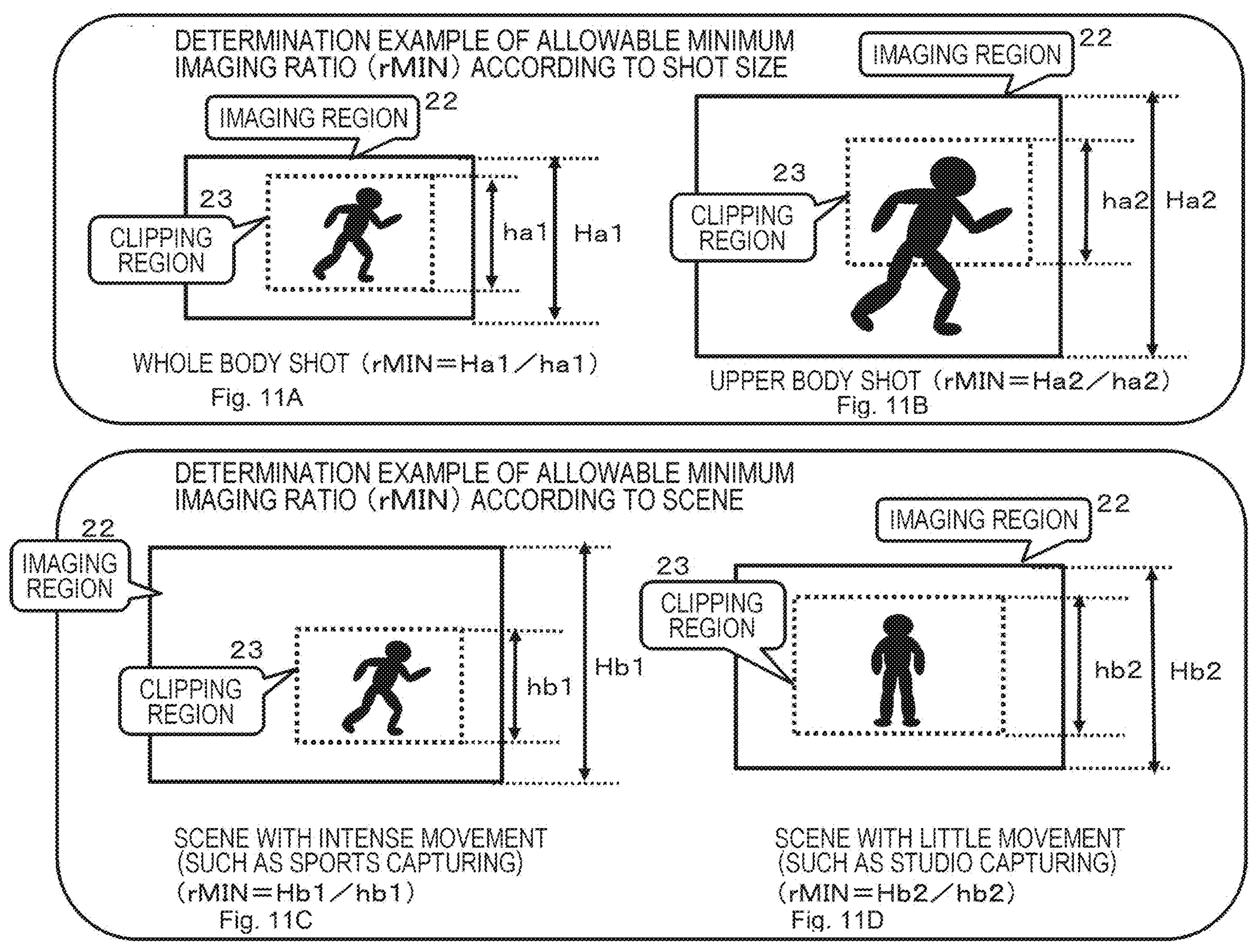
FIGS. 11A. 11B. 11C, and 11D are diagrams for explaining rMIN (allowable minimum imaging ratio).

FIGS. 11A and 11B are diagrams illustrating a determination example of rMIN (allowable minimum imaging ratio) according to the shot size of the notable subject, that is, the setting mode of the clipping region for the notable subject.

Note that the setting of the clipping region for the notable subject is also determined in advance before the start of image capturing.

For example, in a case where the setting of the clipping region for the notable subject is the setting of the whole body shot including the whole body of the notable subject as illustrated in FIG. 11A, rMIN (allowable minimum imaging ratio) is a ratio between the height Ha1 of the imaging region 22 and the height ha1 of the clipping region 23, $r$MIN (allowable minimum imaging ratio)$=Ha1/ha1$, and the value (ratio) of rMIN (allowable minimum imaging ratio) is set relatively small (as compared with the case of the shot setting including only a part of the notable subject).

On the other hand, in the case of the setting of the upper body shot including only the upper body of the notable subject as illustrated in FIG. 11B, rMIN (allowable minimum imaging ratio) is a ratio between the height Ha2 of the imaging region 22 and the height ha2 of the clipping region 23, $r$MIN (allowable minimum imaging ratio)$=Ha2/ha2$, and the value (ratio) of rMIN (allowable minimum imaging ratio) is relatively set to be large (as compared with the case of the shot setting including the region larger than the upper body of the notable subject).

In this manner, rMIN (allowable minimum imaging ratio) is changed by the shot size, that is, the size of the body region of the notable subject to be included in the clipping region on the captured image (the ratio of the body region to be included in the clipping region to the imaging region).

Furthermore, as illustrated in FIGS. 11C and 11D, rMIN (allowable minimum imaging ratio) may be determined according to the scene.

For example, FIG. 11C is a scene where the movement of the notable subject is intense (movement is large or movement amount is large).

In this case, rMIN (allowable minimum imaging ratio) is a ratio between the height Hb1 of the imaging region 22 and the height hb1 of the clipping region 23, $r$MIN (allowable minimum imaging ratio)$=Hb1/hb1$, and the value (ratio) of rMIN (allowable minimum imaging ratio) is relatively set to be large (as compared with the case of the scene in which the movement of the notable subject is smaller).

On the other hand, as illustrated in FIG. 11D, in a case of a scene where the movement of the notable subject is small, rMIN (allowable minimum imaging ratio) is a ratio between the height Hb2 of the imaging region 22 and the height hb2 of the clipping region 23, $r$MIN (allowable minimum imaging ratio)$=Hb2/hb2$, and the value (ratio) of rMIN (allowable minimum imaging ratio) is relatively set to be small (as compared with the case of a scene where the movement of the notable subject is larger).

In this manner, rMIN (allowable minimum imaging ratio) can be set to be changed according to the scene, that is, according to the movement of the notable subject.

Next, an example of rMAX (allowable maximum imaging ratio) illustrated in the graph of FIG. 10 will be described with reference to FIG. 12. rMAX (allowable maximum imaging ratio) is a value indicating an upper limit ratio of how large the imaging region can be set with respect to the clipping region 23.

For example, rMAX (allowable maximum imaging ratio) is determined according to an allowable value as the resolution of the clipping image clipped according to the clipping region 23, that is, the allowable minimum number of pixels included in the clipping region 23.

Figure 12:
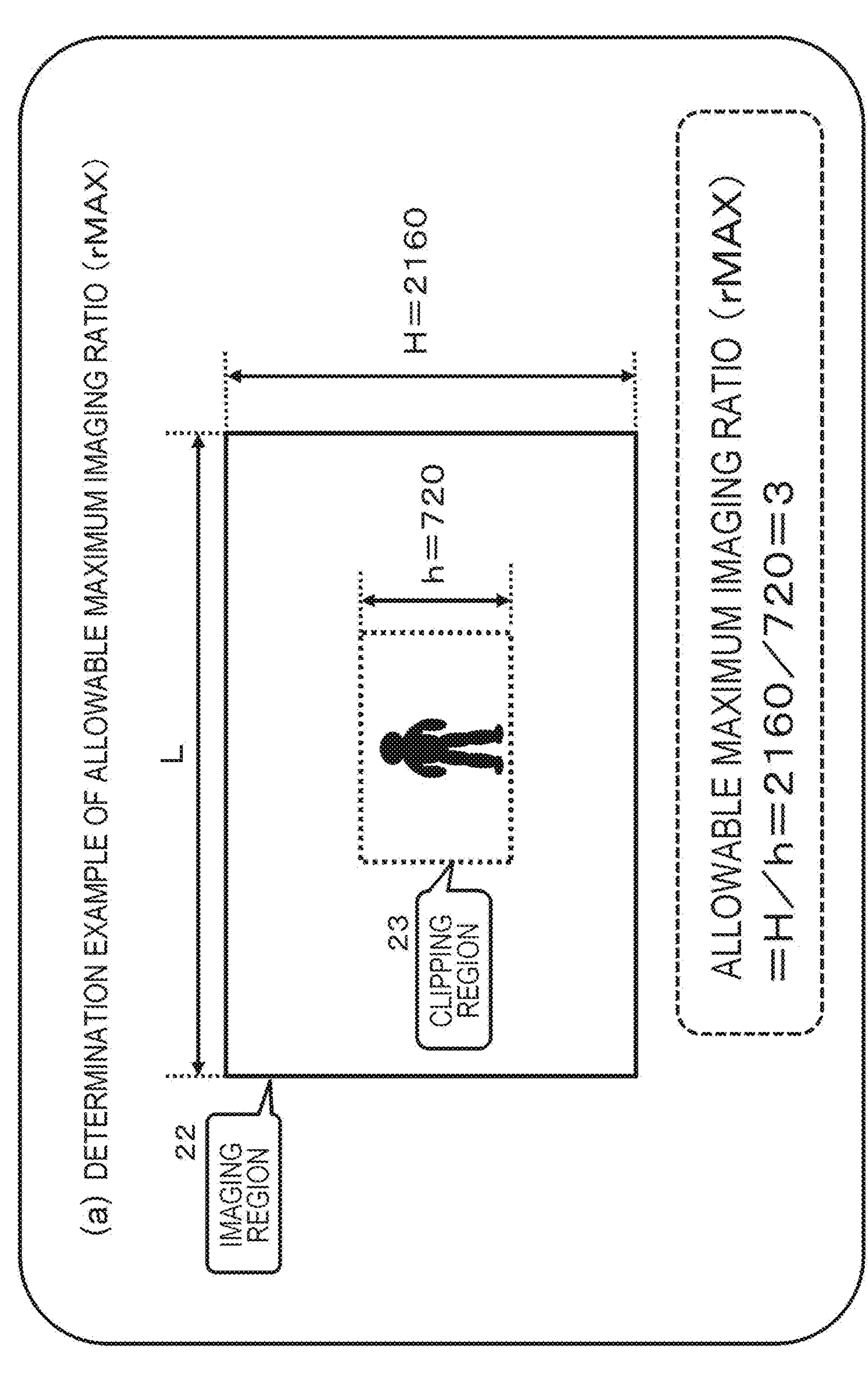
FIG. 12 is a diagram for explaining an example of rMAX (allowable maximum imaging ratio).

Specifically, as illustrated in FIG. 12, for example, in a case where the number of pixels (resolution) of the imaging region 22 corresponding to the entire captured image is 3840×2160, and the minimum number of pixels to be included in the clipping region 23, that is, the allowable minimum number of pixels is 1280×720, rMAX (allowable maximum imaging ratio) is calculated as follows.

$$
\begin{aligned}
rMAX \text{ (allowable maximum imaging ratio)} = \\
&\text{(the number of height pixels of the imaging region 22)/} \\
&\text{(the number of height pixels of the clipping region 23)} \\
&= 2160/720 \\
&= 3
\end{aligned}
$$

As described above, in a case where the number of pixels (resolution) of the imaging region 22 is 3840×2160 and the allowable minimum number of pixels of the clipping region 23 is 1280×720, $r$MAX (allowable maximum imaging ratio) is 3.

In this manner, rMAX (allowable maximum imaging ratio) is calculated according to the minimum number of pixels to be included in the clipping region 23, that is, the allowable minimum number of pixels.

Note that the determination example of rMIN (allowable minimum imaging ratio) and rMAX (allowable maximum imaging ratio) described with reference to FIGS. 11A, 11B, 11C, 11D, and 12 is an example, and the determination may be made using other methods. In addition, as described above, a predefined fixed value may be used.

Returning to FIG. 10, a change control example of the imaging ratio according to the speed (v) of the notable subject executed by the image processing apparatus of the present disclosure will be described again.

The image processing apparatus according to Embodiment 1-1 of the present disclosure changes the imaging ratio as follows according to the speed (v) of the notable subject as illustrated in the graph of FIG. 10.

(a) At the speed (v) of the notable subject=0 to v1, the imaging ratio=rMIN (allowable minimum imaging ratio)

(b) At the speed (v) of the notable subject=v1 to v2, the imaging ratio is changed from rMIN (allowable minimum imaging ratio) to rMAX (allowable maximum imaging ratio)

(c) At the speed (v) of the notable subject=v2~, the imaging ratio=rMAX (allowable maximum imaging ratio)

The external apparatus 30 causes the PTZ camera 10 to capture an image according to the imaging region size determined on the basis of the calculated optimum imaging ratio with the imaging ratio calculated from the graph illustrated in FIG. 10 as the optimum imaging ratio (imaging ratio for clipping image generation).

Note that the "optimum imaging ratio (imaging ratio for clipping image generation)" is an index value for reliably executing the clipping image generation processing including the notable subject as compared with the related art, and is an index value for setting the image quality of the clipping image including the notable subject to a predetermined image quality or higher.

For example, the speed (v) of the current notable subject 21 is the current speed (vt) illustrated in the graph of FIG. 10.

Using the graph illustrated in FIG. 10, the imaging ratio corresponding to the current speed (vt) of the notable subject 21 is calculated as the optimum imaging ratio. The optimum imaging ratio corresponding to the current speed (vt) of the notable subject 21 is the optimum imaging ratio (r1) illustrated in FIG. 10.

The external apparatus 30 causes the PTZ camera 10 to capture an image according to the imaging region size determined on the basis of the optimum imaging ratio (r1) calculated from the graph illustrated in FIG. 10.

Specifically, the PTZ camera 10 is caused to execute image capturing processing with the setting of the height H of the imaging region 22 (=the entire image region of the captured image 20) to $$H = r1 \times h.$$

Note that h is the height of the clipping region 23.

By causing the PTZ camera 10 to execute image capturing with such a setting, it is possible to more reliably clip the clipping region 23 including the notable subject 21 from the captured image 20 (imaging region 22) of the PTZ camera 10, and it is also possible to reduce deterioration in image quality of the clipping image.

In the present Embodiment 1-1, as illustrated in FIG. 10, (a) at the speed (v) of the notable subject=0 to v1, that is, in a case where the notable subject is stationary or the moving speed is less than a predetermined value, the imaging ratio is set to rMIN (allowable minimum imaging ratio), and the difference (ratio) of the size of the imaging region 22 to the size of the clipping region 23 is set to be smaller than that in a case where the moving speed of the notable subject is greater than a predetermined value.

By this processing, the number of pixels of the clipping region 23 can be set larger, and deterioration in image quality of the clipping image can be reduced.

On the other hand, (c) at the speed (v) of the notable subject=v2~, that is, in a case where the moving speed of the notable subject is larger than the predetermined value, the imaging ratio is set to rMAX (allowable maximum imaging ratio), and the difference (ratio) of the size of the imaging region 22 to the size of the clipping region 23 is set larger than that in a case where the moving speed of the notable subject is smaller than the predetermined value.

As a result, even in a case where the notable subject moves quickly, the possibility that the notable subject goes out of the capturing range can be reduced, and reliable follow-up processing of the notable subject can be performed.

(3-2. (Embodiment 1-2) Embodiment of Changing Imaging Ratio According to Acceleration of Notable Subject)

Next, an embodiment of changing the imaging ratio according to the acceleration of the notable subject will be described.

An embodiment of changing the imaging ratio according to the acceleration of the notable subject will be described with reference to FIG. 13.

The graph illustrated in FIG. 13 is a graph in which the notable subject acceleration (α) is set on the horizontal axis and the imaging ratio is set on the vertical axis.

Note that the notable subject acceleration (α) on the horizontal axis is, for example, acceleration in the image captured by the PTZ camera 10.

As described above with reference to FIGS. 7A and 7B and the like, the imaging ratio on the vertical axis is a ratio between the height H of the imaging region 22 corresponding to the entire region of the captured image 20 and the height h of the clipping region 23, $$\text{imaging ratio}=(\text{imaging region size}/\text{clipping region size})=H/h.$$

The graph illustrated in FIG. 13 is a graph illustrating a change control example of the imaging ratio according to the acceleration (α) of the notable subject executed by the image processing apparatus of the present disclosure.

The image processing apparatus of the present disclosure changes the imaging ratio as follows according to the acceleration (α) of the notable subject as illustrated in the graph.

(a) At the acceleration (α) of the notable subject=0 to α1, the imaging ratio=rMIN (allowable minimum imaging ratio)

(b) At the acceleration (α) of the notable subject=α1 to α2, the imaging ratio is changed from rMIN (allowable minimum imaging ratio) to rMAX (allowable maximum imaging ratio) according to the acceleration (α) of the notable subject (c) At the acceleration (α) of the notable subject=α2~, the imaging ratio=rMAX (allowable maximum imaging ratio)

Note that (b) at the acceleration (α) of the notable subject=α1 to α2, in the example of the graph illustrated in the drawing, the imaging ratio is set to be linearly changed from rMIN (allowable minimum imaging ratio) to rMAX (allowable maximum imaging ratio), that is, the imaging ratio is set to be changed so as to be proportional to the change in the acceleration (α) of the notable subject, but this is an example, and for example, the imaging ratio may be increased according to a rising curve drawing a predetermined curve, or the imaging ratio may be set to be changed so as to be exponentially increased with the increase in the acceleration (α) of the notable subject.

In the present Embodiment 1-2, the external apparatus 30 causes the PTZ camera 10 to capture an image according to the imaging region size determined on the basis of the calculated optimum imaging ratio with the imaging ratio calculated from the graph illustrated in FIG. 13 as the optimum imaging ratio (imaging ratio for clipping image generation).

For example, it is assumed that the acceleration (α) of the current notable subject 21 is the current acceleration (αt) illustrated in the graph illustrated in FIG. 13.

Using the graph illustrated in FIG. 13, the imaging ratio corresponding to the current acceleration (αt) of the notable subject 21 is calculated as the optimum imaging ratio. The optimum imaging ratio corresponding to the current acceleration (αt) of the notable subject 21 is the optimum imaging ratio (r2) illustrated in FIG. 13.

The external apparatus 30 causes the PTZ camera 10 to capture an image according to the imaging region size determined on the basis of the optimum imaging ratio (r2) calculated from the graph illustrated in FIG. 13.

Specifically, the PTZ camera 10 is caused to execute image capturing processing with the setting of the height H of the imaging region 22 (=the entire image region of the captured image 20) to $$H = r2 \times h.$$

Note that h is the height of the clipping region 23.

By causing the PTZ camera 10 to execute image capturing with such a setting, it is possible to more reliably clip the clipping region 23 including the notable subject 21 from the captured image 20 (imaging region 22) of the PTZ camera 10, and it is also possible to reduce deterioration in image quality of the clipping image.

As illustrated in FIG. 13, in the image processing apparatus of the present Embodiment 1-2, (α) at the acceleration (α) of the notable subject=0 to α1, that is, in a case where the notable subject is stationary or the acceleration is smaller than a predetermined value, the imaging ratio is set to rMIN (allowable minimum imaging ratio), and the difference (ratio) of the size of the imaging region 22 to the size of the clipping region 23 is set to be smaller than that in a case where the moving acceleration of the notable subject is larger than a predetermined value.

By this processing, the number of pixels of the clipping region 23 can be set larger, and deterioration in image quality of the clipping image can be reduced.

On the other hand, (c) in a case where the acceleration (α) of the notable subject=α2~, that is, the moving acceleration of the notable subject is larger than the predetermined value, the imaging ratio is set to rMAX (allowable maximum imaging ratio), and the difference (ratio) of the size of the imaging region 22 to the size of the clipping region 23 is set to be larger than that in a case where the moving acceleration of the notable subject is smaller than the predetermined value.

As a result, even in a case where the moving speed of the notable subject rapidly increases, the possibility that the notable subject goes out of the capturing range can be reduced, and reliable follow-up processing of the notable subject can be performed.

Note that, as described above, rMIN (allowable minimum imaging ratio) and rMAX (allowable maximum imaging ratio) illustrated in the graph are predefined ratios.

For example, rMIN (allowable minimum imaging ratio) and rMAX (allowable maximum imaging ratio) may be predefined fixed values. Alternatively, as described above with reference to FIGS. 11A, 11B, 11C, 11D, and 12, it may be determined according to the state of the scene of the captured image, the setting of the clipping region, the allowable minimum number of pixels of the clipping region 23, or the like.

(3-3. (Embodiment 1-3) Embodiment of Changing Imaging Ratio According to Speed and Acceleration of Notable Subject)

Next, an embodiment of changing the imaging ratio according to the speed and acceleration of the notable subject will be described.

An embodiment of changing the imaging ratio according to the speed and acceleration of the notable subject will be described with reference to FIG. 14.

This Embodiment 1-3 is an embodiment obtained by combining two embodiments of Embodiment 1-1 described above with reference to FIG. 10, that is, an embodiment of changing the imaging ratio according to the speed (v) of the notable subject, and Embodiment 1-2 described above with reference to FIG. 13, that is, an embodiment of changing the imaging ratio according to the acceleration (α) of the notable subject.

Figure 14:
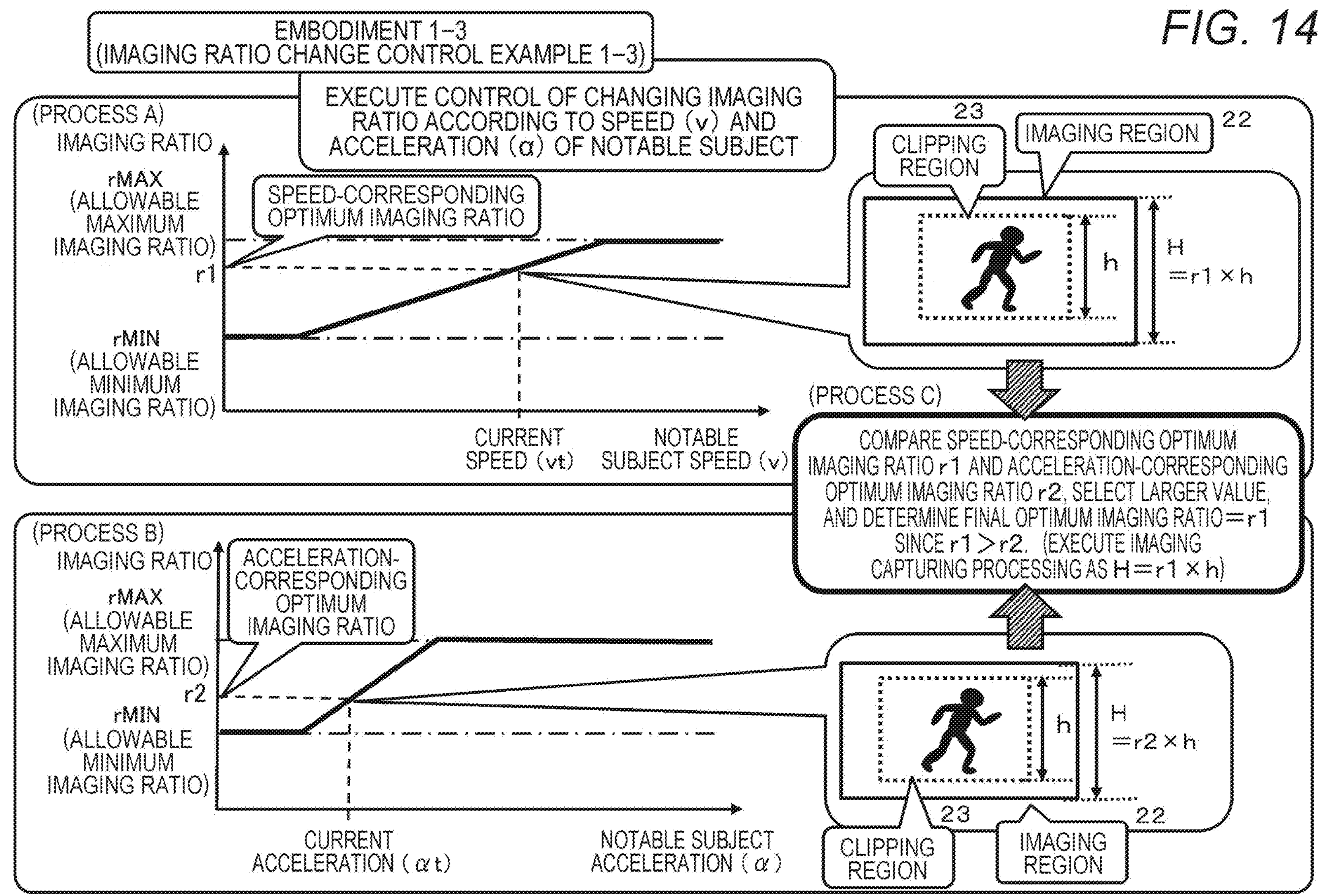
FIG. 14 is a diagram for explaining an embodiment of changing the imaging ratio according to the speed and acceleration of the notable subject.

FIG. 14 (Process A) illustrates a graph described in Embodiment 1-1 described above with reference to FIG. 10, that is, an embodiment of changing the imaging ratio according to the speed (v) of the notable subject. The graph is a graph in which the notable subject speed (v) is set on the horizontal axis and the imaging ratio is set on the vertical axis.

FIG. 14 (Process B) illustrates a graph described in Embodiment 1-2 described above with reference to FIG. 13, that is, an embodiment of changing the imaging ratio according to the acceleration (α) of the notable subject. The graph is a graph in which the notable subject acceleration (α) is set on the horizontal axis and the imaging ratio is set on the vertical axis.

In the present Embodiment 1-3, first, an optimum imaging ratio (an imaging ratio for clipping image generation) corresponding to the current speed (v) and acceleration (α) of the notable subject 21 is individually calculated using these two graphs.

First, as (Process A), the optimum imaging ratio (r1) corresponding to the current speed (vt) of the current notable subject 21 is acquired.

The speed (v) of the current notable subject 21 is defined as the current speed (vt) illustrated in the graph of FIG. 14 (Process A).

When the optimum imaging ratio corresponding to the current speed (vt) of the notable subject 21 is calculated using the graph illustrated in FIG. 14 (Process A), the optimum imaging ratio corresponding to the current speed (vt) of the notable subject 21 is the optimum imaging ratio (r1) illustrated in FIG. 14 (Process A).

Next, as (Process B), the optimum imaging ratio (r2) corresponding to the current acceleration (αt) of the current notable subject 21 is acquired.

The acceleration (α) of the current notable subject 21 is defined as the current acceleration (αt) illustrated in the graph of FIG. 14 (Process B).

When the optimum imaging ratio corresponding to the current acceleration (αt) of the notable subject 21 is calculated using the graph illustrated in FIG. 14 (Process B), the optimum imaging ratio corresponding to the current acceleration (αt) of the notable subject 21 is the optimum imaging ratio (r2) illustrated in FIG. 14 (Process B).

Next, (Process C) is executed.

In the (Process C), a process of comparing the speed-corresponding optimum imaging ratio r1 with the acceleration-corresponding optimum imaging ratio r2 and selecting a larger value as the final optimum imaging ratio is executed.

First, the speed-corresponding optimum imaging ratio r1 and the acceleration-corresponding optimum imaging ratio r2 are compared.

In the example illustrated in the drawing, $$r1>r2,$$

so a larger value, that is, the speed-corresponding optimum imaging ratio r1 is selected as the final optimum imaging ratio. That is, $$\text{final optimum imaging ratio}=r1.$$

The external apparatus 30 causes the PTZ camera 10 to capture an image according to the imaging region size calculated on the basis of the final optimum imaging ratio=r1.

Specifically, the image capturing processing is executed with the height H of the imaging region 22 (=the entire image region of the captured image 20) being $$H=r1\times h.$$

Note that h is the height of the clipping region 23.

By causing the PTZ camera 10 to execute image capturing with such a setting, it is possible to more reliably clip the clipping region 23 including the notable subject 21 from the captured image 20 (imaging region 22) of the PTZ camera 10, and it is also possible to reduce deterioration in image quality of the clipping image.

4. Sequence of Processing Executed by Image Processing Apparatus of Embodiment 1

Next, a sequence of processing executed by the above-described image processing apparatus according to Embodiment 1 of the present disclosure will be described.

Processing sequences of the following embodiments will be sequentially described.

- (Embodiment 1-1) Embodiment of changing imaging ratio according to speed of notable subject
- (Embodiment 1-2) Embodiment of changing imaging ratio according to acceleration of notable subject
- (Embodiment 1-3) Embodiment of changing imaging ratio according to speed and acceleration of notable subject Note that the image processing apparatus of the present disclosure is, for example, the external apparatus 30 or the PTZ camera 10 constituting the image processing system illustrated in FIG. 2.

As will be described later, the processing of the present disclosure can be executed by the PTZ camera 10 alone, or can be configured to be executed using a combination of the PTZ camera 10 and the external apparatus 30.

Hereinafter, as a representative processing example, as described with reference to FIG. 2, a processing example will be described in which the external apparatus 30 receives the captured image of the PTZ camera 10, the external apparatus 30 performs image analysis and image clipping processing, and controls (pan, tilt, and zoom drive) the PTZ camera 10.

Processing of the image processing apparatus described in the flowcharts of FIG. 15 and subsequent drawings will be described on the assumption that the processing is executed by the external apparatus 30. However, as described above, it can also be executed in the PTZ camera 10.

First, referring to the flowchart illustrated in FIG. 15,

(Embodiment 1-1) Embodiment of Changing Imaging Ratio According to Speed of Notable Subject a sequence of processing executed by the image processing apparatus (external apparatus 30) according to this Embodiment 1-1 will be described.

Note that the processing according to the flow described below can be executed according to a program stored in the storage unit of the image processing apparatus, for example, and is executed under the control of a control unit having a program execution function such as a CPU. Hereinafter, details of the processing of each step of the flow illustrated in FIG. 15 will be sequentially described.

(Step S101)

First, in step S101, the image processing apparatus of the present disclosure calculates the speed (v) of the notable subject 21.

The image processing apparatus, that is, the external apparatus 30 illustrated in FIG. 2 receives the captured image (moving image) from the PTZ camera 10, and calculates the speed (v) of the notable subject by analyzing a change in the position of the notable subject 21 on the captured image in each image frame constituting the moving image.

Specifically, for example, the number of moving pixels of the notable subject per unit time, for example, the number of moving pixels per second (pixel/s) is calculated.

(Step S102)

Next, in step S102, the image processing apparatus according to the present disclosure calculates an optimum imaging ratio (an imaging ratio for clipping image generation) corresponding to the speed (v) of the current notable subject calculated in step S101 on the basis of the speed-imaging ratio correspondence data.

This processing is the processing described above with reference to FIG. 10. The speed-imaging ratio correspondence data is a graph illustrated in FIG. 10. As described with reference to FIG. 10, the speed-imaging ratio correspondence data is a graph in which the optimum imaging ratio is defined as follows according to the speed (v) of the notable subject.

- (a) At the speed (v) of the notable subject=0 to v1, the optimum imaging ratio=rMIN (allowable minimum imaging ratio)
- (b) At the speed (v) of the notable subject=v1 to v2, the optimum imaging ratio is changed from rMIN (allowable minimum imaging ratio) to rMAX (allowable maximum imaging ratio) according to the speed (v) of the notable subject.
- (c) At the speed (v) of the notable subject=v2~, the optimum imaging ratio=rMAX (allowable maximum imaging ratio)

Using the graph illustrated in FIG. 10, the imaging ratio corresponding to the current speed (v) of the notable subject 21 is calculated as the optimum imaging ratio. For example, in the example illustrated in FIG. 10, the optimum imaging ratio corresponding to the current speed (vt) of the notable subject 21 is the optimum imaging ratio (r1) illustrated in FIG. 10.

Note that the optimum imaging ratio calculated in step S102 is a value in a range from rMIN (allowable minimum imaging ratio) to rMAX (allowable maximum imaging ratio) in the graph illustrated in FIG. 10.

(Step S103)

Next, in step S103, the image processing apparatus determines whether or not a difference (ratio) between the optimum imaging ratio calculated in step S102 and the current imaging ratio is less than a specified threshold value.

In a case where the difference (ratio) between the optimum imaging ratio calculated in step S102 and the current imaging ratio is less than the specified threshold value, the determination in step S103 is Yes, and it is determined in step S107 whether or not the capturing is ended. In a case where the capturing is not ended, the process proceeds to processing of the next processing frame without performing zoom control of the camera (PTZ camera 10).

This is processing for avoiding that, if the zoom control is performed until the difference (ratio) between the optimum imaging ratio calculated in step S102 and the current imaging ratio is smaller than the specified threshold value, detailed control is frequently executed for each image frame, and the captured image becomes unstable.

As described above, in a case where the difference (ratio) between the optimum imaging ratio calculated in step S102 and the current imaging ratio is smaller than the specified threshold value, the determination processing in step S103 is performed in order to continue stable image capturing without performing control.

On the other hand, in a case where the difference (ratio) between the optimum imaging ratio calculated in step S102 and the current imaging ratio is equal to or larger than the specified threshold value, the determination in step S103 is No, and the process proceeds to step S104.

Note that, as the specified threshold value, a value defined in advance in the image processing apparatus is used. For example, it is possible to perform processing of determining whether or not to perform zoom control on the basis of whether or not a difference (ratio) between the optimum imaging ratio calculated in step S102 and the current imaging ratio is smaller than a specified threshold value (for example, 5%) by setting a specified threshold value to around 58 in advance. For example, in a case where the specified threshold value is 5%, the optimum imaging ratio calculated in step S102 is 2.2 times (220%), and the current imaging ratio is 2.0 times (200%), the difference between the calculated optimum imaging ratio and the current imaging ratio is 0.1 (10%), which is larger than the specified threshold value of 5%, and thus zoom control is performed.

In other words, in a case where the following (Formula 1) is satisfied, the zoom control is not performed.

$$\text{Current imaging ratio-specified threshold value} < \text{calculated optimum imaging ratio} < \text{current imaging ratio+specified threshold value} \quad \text{(Formula 1)}$$

On the other hand, in a case where the following (Formula 2) or (Formula 3) is satisfied, zoom control is performed.

$$\text{Calculated optimum imaging ratio} \geq \text{current imaging ratio+specified threshold value} \quad \text{(Formula 2)}$$

$$\text{Calculated optimum imaging ratio} \leq \text{current imaging ratio-specified threshold value} \quad \text{(Formula 3)}$$

(Step S104)

In step S103, in a case where the difference (ratio) between the optimum imaging ratio calculated in step S102 and the current imaging ratio is equal to or larger than the specified threshold value, the process proceeds to step S104.

In this case, in step S104, the image processing apparatus determines whether the optimum imaging ratio calculated in step S102 is larger or smaller than the current imaging ratio.

In a case where the optimum imaging ratio is larger than the current imaging ratio, the process proceeds to step S105.

On the other hand, in a case where the optimum imaging ratio is smaller than the current imaging ratio, the process proceeds to step S106.

(Step S105)

In a case where it is determined in step S104 that the optimum imaging ratio calculated in step S102 is larger than the current imaging ratio, the process proceeds to step S105, and the following processing is executed.

In this case, in step S105, the image processing apparatus executes processing of widening the angle of view by adjusting the zoom (angle of view) of the camera in order to increase the current imaging ratio to the optimum imaging ratio.

Specifically, for example, in the system configuration illustrated in FIG. 2, the external apparatus 30 outputs a camera drive instruction to the PTZ camera 10 to adjust the zoom (angle of view) of the camera to widen the angle of view in order to increase the current imaging ratio to the optimum imaging ratio.

This processing corresponds to, for example, the processing described above with reference to FIG. 8.

That is, the processing corresponds to processing of changing the zoom (angle of view) state before the imaging ratio change illustrated in FIG. 8 (*a*) to the zoom (angle of view) state after the imaging ratio change illustrated in FIG. 8 (*b*).

The captured image b and the capturing region 20*b* after the change in the imaging ratio in FIG. 8 (*b*) are images captured with a setting having a wider angle of view than the captured image a and the capturing region 20*a* before the change in the imaging ratio in FIG. 8 (*a*).

As described above, in a case where it is determined that the optimum imaging ratio calculated in step S102 is larger than the current imaging ratio, in step S105, the zoom of the PTZ camera 10 is adjusted to perform setting for widening the capturing range, that is, processing for widening the angle of view is executed.

(Step S106)

On the other hand, in a case where it is determined in step S104 that the optimum imaging ratio calculated in step S102 is smaller than the current imaging ratio, the process proceeds to step S106, and the following processing is executed.

In this case, in step S106, the image processing apparatus executes processing of narrowing the angle of view by adjusting the zoom (angle of view) of the camera in order to reduce the current imaging ratio to the optimum imaging ratio.

Specifically, for example, in the system configuration illustrated in FIG. 2, the external apparatus 30 outputs a camera drive instruction to the PTZ camera 10 to narrow the angle of view by adjusting the zoom (angle of view) of the camera in order to reduce the current imaging ratio to the optimum imaging ratio.

This processing corresponds to, for example, the processing described above with reference to FIG. 9.

That is, the processing corresponds to processing of changing the zoom (angle of view) state before the imaging ratio change illustrated in FIG. 9 (*a*) to the zoom (angle of view) state after the imaging ratio change illustrated in FIG. 9 (*b*).

The captured image b and the capturing region 20*b* after the change in the imaging ratio in FIG. 9 (*b*) are images captured with a setting having a narrower angle of view than the captured image a and the capturing region 20*a* before the change in the imaging ratio in FIG. 9 (*a*).

As described above, in a case where it is determined that the optimum imaging ratio calculated in step S102 is smaller than the current imaging ratio, in step S106, the zoom of the PTZ camera 10 is adjusted to perform setting for narrowing the capturing range, that is, processing for narrowing the angle of view.

(Step S107)

After the processing of step S105 and step S106, the process proceeds to step S107, and in step S107, it is determined whether or not the capturing processing is ended.

In a case where the capturing processing is not finished, the process returns to step S101, and the processing for the next captured image frame is executed.

In a case where the capturing processing is ended, the process is ended.

By executing these processes, it is possible to increase the success probability of the process of clipping the clipping region including the notable subject from the captured image of the PTZ camera 10, and to reduce the degradation in image quality of the clipping image.

Next, referring to the flowchart illustrated in FIG. 16, (Embodiment 1-2) Embodiment of Changing Imaging Ratio According to Acceleration of Notable Subject a sequence of processing executed by the image processing apparatus (external apparatus 30) according to this Embodiment 1-2 will be described.

(Step S121)

First, in step S121, the image processing apparatus of the present disclosure calculates the acceleration (α) of the notable subject 21.

The image processing apparatus, that is, the external apparatus 30 illustrated in FIG. 2 receives the captured image (moving image) from the PTZ camera 10, and calculates the acceleration (α) of the notable subject by analyzing the change in the position of the notable subject 21 on the captured image in each image frame constituting the moving image.

(Step S122)

Next, in step S122, the image processing apparatus of the present disclosure calculates an optimum imaging ratio (an imaging ratio for clipping image generation) corresponding to the acceleration (α) of the current notable subject calculated in step S121 on the basis of the acceleration-imaging ratio correspondence data.

This processing is the processing described above with reference to FIG. 13. The acceleration-imaging ratio correspondence data is a graph illustrated in FIG. 13. As described with reference to FIG. 13, the acceleration-imaging ratio correspondence data is a graph in which the optimum imaging ratio is defined as follows according to the acceleration (α) of the notable subject.

(a) At the acceleration (α) of the notable subject=0 to α1, the optimum imaging ratio=rMIN (allowable minimum imaging ratio)

(b) At the acceleration (α) of the notable subject=α1 to α2, the optimum imaging ratio is changed from rMIN (allowable minimum imaging ratio) to rMAX (allowable maximum imaging ratio) according to the acceleration (α) of the notable subject.

(c) At the acceleration (α) of the notable subject=α2~, the optimum imaging ratio=rMAX (allowable maximum imaging ratio)

Using the graph illustrated in FIG. 13, the imaging ratio corresponding to the current acceleration (α) of the notable subject 21 is calculated as the optimum imaging ratio. For example, in the example illustrated in FIG. 13, the optimum imaging ratio corresponding to the current acceleration (αt) of the notable subject 21 is the optimum imaging ratio (r2) illustrated in FIG. 13.

Note that the optimum imaging ratio calculated in step S122 is a value in a range from rMIN (allowable minimum imaging ratio) to rMAX (allowable maximum imaging ratio) in the graph illustrated in FIG. 10.

(Step S123)

Next, in step S123, the image processing apparatus determines whether or not a difference (ratio) between the optimum imaging ratio calculated in step S122 and the current imaging ratio is less than a specified threshold value.

In a case where the difference (ratio) between the optimum imaging ratio calculated in step S122 and the current imaging ratio is less than the specified threshold value, the determination in step S123 is Yes, and it is determined in step S127 whether or not the capturing is ended. In a case where the capturing is not ended, the process proceeds to processing of the next processing frame without performing zoom control of the camera (PTZ camera 10).

This is processing for avoiding that, if the zoom control is performed until the difference (ratio) between the optimum imaging ratio calculated in step S122 and the current imaging ratio is smaller than the specified threshold value, detailed control is frequently executed for each image frame, and the captured image becomes unstable.

As described above, in a case where the difference (ratio) between the optimum imaging ratio calculated in step S122 and the current imaging ratio is smaller than the specified threshold value, the determination processing in step S123 is performed in order to continue stable image capturing without performing control.

On the other hand, in a case where the difference (ratio) between the optimum imaging ratio calculated in step S122 and the current imaging ratio is equal to or larger than the specified threshold value, the determination in step S123 is No, and the process proceeds to step S124.

Note that, as the specified threshold value, a value defined in advance in the image processing apparatus is used. For example, it is possible to perform processing of determining a difference (ratio) between the optimum imaging ratio calculated in step S122 and the current imaging ratio by using a value of about 5% of the current imaging ratio.

That is, processing of determining whether or not to perform zoom control is performed on the basis of whether or not a difference (ratio) between the optimum imaging ratio calculated in step S122 and the current imaging ratio is smaller than a specified threshold value (for example, 5%).

(Step S124)

In step S123, in a case where the difference (ratio) between the optimum imaging ratio calculated in step S122 and the current imaging ratio is equal to or larger than the specified threshold value, the process proceeds to step S124.

In this case, in step S124, the image processing apparatus determines whether the optimum imaging ratio calculated in step S122 is larger or smaller than the current imaging ratio.

In a case where the optimum imaging ratio is larger than the current imaging ratio, the process proceeds to step S125.

On the other hand, in a case where the optimum imaging ratio is smaller than the current imaging ratio, the process proceeds to step S126.

(Step S125)

In a case where it is determined in step S124 that the optimum imaging ratio calculated in step S122 is larger than the current imaging ratio, the process proceeds to step S125, and the following processing is executed.

In this case, in step S125, the image processing apparatus executes processing of widening the angle of view by adjusting the zoom (angle of view) of the camera in order to increase the current imaging ratio to the optimum imaging ratio.

Specifically, for example, in the system configuration illustrated in FIG. 2, the external apparatus 30 outputs a camera drive instruction to the PTZ camera 10 to adjust the zoom (angle of view) of the camera to widen the angle of view in order to increase the current imaging ratio to the optimum imaging ratio.

This processing corresponds to, for example, the processing described above with reference to FIG. 8.

That is, the processing corresponds to processing of changing the zoom (angle of view) state before the imaging ratio change illustrated in FIG. 8 (*a*) to the zoom (angle of view) state after the imaging ratio change illustrated in FIG. 8 (*b*).

The captured image b and the capturing region 20*b* after the change in the imaging ratio in FIG. 8 (*b*) are images captured with a setting having a wider angle of view than the captured image a and the capturing region 20*a* before the change in the imaging ratio in FIG. 8 (*a*).

As described above, in a case where it is determined that the optimum imaging ratio calculated in step S122 is larger than the current imaging ratio, in step S125, the zoom of the PTZ camera 10 is adjusted to perform setting for widening the capturing range, that is, processing for widening the angle of view is executed.

(Step S126)

On the other hand, in a case where it is determined in step S124 that the optimum imaging ratio calculated in step S122 is smaller than the current imaging ratio, the process proceeds to step S126, and the following processing is executed.

In this case, in step S126, the image processing apparatus executes processing of narrowing the angle of view by adjusting the zoom (angle of view) of the camera in order to reduce the current imaging ratio to the optimum imaging ratio.

Specifically, for example, in the system configuration illustrated in FIG. 2, the external apparatus 30 outputs a camera drive instruction to the PTZ camera 10 to narrow the angle of view by adjusting the zoom (angle of view) of the camera in order to reduce the current imaging ratio to the optimum imaging ratio.

This processing corresponds to, for example, the processing described above with reference to FIG. 9.

That is, the processing corresponds to processing of changing the zoom (angle of view) state before the imaging ratio change illustrated in FIG. 9 (*a*) to the zoom (angle of view) state after the imaging ratio change illustrated in FIG. 9 (*b*).

The captured image b and the capturing region 20*b* after the change in the imaging ratio in FIG. 9 (*b*) are images captured with a setting having a narrower angle of view than the captured image a and the capturing region 20*a* before the change in the imaging ratio in FIG. 9 (*a*).

As described above, in a case where it is determined that the optimum imaging ratio calculated in step S122 is smaller than the current imaging ratio, in step S126, the zoom of the PTZ camera 10 is adjusted to perform setting for narrowing the capturing range, that is, processing for narrowing the angle of view.

(Step S127)

After the processing of step S125 and step S126, the process proceeds to step S127, and in step S127, it is determined whether or not the capturing processing is ended.

In a case where the capturing processing is not finished, the process returns to step S121, and the processing for the next captured image frame is executed.

In a case where the capturing processing is ended, the process is ended.

By executing these processes, it is possible to increase the success probability of the process of clipping the clipping region including the notable subject from the captured image of the PTZ camera 10, and to reduce the degradation in image quality of the clipping image.

Figure 17:
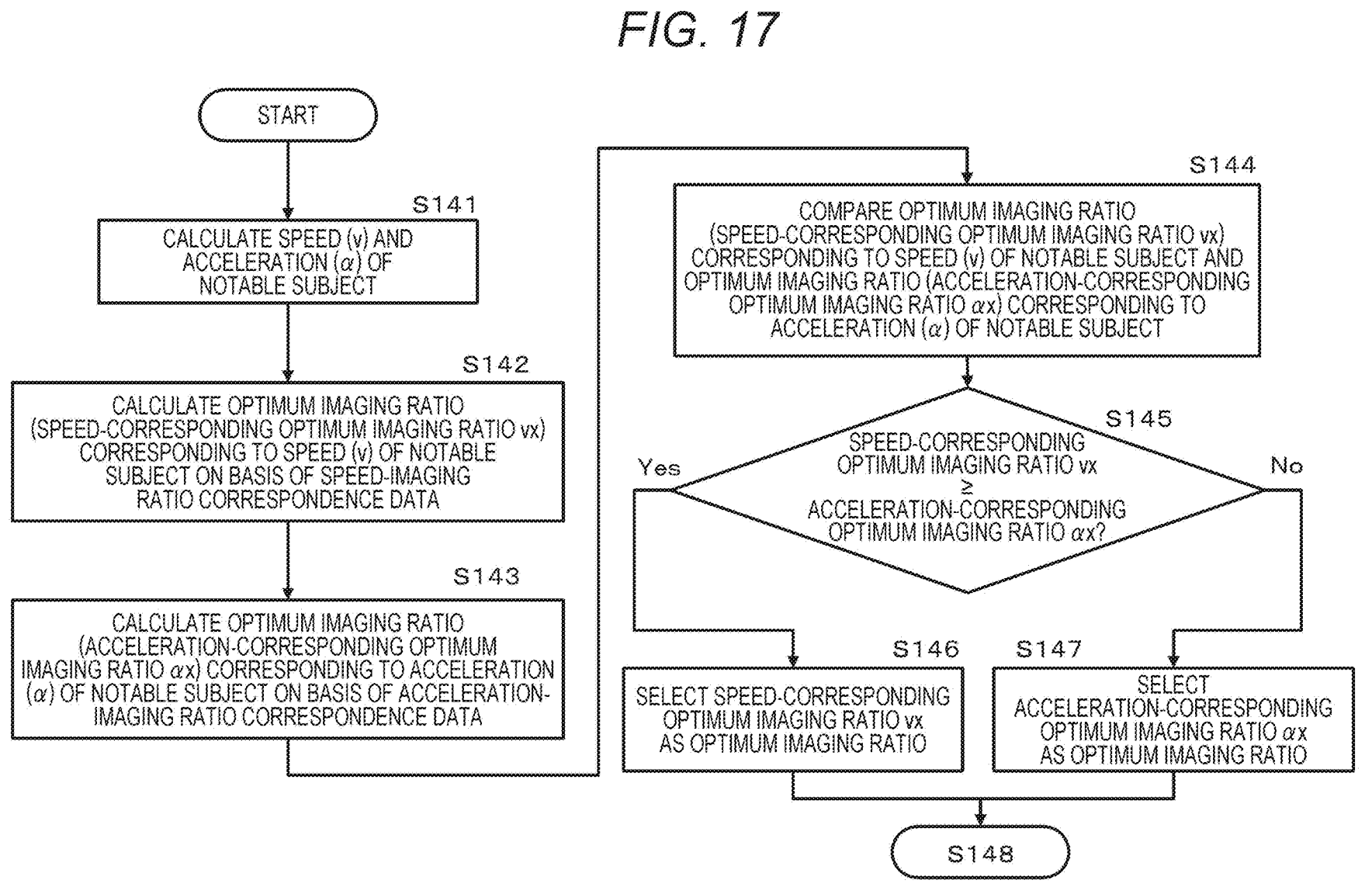

Next, referring now to the flowcharts illustrated in FIGS. 17 and 18, (Embodiment 1-3) Embodiment of Changing Imaging Ratio According to Speed and Acceleration of Notable Subject a sequence of processing executed by the image processing apparatus (external apparatus 30) according to this Embodiment 1-3 will be described.

(Step S141)

First, in step S141, the image processing apparatus of the present disclosure calculates the speed (v) and the acceleration (α) of the notable subject 21.

The image processing apparatus, that is, the external apparatus 30 illustrated in FIG. 2 receives the captured image (moving image) from the PTZ camera 10, and calculates the speed (v) and the acceleration (α) of the notable subject by analyzing the position change of the notable subject 21 in each image frame constituting the moving image.

(Step S142)

Next, in step S142, the image processing apparatus of the present disclosure calculates a speed-corresponding optimum imaging ratio that is an optimum imaging ratio corresponding to the current speed (v) of the notable subject calculated in step S141, on the basis of the speed-imaging ratio correspondence data.

This processing is the processing described above with reference to FIG. 14 (Process A). The speed-imaging ratio correspondence data is a graph illustrated in FIG. 14 (Process A).

Using the graph illustrated in FIG. 14 (Process A), the imaging ratio corresponding to the current speed of the notable subject 21 is calculated as the speed-corresponding optimum imaging ratio. For example, in the example illustrated in FIG. 14 (Process A), the optimum imaging ratio corresponding to the current speed (vt) of the notable subject 21 is the speed-corresponding optimum imaging ratio (r1) illustrated in FIG. 14 (Process A).

(Step S143)

Next, in step S143, the image processing apparatus according to the present disclosure calculates an acceleration-corresponding optimum imaging ratio that is an optimum imaging ratio corresponding to the acceleration (α) of the current notable subject calculated in step S141, on the basis of the acceleration-imaging ratio correspondence data.

This processing is the processing described above with reference to FIG. 14 (Process B). The acceleration-imaging ratio correspondence data is a graph illustrated in FIG. 14 (Process B).

Using the graph illustrated in FIG. 14 (Process B), the imaging ratio corresponding to the current acceleration of the notable subject 21 is calculated as the acceleration-corresponding optimum imaging ratio. For example, in the example illustrated in FIG. 14 (Process B), the optimum imaging ratio corresponding to the current acceleration (αt) of the notable subject 21 is the acceleration-corresponding optimum imaging ratio (r2) illustrated in FIG. 14 (Process B).

(Steps S144 to S145)

Next, in step S144, the image processing apparatus compares the optimum imaging ratio (speed-corresponding optimum imaging ratio vx) corresponding to the speed (v) of the notable subject with the optimum imaging ratio (acceleration-corresponding optimum imaging ratio ax) corresponding to the acceleration (α) of the notable subject.

This processing corresponds to the processing of FIG. 14 (Process C) described above.

In a case where it is determined in step S145 that the speed-corresponding optimum imaging ratio vx of the notable subject is equal to or greater than the acceleration-corresponding optimum imaging ratio xx, the process proceeds to step S146.

On the other hand, in a case where it is determined that the speed-corresponding optimum imaging ratio vx of the notable subject is less than the acceleration-corresponding optimum imaging ratio xx, the process proceeds to step S147.

(Step S146)

In a case where it is determined in step S145 that the speed-corresponding optimum imaging ratio vx of the notable subject is equal to or greater than the acceleration-corresponding optimum imaging ratio ox, the process proceeds to step S146.

In this case, the image processing apparatus selects the speed-corresponding optimum imaging ratio vx of the notable subject, which is a larger value, as the final optimum imaging ratio.

(Step S147)

On the other hand, in a case where it is determined in step S145 that the speed-corresponding optimum imaging ratio vx of the notable subject is less than the acceleration-corresponding optimum imaging ratio αx, the process proceeds to step S147.

In this case, the image processing apparatus selects the acceleration-corresponding optimum imaging ratio ax of the notable subject, which is a larger value, as the final optimum imaging ratio.

(Step S148)

Next, in step S148, the image processing apparatus determines whether or not a difference (ratio) between the final optimum imaging ratio selected in step S146 or step S147 and the current imaging ratio is less than a specified threshold value.

In a case where the difference (ratio) between the final optimum imaging ratio selected in step S146 or step S147 and the current imaging ratio is less than the specified threshold value, the determination in step S148 is Yes, and it is determined in step S153 whether or not the capturing is ended. In a case where the capturing is not ended, the process proceeds to processing of the next processing frame without performing zoom control of the camera (PTZ camera 10).

This is processing for avoiding that, if the zoom control is performed until the difference (ratio) between the optimum imaging ratio and the current imaging ratio is smaller than the specified threshold value, detailed control is frequently executed for each image frame, and the captured image becomes unstable.

As described above, in a case where the difference (ratio) between the optimum imaging ratio and the current imaging ratio is smaller than the specified threshold value, the determination processing in step S148 is performed in order to continue stable image capturing without performing control.

On the other hand, in a case where the difference (ratio) between the final optimum imaging ratio selected in step S146 or step S147 and the current imaging ratio is equal to or larger than the specified threshold value, the determination in step S148 is No, and the process proceeds to step S149.

Note that, as the specified threshold value, a value defined in advance in the image processing apparatus is used. For example, it is possible to perform processing of determining a difference (ratio) between the final optimum imaging ratio selected in step S146 or step S147 and the current imaging ratio by using a value of about 5% of the current imaging ratio.

That is, processing of determining whether or not to perform zoom control is performed on the basis of whether or not a difference (ratio) between the final optimum imaging ratio selected in step S146 or step S147 and the current imaging ratio is smaller than a specified threshold value (for example, 5%).

(Step S149)

In step S148, in a case where the difference (ratio) between the final optimum imaging ratio selected in step S146 or step S147 and the current imaging ratio is equal to or larger than the specified threshold value, the process proceeds to step S149.

In this case, in step S149, the image processing apparatus determines whether the final optimum imaging ratio selected in step S146 or step S147 is larger or smaller than the current imaging ratio.

In a case where the optimum imaging ratio is larger than the current imaging ratio, the process proceeds to step S151.

On the other hand, in a case where the optimum imaging ratio is smaller than the current imaging ratio, the process proceeds to step S152.

(Step S151)

In a case where it is determined in step S146 or step S147 that the selected final optimum imaging ratio is larger than the current imaging ratio, the process proceeds to step S151, and the following processing is executed.

In this case, in step S151, the image processing apparatus executes processing of widening the angle of view by adjusting the zoom (angle of view) of the camera in order to increase the current imaging ratio to the optimum imaging ratio.

Specifically, for example, in the system configuration illustrated in FIG. 2, the external apparatus 30 outputs a camera drive instruction to the PTZ camera 10 to adjust the zoom (angle of view) of the camera to widen the angle of view in order to increase the current imaging ratio to the optimum imaging ratio.

This processing corresponds to, for example, the processing described above with reference to FIG. 8.

That is, the processing corresponds to processing of changing the zoom (angle of view) state before the imaging ratio change illustrated in FIG. 8 (*a*) to the zoom (angle of view) state after the imaging ratio change illustrated in FIG. 8 (*b*).

The captured image b and the capturing region 20*b* after the change in the imaging ratio in FIG. 8 (*b*) are images captured with a setting having a wider angle of view than the captured image a and the capturing region 20*a* before the change in the imaging ratio in FIG. 8 (*a*).

As described above, in a case where it is determined in step S146 or step S147 that the selected final optimum imaging ratio is larger than the current imaging ratio, in step S125, the zoom of the PTZ camera 10 is adjusted to perform setting for widening the capturing range, that is, processing for widening the angle of view is executed.

(Step S152)

On the other hand, in a case where it is determined in step S146 or step S147 that the selected final optimum imaging ratio is smaller than the current imaging ratio, the process proceeds to step S152, and the following processing is executed.

In this case, in step S152, the image processing apparatus executes processing of narrowing the angle of view by adjusting the zoom (angle of view) of the camera in order to reduce the current imaging ratio to the optimum imaging ratio.

Specifically, for example, in the system configuration illustrated in FIG. 2, the external apparatus 30 outputs a camera drive instruction to the PTZ camera 10 to narrow the angle of view by adjusting the zoom (angle of view) of the camera in order to reduce the current imaging ratio to the optimum imaging ratio.

This processing corresponds to, for example, the processing described above with reference to FIG. 9.

That is, the processing corresponds to processing of changing the zoom (angle of view) state before the imaging ratio change illustrated in FIG. 9 (*a*) to the zoom (angle of view) state after the imaging ratio change illustrated in FIG. 9 (*b*).

The captured image b and the capturing region 20*b* after the change in the imaging ratio in FIG. 9 (*b*) are images captured with a setting having a narrower angle of view than the captured image a and the capturing region 20*a* before the change in the imaging ratio in FIG. 9 (*a*).

As described above, in a case where it is determined in step S146 or step S147 that the selected final optimum imaging ratio is smaller than the current imaging ratio, in step S152, the zoom control parameter of the PTZ camera 10 is adjusted to perform setting to narrow the capturing range, that is, processing to narrow the angle of view.

(Step S153)

After the processing of step S151 and step S152, the process proceeds to step S153, and in step S153, it is determined whether or not the capturing processing is ended.

In a case where the capturing processing is not finished, the process returns to step S141, and the processing for the next captured image frame is executed.

In a case where the capturing processing is ended, the process is ended.

By executing these processes, it is possible to increase the success probability of the process of clipping the clipping region including the notable subject from the captured image of the PTZ camera 10, and to reduce the degradation in image quality of the clipping image.

5. (Embodiment 2) Embodiment of Changing Imaging Ratio According to Communication Delay Time Between Camera and External Apparatus Next, as (Embodiment 2), an embodiment of changing the imaging ratio according to the communication delay time between the camera and the external apparatus will be described.

As described above with reference to FIG. 5, when a communication delay occurs between the PTZ camera 10 and the external apparatus 30 that inputs a captured image from the PTZ camera 10 and generates a clipping image, the probability of occurrence of a follow-up error of the notable subject or a clipping image generation error increases.

Embodiment 2 described below is an embodiment having a configuration for preventing such a situation from occurring.

A specific processing example of an embodiment of changing the imaging ratio according to the communication delay time between the camera and the external apparatus will be described with reference to FIG. 19.

Figure 19:
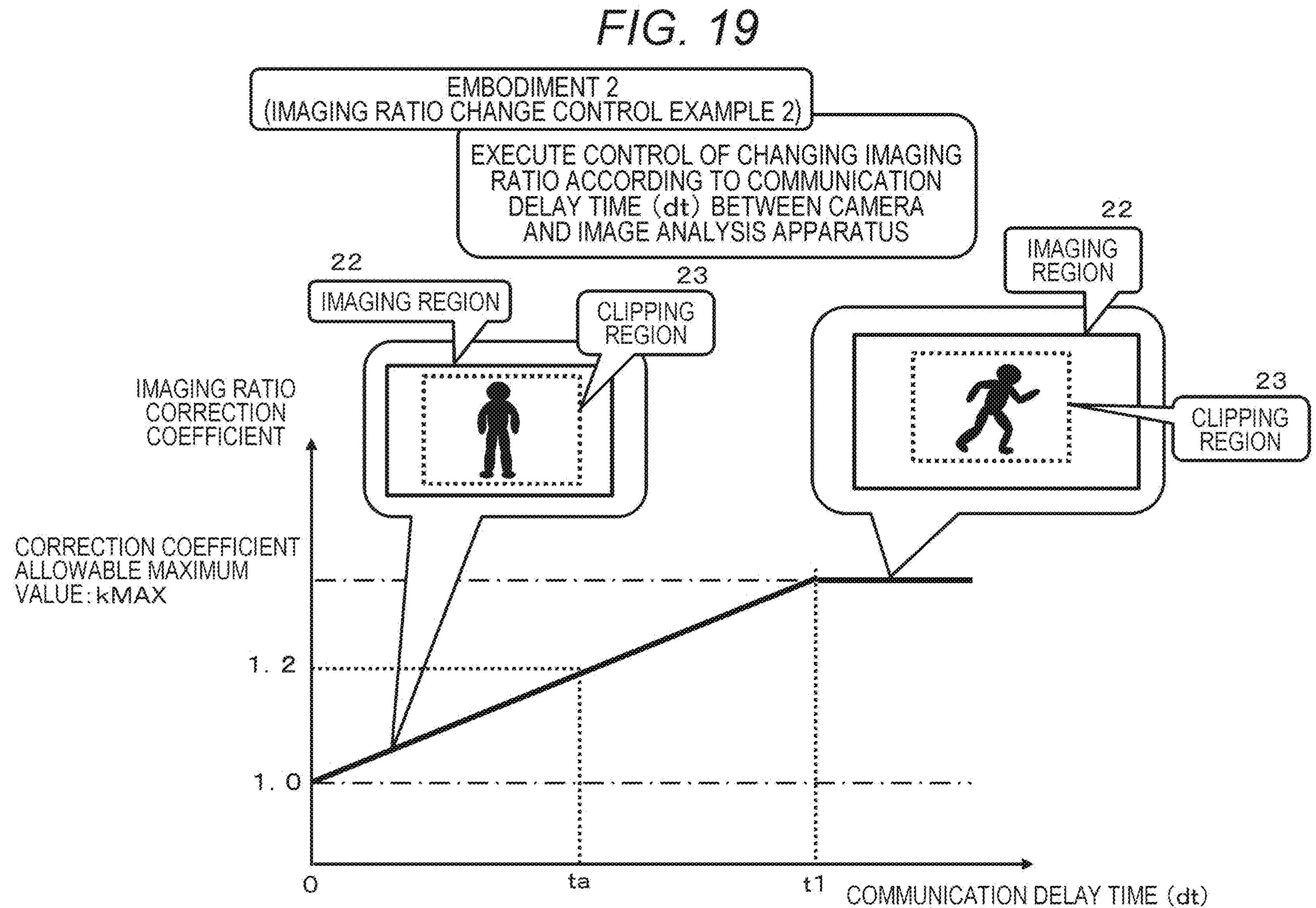
FIG. 19 is a diagram for explaining a specific processing example of an embodiment of changing an imaging ratio according to a communication delay time between a camera and an external apparatus.

The graph illustrated in FIG. 19 is a graph in which the communication delay time (dt) between the camera and the external apparatus is set on the horizontal axis and the imaging ratio correction coefficient is set on the vertical axis.

The communication delay time (dt) between the camera and the external apparatus on the horizontal axis is, for example, the number of seconds (sec) required for communication between the camera and the external apparatus. Note that the communication delay time may be acquired using the number of delayed frames and a frame rate (FPS).

The imaging ratio correction coefficient on the vertical axis is, for example, a correction coefficient serving as a multiplication value used to calculate the optimum imaging ratio by multiplying the "minimum allowable imaging ratio rMIN" described above with reference to FIGS. 11A, 11B, 11C, and 11D.

In a case where the communication delay time (dt) between the camera and the external apparatus is 0, the imaging ratio correction coefficient is 1.0, and the imaging ratio correction coefficient also increases as the communication delay time (dt) between the camera and the external apparatus increases.

However, the maximum value is the correction coefficient allowable maximum value kMAX.

The correction coefficient allowable maximum value kMAX is calculated by the following calculation formula.

Correction coefficient allowable maximum value *k*MAX=(allowable maximum imaging ratio *r*MAX)/(allowable minimum imaging ratio *r*MIN)

The image processing apparatus according to Embodiment 2 of the present disclosure changes the imaging ratio according to the graph illustrated in FIG. 19 as follows.

(a) When the communication delay time (dt) between the camera and the external apparatus=0 to t1, the imaging ratio correction coefficient is changed from 1.0 to the correction coefficient allowable maximum value kMAX according to the communication delay time.

(b) When the communication delay time (dt) between the camera and the external apparatus=t1~, the imaging ratio correction coefficient is set to the correction coefficient allowable maximum value kMAX.

Note that, when (a) the communication delay time (dt) between the camera and the external apparatus=0 to t1, the imaging ratio correction coefficient is set to be linearly changed from 1.0 to the correction coefficient allowable maximum value kMAX, but this is an example, and for example, the imaging ratio correction coefficient may be increased according to a rising curve drawing a predetermined curve, or the imaging ratio may be set to be changed so as to be exponentially increased with the increase in the communication delay time (dt).

In the present the present Embodiment 2, the external apparatus 30 applies the imaging ratio correction coefficient calculated from the graph illustrated in FIG. 19, and calculates the optimum imaging ratio (imaging ratio for clipping image generation) by the following calculation formula, that is, $$\text{optimum imaging ratio}=(\text{minimum allowable imaging ratio } r\text{MIN})\times(\text{imaging ratio correction coefficient}).$$

The value calculated according to the above formula is set as the optimum imaging ratio, and the PTZ camera 10 is caused to execute image capturing according to the imaging region size determined on the basis of the calculated optimum imaging ratio.

For example, the current communication delay time (dt) between the camera and the external apparatus is set as the current delay time (ta) illustrated in the graph of FIG. 19.

The imaging ratio correction coefficient=1.2 corresponding to the current communication delay time (dt) between the camera and the external apparatus=ta is calculated using the graph illustrated in FIG. 19.

Furthermore, the calculated imaging ratio correction coefficient=1.2 is applied, and the optimum imaging ratio is calculated according to the following formula.

$$\begin{aligned}\text{Optimum imaging ratio} &= (\text{minimum allowable imaging ratio } rMIN)\times \\ &\quad(\text{imaging ratio correction coefficient}) = \\ &\quad(\text{minimum allowable imaging ratio } rMIN)\times(1.2)\end{aligned}$$

That is, in a case where the communication delay time (dt) between the current camera and the external apparatus=ta, the optimum imaging ratio is an imaging ratio that is 1.2 times of (minimum allowable imaging ratio rMIN).

The external apparatus 30 causes the PTZ camera 10 to capture an image according to the imaging region size determined on the basis of the optimum imaging ratio calculated using the imaging ratio correction coefficient calculated from the graph illustrated in FIG. 19.

Specifically, the PTZ camera 10 is caused to execute image capturing processing with the setting of the height H of the imaging region 22 (=the entire image region of the captured image 20) to $$H=(1.2\,(rMIN))\times h.$$

Note that h is the height of the clipping region 23.

By causing the PTZ camera 10 to execute image capturing with such a setting, it is possible to more reliably clip the clipping region 23 including the notable subject 21 from the captured image 20 (imaging region 22) of the PTZ camera 10, and it is also possible to reduce deterioration in image quality of the clipping image.

As illustrated in FIG. 19, the image processing apparatus of the present Embodiment 2 changes the imaging ratio correction coefficient from 1.0 to the correction coefficient allowable maximum value kMAX when the communication delay time (dt) between the camera and the external apparatus=0 to t1.

As a result, the imaging ratio is set to sequentially increase from rMIN (allowable minimum imaging ratio) according to the delay time. As the delay time is shorter, the difference (ratio) of the size of the imaging region 22 to the size of the clipping region 23 is set to be smaller.

By this processing, the number of pixels of the clipping region 23 can be set to be larger, and deterioration in image quality of the clipping image can be reduced.

On the other hand, when (b) the communication delay time (dt) between the camera and the external apparatus=t1~, the imaging ratio correction coefficient is set to the correction coefficient allowable maximum value kMAX. As a result, the imaging ratio is set to rMAX (allowable maximum imaging ratio), and the difference (ratio) of the size of the imaging region 22 to the size of the clipping region 23 is set to be larger than that in a case where the communication delay time is smaller than the predetermined value (t1).

As a result, even in a case where the communication delay time is larger than the predetermined value, the possibility that the notable subject goes out of the capturing range can be reduced, and reliable follow-up processing of the notable subject can be performed.

Note that, as described above, similarly to Embodiments 1-1 to 1-3, rMIN (allowable minimum imaging ratio) and rMAX (allowable maximum imaging ratio) are predefined ratios.

For example, rMIN (allowable minimum imaging ratio) and rMAX (allowable maximum imaging ratio) may be predefined fixed values. Alternatively, as described above with reference to FIGS. 11A, 11B, 11C, 11D, and 12, it may be determined according to the state of the scene of the captured image, the setting of the clipping region, the allowable minimum number of pixels of the clipping region 23, or the like.

Next, referring to the flowchart illustrated in FIG. 20, (Embodiment 2) Embodiment of Changing Imaging Ratio According to Communication Delay Time Between Camera and External Apparatus a sequence of processing executed by the image processing apparatus (external apparatus 30) according to this Embodiment 2 will be described.

(Step S201)

First, in step S201, the image processing apparatus of the present disclosure calculates a communication delay time (dt) between the PTZ camera 10 and the external apparatus 30.

The image processing apparatus, that is, the external apparatus 30 illustrated in FIG. 2 calculates a communication delay time (dt) between the PTZ camera 10 and the external apparatus 30 at each timing when the captured image (moving image) is received from the PTZ camera 10.

The frame rate of the captured image (moving image) of the PTZ camera 10 is defined in advance, and the communication delay time (dt) between the PTZ camera 10 and the external apparatus 30 can be calculated by analyzing the reception timing of each image frame.

(Step S202)

Next, in step S202, the image processing apparatus of the present disclosure calculates an imaging ratio correction coefficient corresponding to the communication delay time (dt) between the PTZ camera 10 and the external apparatus 30 calculated in step S201 on the basis of the communication delay time-imaging ratio correction coefficient correspondence data.

This processing is the processing to which the graph described above with reference to FIG. 19 is applied.

As described with reference to FIG. 19, the communication delay time-imaging ratio correction coefficient correspondence data is a graph defining the imaging ratio correction coefficient as follows according to the communication delay time (dt) between the PTZ camera 10 and the external apparatus 30.

(a) When the communication delay time (dt) between the camera and the external apparatus=0 to t1, the imaging ratio correction coefficient is changed from 1.0 to the correction coefficient allowable maximum value kMAX according to the communication delay time.

(b) When the communication delay time (dt) between the camera and the external apparatus=t1~, the imaging ratio correction coefficient is set to the correction coefficient allowable maximum value kMAX.

An imaging ratio correction coefficient corresponding to the communication delay time (dt) between the PTZ camera 10 and the external apparatus 30 is calculated using the graph illustrated in FIG. 19.

For example, in the example illustrated in FIG. 19, in a case where the communication delay time (dt) between the PTZ camera 10 and the external apparatus 30=ta, the imaging ratio correction coefficient=1.2.

(Step S203)

Next, in step S203, the image processing apparatus calculates an optimum imaging ratio (an imaging ratio for clipping image generation) according to the communication delay time (dt) between the PTZ camera 10 and the external apparatus 30 using the imaging ratio correction coefficient calculated in step S202.

Specifically, the optimum imaging ratio (imaging ratio for clipping image generation) is calculated according to the following formula.

Optimum imaging ratio=(minimum allowable imaging ratio *r*MIN)×(imaging ratio correction coefficient)

(Step S204)

Next, in step S204, the image processing apparatus determines whether or not a difference (ratio) between the optimum imaging ratio calculated in step S203 and the current imaging ratio is less than a specified threshold value.

In a case where the difference (ratio) between the optimum imaging ratio calculated in step S203 and the current imaging ratio is less than the specified threshold value, the determination in step S204 is Yes, and it is determined in step S208 whether or not the capturing is ended. In a case where the capturing is not ended, the process proceeds to processing of the next processing frame without performing zoom control of the camera (PTZ camera 10).

This is processing for avoiding that, if the zoom control is performed until the difference (ratio) between the optimum imaging ratio calculated in step S203 and the current imaging ratio is small, detailed control is frequently executed for each image frame, and the captured image becomes unstable.

As described above, in a case where the difference (ratio) between the optimum imaging ratio calculated in step S203 and the current imaging ratio is smaller than the specified threshold value, the determination processing in step S204 is performed in order to continue stable image capturing without performing control.

On the other hand, in a case where the difference (ratio) between the optimum imaging ratio calculated in step S203 and the current imaging ratio is equal to or larger than the specified threshold value, the determination in step S204 is No, and the process proceeds to step S205.

Note that, as the specified threshold value, a value defined in advance in the image processing apparatus is used. For example, it is possible to perform processing of determining a difference (ratio) between the optimum imaging ratio calculated in step S203 and the current imaging ratio by using a value of about 5% of the current imaging ratio.

That is, processing of determining whether or not to perform zoom control is performed on the basis of whether or not a difference (ratio) between the optimum imaging ratio calculated in step S203 and the current imaging ratio is smaller than a specified threshold value (for example, 5%).

(Step S205)

In step S204, in a case where the difference (ratio) between the optimum imaging ratio calculated in step S203 and the current imaging ratio is equal to or larger than the specified threshold value, the process proceeds to step S205.

In this case, in step S205, the image processing apparatus determines whether the optimum imaging ratio calculated in step S203 is larger or smaller than the current imaging ratio.

In a case where the optimum imaging ratio is larger than the current imaging ratio, the process proceeds to step S206. On the other hand, in a case where the optimum imaging ratio is smaller than the current imaging ratio, the process proceeds to step S207.

(Step S206)

In a case where it is determined in step S205 that the optimum imaging ratio calculated in step S203 is larger than the current imaging ratio, the process proceeds to step S206, and the following processing is executed.

In this case, in step S206, the image processing apparatus executes processing of widening the angle of view by adjusting the zoom (angle of view) of the camera in order to increase the current imaging ratio to the optimum imaging ratio.

Specifically, for example, in the system configuration illustrated in FIG. 2, the external apparatus 30 outputs a camera drive instruction to the PTZ camera 10 to adjust the zoom (angle of view) of the camera to widen the angle of view in order to increase the current imaging ratio to the optimum imaging ratio.

This processing corresponds to, for example, the processing described above with reference to FIG. 8.

That is, the processing corresponds to processing of changing the zoom (angle of view) state before the imaging ratio change illustrated in FIG. 8 (*a*) to the zoom (angle of view) state after the imaging ratio change illustrated in FIG. 8 (*b*).

The captured image b and the capturing region 20*b* after the change in the imaging ratio in FIG. 8 (*b*) are images captured with a setting having a wider angle of view than the captured image a and the capturing region 20*a* before the change in the imaging ratio in FIG. 8 (*a*).

As described above, in a case where it is determined that the optimum imaging ratio calculated in step S203 is larger than the current imaging ratio, in step S206, the zoom control parameter of the PTZ camera 10 is adjusted to perform setting for widening the capturing range, that is, processing for widening the angle of view.

(Step S207)

On the other hand, in a case where it is determined in step S205 that the optimum imaging ratio calculated in step S203 is smaller than the current imaging ratio, the process proceeds to step S207, and the following processing is executed.

In this case, in step S207, the image processing apparatus executes processing of narrowing the angle of view by adjusting the zoom (angle of view) of the camera in order to reduce the current imaging ratio to the optimum imaging ratio.

Specifically, for example, in the system configuration illustrated in FIG. 2, the external apparatus 30 outputs a camera drive instruction to the PTZ camera 10 to narrow the angle of view by adjusting the zoom (angle of view) of the camera in order to reduce the current imaging ratio to the optimum imaging ratio.

This processing corresponds to, for example, the processing described above with reference to FIG. 9.

That is, the processing corresponds to processing of changing the zoom (angle of view) state before the imaging ratio change illustrated in FIG. 9 (*a*) to the zoom (angle of view) state after the imaging ratio change illustrated in FIG. 9 (*b*).

The captured image b and the capturing region 20*b* after the change in the imaging ratio in FIG. 9 (*b*) are images captured with a setting having a narrower angle of view than the captured image a and the capturing region 20*a* before the change in the imaging ratio in FIG. 9 (*a*).

As described above, in a case where it is determined that the optimum imaging ratio calculated in step S203 is smaller than the current imaging ratio, in step S207, the zoom control parameter of the PTZ camera 10 is adjusted to perform setting for narrowing the capturing range, that is, processing for narrowing the angle of view.

(Step S208)

After the processing of step S206 and step S207, the process proceeds to step S208, and in step S208, it is determined whether or not the capturing processing is ended.

In a case where the capturing processing is not finished, the process returns to step S201, and the processing for the next captured image frame is executed.

In a case where the capturing processing is ended, the process is ended.

By executing these processes, it is possible to increase the success probability of the process of clipping the clipping region including the notable subject from the captured image of the PTZ camera 10, and to reduce the degradation in image quality of the clipping image.

[6. (Embodiment 3) Embodiment of Changing Imaging Ratio According to Speed and Acceleration of Notable Subject and Communication Delay Time Between Camera and External Apparatus]

Next, as (Embodiment 3), an embodiment of changing the imaging ratio according to the speed and acceleration of the notable subject and the communication delay time between the camera and the external apparatus will be described.

The embodiment described below corresponds to an embodiment in which the following two embodiments described above, that is, (Embodiment 1-3) Embodiment of changing imaging ratio according to speed and acceleration of notable subject (Embodiment 2) Embodiment of changing imaging ratio according to communication delay time between camera and external apparatus these two embodiments are executed together.

Referring to the flowcharts illustrated in FIGS. 21 and 22, (Embodiment 3) Embodiment of changing imaging ratio according to speed and acceleration of notable subject and communication delay time between camera and external apparatus a sequence of processing executed by the image processing apparatus (external apparatus 30) according to this Embodiment 3 will be described.

(Step S301)

First, in step S301, the image processing apparatus of the present disclosure calculates the speed (v) and the acceleration (a) of the notable subject 21.

The image processing apparatus, that is, the external apparatus 30 illustrated in FIG. 2 receives the captured image (moving image) from the PTZ camera 10, and calculates the speed (v) and the acceleration ($\alpha$) of the notable subject by analyzing the position change of the notable subject 21 in each image frame constituting the moving image.

(Step S302)

Next, in step S302, the image processing apparatus of the present disclosure calculates a speed-corresponding optimum imaging ratio that is an optimum imaging ratio corresponding to the current speed (v) of the notable subject calculated in step S301, on the basis of the speed-imaging ratio correspondence data.

This processing is the processing described above with reference to FIG. 14 (Process A). The speed-imaging ratio correspondence data is a graph illustrated in FIG. 14 (Process A).

Using the graph illustrated in FIG. 14 (Process A), the imaging ratio corresponding to the current speed of the notable subject 21 is calculated as the speed-corresponding optimum imaging ratio. For example, in the example illustrated in FIG. 14 (Process A), the optimum imaging ratio corresponding to the current speed (vt) of the notable subject 21 is the speed-corresponding optimum imaging ratio (r1) illustrated in FIG. 14 (Process A).

(Step S303)

Next, in step S303, the image processing apparatus according to the present disclosure calculates an acceleration-corresponding optimum imaging ratio that is an optimum imaging ratio corresponding to the acceleration ($\alpha$) of the current notable subject calculated in step S301, on the basis of the acceleration-imaging ratio correspondence data.

This processing is the processing described above with reference to FIG. 14 (Process B). The acceleration-imaging ratio correspondence data is a graph illustrated in FIG. 14 (Process B).

Using the graph illustrated in FIG. 14 (Process B), the imaging ratio corresponding to the current acceleration of the notable subject 21 is calculated as the acceleration-corresponding optimum imaging ratio. For example, in the example illustrated in FIG. 14 (Process B), the optimum imaging ratio corresponding to the current acceleration ($\alpha$t) of the notable subject 21 is the acceleration-corresponding optimum imaging ratio (r2) illustrated in FIG. 14 (Process B).

(Steps S304 to S305)

Next, in step S304, the image processing apparatus compares the optimum imaging ratio (speed-corresponding optimum imaging ratio vx) corresponding to the speed (v) of the notable subject with the optimum imaging ratio (acceleration-corresponding optimum imaging ratio $\alpha$x) corresponding to the acceleration ($\alpha$) of the notable subject.

This processing corresponds to the processing of FIG. 14 (Process C) described above.

In a case where it is determined in step S305 that the speed-corresponding optimum imaging ratio vx of the notable subject is equal to or greater than the acceleration-corresponding optimum imaging ratio xx, the process proceeds to step S306.

On the other hand, in a case where it is determined that the speed-corresponding optimum imaging ratio vx of the notable subject is less than the acceleration-corresponding optimum imaging ratio ox, the process proceeds to step S307.

(Step S306)

In a case where it is determined in step S305 that the speed-corresponding optimum imaging ratio vx of the notable subject is equal to or greater than the acceleration-corresponding optimum imaging ratio xx, the process proceeds to step S306.

In this case, the image processing apparatus selects the speed-corresponding optimum imaging ratio vx of the notable subject, which is a larger value, as the subject motion-corresponding optimum imaging ratio.

(Step S307)

On the other hand, in a case where it is determined in step S305 that the speed-corresponding optimum imaging ratio vx of the notable subject is less than the acceleration-corresponding optimum imaging ratio xx, the process proceeds to step S307.

In this case, the image processing apparatus selects the acceleration-corresponding optimum imaging ratio ax of the notable subject, which is a larger value, as the subject motion-corresponding optimum imaging ratio.

(Step S311)

Next, in step S311, the image processing apparatus of the present disclosure calculates a communication delay time (dt) between the PTZ camera 10 and the external apparatus 30.

The image processing apparatus, that is, the external apparatus 30 illustrated in FIG. 2 calculates a communication delay time (dt) between the PTZ camera 10 and the external apparatus 30 at each timing when the captured image (moving image) is received from the PTZ camera 10.

The frame rate of the captured image (moving image) of the PTZ camera 10 is defined in advance, and the communication delay time (dt) between the PTZ camera 10 and the external apparatus 30 can be calculated by analyzing the reception timing of each image frame.

(Step S312)

Next, in step S312, the image processing apparatus of the present disclosure calculates an imaging ratio correction coefficient corresponding to the communication delay time (dt) between the PTZ camera 10 and the external apparatus 30 calculated in step S311 on the basis of the communication delay time-imaging ratio correction coefficient correspondence data.

This processing is the processing to which the graph described above with reference to FIG. 19 is applied.

As described with reference to FIG. 19, the communication delay time-imaging ratio correction coefficient correspondence data is a graph defining the imaging ratio correction coefficient as follows according to the communication delay time (dt) between the PTZ camera 10 and the external apparatus 30.

(a) When the communication delay time (dt) between the camera and the external apparatus=0 to t1, the imaging ratio correction coefficient is changed from 1.0 to the correction coefficient allowable maximum value kMAX according to the communication delay time.

(b) When the communication delay time (dt) between the camera and the external apparatus=t1~, the imaging ratio correction coefficient is set to the correction coefficient allowable maximum value kMAX.

An imaging ratio correction coefficient corresponding to the communication delay time (dt) between the PTZ camera 10 and the external apparatus 30 is calculated using the graph illustrated in FIG. 19.

For example, in the example illustrated in FIG. 19, in a case where the communication delay time (dt) between the PTZ camera 10 and the external apparatus 30=ta, the imaging ratio correction coefficient=1.2.

(Step S313)

Next, in step S313, the image processing apparatus calculates the optimum imaging ratio according to the subject motion and the communication delay time (dt) between the PTZ camera 10 and the external apparatus 30 by using the subject motion-corresponding optimum imaging ratio determined in step S306 or step S307 and the imaging ratio correction coefficient calculated in step S312.

Specifically, the optimum imaging ratio is calculated according to the following formula.

Optimum imaging ratio=(subject motion-corresponding optimum imaging ratio)×(imaging ratio correction coefficient)

(Step S314)

Next, in step S314, the image processing apparatus determines whether or not a difference (ratio) between the optimum imaging ratio calculated in step S313 and the current imaging ratio is less than a specified threshold value.

In a case where the difference (ratio) between the optimum imaging ratio calculated in step S313 and the current imaging ratio is less than the specified threshold value, the determination in step S314 is Yes, and it is determined in step S318 whether or not the capturing is ended. In a case where the capturing is not ended, the process proceeds to processing of the next processing frame without performing zoom control of the camera (PTZ camera 10).

This is processing for avoiding that, if the zoom control is performed until the difference (ratio) between the optimum imaging ratio calculated in step S313 and the current imaging ratio is small, detailed control is frequently executed for each image frame, and the captured image becomes unstable.

As described above, in a case where the difference (ratio) between the optimum imaging ratio calculated in step S313 and the current imaging ratio is smaller than the specified threshold value, the determination processing in step S314 is performed in order to continue stable image capturing without performing control.

On the other hand, in a case where the difference (ratio) between the optimum imaging ratio calculated in step S313 and the current imaging ratio is equal to or larger than the specified threshold value, the determination in step S314 is No, and the process proceeds to step S315.

Note that, as the specified threshold value, a value defined in advance in the image processing apparatus is used. For example, it is possible to perform processing of determining a difference (ratio) between the optimum imaging ratio calculated in step S313 and the current imaging ratio by using a value of about 5% of the current imaging ratio.

That is, processing of determining whether or not to perform zoom control is performed on the basis of whether or not a difference (ratio) between the optimum imaging ratio calculated in step S313 and the current imaging ratio is smaller than a specified threshold value (for example, 5%).

(Step S315)

In step S314, in a case where the difference (ratio) between the optimum imaging ratio calculated in step S313 and the current imaging ratio is equal to or larger than the specified threshold value, the process proceeds to step S315.

In this case, in step S315, the image processing apparatus determines whether the optimum imaging ratio calculated in step S313 is larger or smaller than the current imaging ratio.

In a case where the optimum imaging ratio is larger than the current imaging ratio, the process proceeds to step S316.

On the other hand, in a case where the optimum imaging ratio is smaller than the current imaging ratio, the process proceeds to step S317.

(Step S316)

In a case where it is determined in step S315 that the optimum imaging ratio calculated in step S313 is larger than the current imaging ratio, the process proceeds to step S316, and the following processing is executed.

In this case, in step S316, the image processing apparatus executes processing of widening the angle of view by adjusting the zoom (angle of view) of the camera in order to increase the current imaging ratio to the optimum imaging ratio.

Specifically, for example, in the system configuration illustrated in FIG. 2, the external apparatus 30 outputs a camera drive instruction to the PTZ camera 10 to adjust the zoom (angle of view) of the camera to widen the angle of view in order to increase the current imaging ratio to the optimum imaging ratio.

This processing corresponds to, for example, the processing described above with reference to FIG. 8.

That is, the processing corresponds to processing of changing the zoom (angle of view) state before the imaging ratio change illustrated in FIG. 8 (*a*) to the zoom (angle of view) state after the imaging ratio change illustrated in FIG. 8 (*b*).

The captured image b and the capturing region 20*b* after the change in the imaging ratio in FIG. 8 (*b*) are images captured with a setting having a wider angle of view than the captured image a and the capturing region 20*a* before the change in the imaging ratio in FIG. 8 (*a*).

As described above, in a case where it is determined that the optimum imaging ratio calculated in step S3133 is larger than the current imaging ratio, in step S316, the zoom control parameter of the PTZ camera 10 is adjusted to perform setting for widening the capturing range, that is, processing for widening the angle of view.

(Step S317)

On the other hand, in a case where it is determined in step S315 that the optimum imaging ratio calculated in step S313 is smaller than the current imaging ratio, the process proceeds to step S317, and the following processing is executed.

In this case, in step S317, the image processing apparatus executes processing of narrowing the angle of view by adjusting the zoom (angle of view) of the camera in order to reduce the current imaging ratio to the optimum imaging ratio.

Specifically, for example, in the system configuration illustrated in FIG. 2, the external apparatus 30 outputs a camera drive instruction to the PTZ camera 10 to narrow the angle of view by adjusting the zoom (angle of view) of the camera in order to reduce the current imaging ratio to the optimum imaging ratio.

This processing corresponds to, for example, the processing described above with reference to FIG. 9.

That is, the processing corresponds to processing of changing the zoom (angle of view) state before the imaging ratio change illustrated in FIG. 9 (*a*) to the zoom (angle of view) state after the imaging ratio change illustrated in FIG. 9 (*b*).

The captured image b and the capturing region 20*b* after the change in the imaging ratio in FIG. 9 (*b*) are images captured with a setting having a narrower angle of view than the captured image a and the capturing region 20*a* before the change in the imaging ratio in FIG. 9 (*a*).

As described above, in a case where it is determined that the optimum imaging ratio calculated in step S313 is smaller than the current imaging ratio, in step S317, the zoom of the PTZ camera 10 is adjusted to perform setting for narrowing the capturing range, that is, processing for narrowing the angle of view.

(Step S318)

After the processing of step S316 and step S317, the process proceeds to step S318, and in step S318, it is determined whether or not the capturing processing is ended.

In a case where the capturing processing is not finished, the process returns to step S311, and the processing for the next captured image frame is executed.

In a case where the capturing processing is ended, the process is ended.

By executing these processes, it is possible to increase the success probability of the process of clipping the clipping region including the notable subject from the captured image of the PTZ camera 10, and to reduce the degradation in image quality of the clipping image.

7. Configuration Example of Image Processing Apparatus of Present Disclosure

Next, a configuration example of the image processing apparatus of the present disclosure will be described.

Embodiments 1 to 3 described above, that is, (Embodiment 1) Embodiment of changing imaging ratio according to at least one of speed and acceleration of notable subject (Embodiment 2) Embodiment of changing imaging ratio according to communication delay time between camera and external apparatus (Embodiment 3) Embodiment of changing imaging ratio according to speed and acceleration of notable subject and communication delay time between camera and external apparatus the processing according to these embodiments can be executed mainly in the external apparatus 30 constituting the image processing system illustrated in FIG. 2, for example, or can be executed by the PTZ camera 10 alone without using the external apparatus 30.

A processing sequence in a case where the processing according to the above-described embodiment is executed by the PTZ camera 10 alone will be described with reference to FIG. 23.

FIG. 23 is a diagram for explaining a processing sequence in a case where the PTZ camera 100 performs all of image capturing, image clipping, distribution of the clipping image, and camera control processing.

The PTZ camera 100 illustrated in FIG. 23 corresponds to the PTZ camera 10 illustrated in FIG. 2 and other drawings.

As illustrated in FIG. 23, the PTZ camera 100 sequentially and repeatedly executes the following five processes.

Step S501=image capturing processing;

Step S502=image analysis processing;

Step S503=image clipping processing;

Step S504=camera control processing

Step S505=clipping image output processing

The PTZ camera 100 is a camera that captures a moving image (video), and repeatedly executes the processing in steps S501 to S505 for each frame or each plurality of frames captured by PTZ camera 100.

The image capturing processing in step S501 is capturing processing of an image (moving image) by the PTZ camera 100.

The image analysis processing in step S502 is image analysis processing on the captured image captured by the PTZ camera 100. For example, detection of a person to be clipped, detection processing of a face region, and the like are performed.

The processing of detecting the image region of the notable subject that is a candidate for clipping from the captured image can be executed by applying existing processing such as pattern matching, face detection processing, skeleton detection processing, and segmentation processing.

Note that a mode of the person detection processing includes processing of detecting a head or a face region, processing of detecting an upper body, processing of detecting an entire body, and the like. Which mode of the person detection processing is performed is determined according to, for example, a subject follow-up algorithm determined in advance.

The image clipping processing in step S503 is processing of clipping a partial image region of the captured image captured by the PTZ camera 100 on the basis of the result of the image analysis processing in step S502.

Note that, in the image clipping processing in step S503, for example, processing of clipping an image with a predetermined angle of view according to a prescribed algorithm is performed while detecting and following a specific person using AI analysis using at least one of a machine learning model such as the deep neural network or a rule-based model described above.

The camera control processing in step S504 is processing of calculating a camera control parameter, specifically, a zoom (angle of view) setting value and the like for setting a clipping region including the notable subject in the image clipping processing in step S503 and acquiring a high-quality clipping image. That is, the camera control parameter optimum for image capturing in the region of the clipping image is calculated, the calculated camera control parameter is set to the PTZ camera 100, and image capturing is executed.

The process described above with reference to the flowcharts in FIG. 15 and the like, that is, the following Embodiments 1 to 3, (Embodiment 1) Embodiment of changing imaging ratio according to at least one of speed and acceleration of notable subject (Embodiment 2) Embodiment of changing imaging ratio according to communication delay time between camera and external apparatus (Embodiment 3) Embodiment of changing imaging ratio according to speed and acceleration of notable subject and communication delay time between camera and external apparatus the processing according to these embodiments is executed as processing of the following steps illustrated in FIG. 23.

Step S502=image analysis processing;

Step S503=image clipping processing;

Step S504=camera control processing

The clipping image output processing in step S505 is processing of distributing the clipping image 25 including the notable subject clipped in the image clipping processing in step S503 to the outside or storing the clipping image in the storage unit.

For example, as illustrated in the drawing, the clipping image 25 is distributed (displayed) to the user terminal 80 such as a smartphone.

The processing in steps S501 to S505 is repeatedly executed in units of processed image frames captured by the PTZ camera 100.

The example illustrated in FIG. 23 is a configuration example in which the image processing of the present disclosure is executed in the PTZ camera 100.

In addition to such a configuration example, a configuration in which a part of the image processing of the present disclosure is executed in an external apparatus other than the PTZ camera 100 is also possible.

An example of such a configuration example will be described with reference to FIG. 24.

Figure 24:
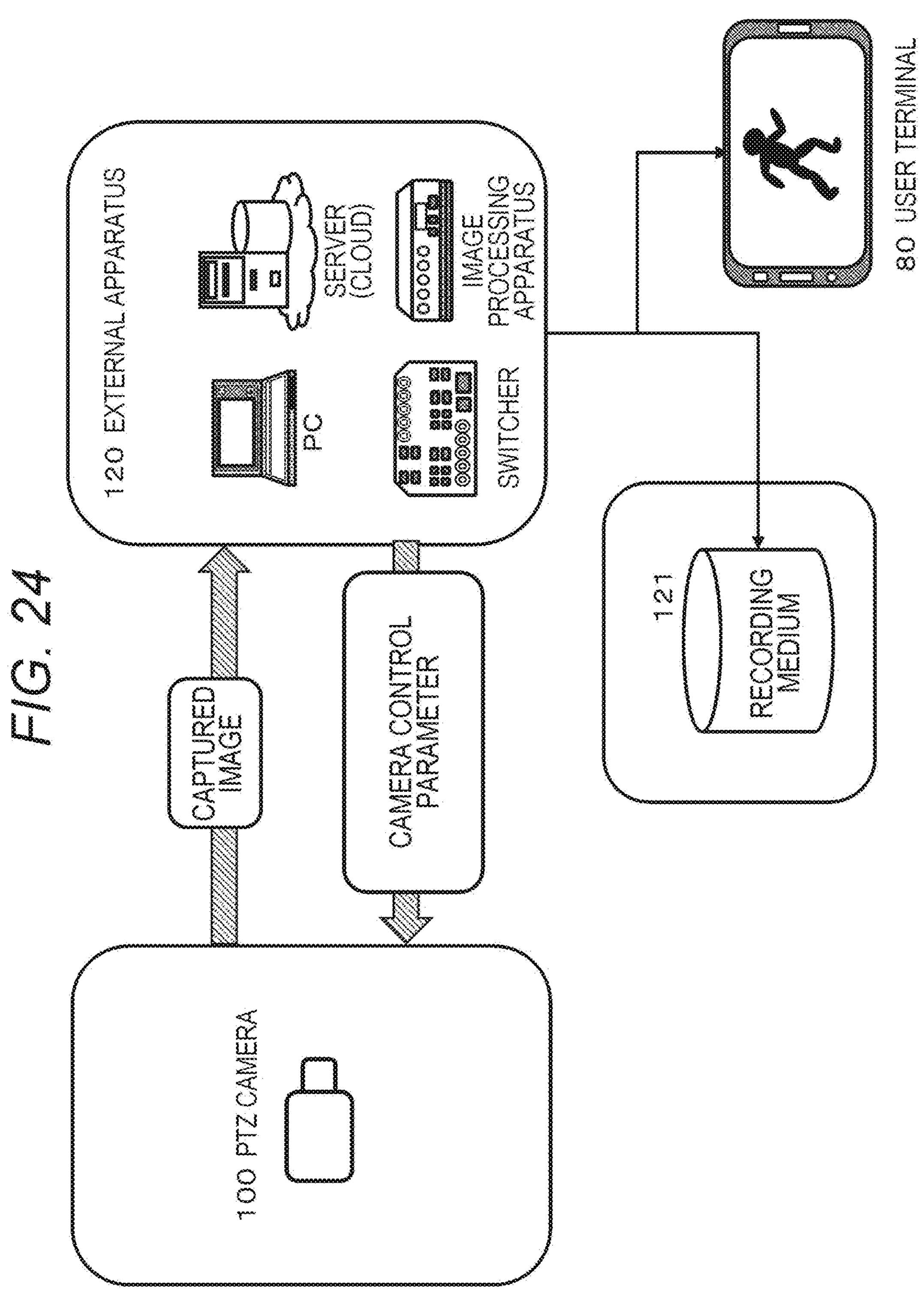
FIG. 24 is a diagram for explaining configuration examples of a camera and an external apparatus which are an example of the image processing apparatus of the present disclosure, and processing to be executed.

FIG. 24 illustrates the PTZ camera 100 and an external apparatus 120. The external apparatus 120 corresponds to the external apparatus 30 described above with reference to FIG. 2 and the like.

The PTZ camera 100 and the external apparatus 120 have a communicable configuration.

The external apparatus 120 includes at least one of an apparatus connected to the PTZ camera 100 in a wireless or wired manner, for example, a PC, a server (cloud), a switcher, other image processing apparatuses, and the like.

The PTZ camera 100 captures an image (moving image), and transmits captured image data to the external apparatus 120.

The external apparatus 120 executes image analysis processing, image clipping processing, camera control parameter calculation processing, clipping image output processing, and the like on the captured image received from the PTZ camera 100.

The external apparatus 120 calculates a camera control parameter generated by the above processing, that is, a control parameter such as a zoom control parameter optimum for generation of a clipping image, and transmits the control parameter to the PTZ camera 100. The PTZ camera 100 sets camera control parameters received from the external apparatus 120 and executes image capturing.

In the configuration illustrated in FIG. 24, the recording processing, the display processing, and the distribution processing of the clipping image are executed by the external apparatus 120.

The external apparatus 120 stores and records the clipping image generated by the external apparatus 120 in a recording medium 121.

Furthermore, the external apparatus 120 executes processing of distributing the generated clipping image to the user terminal 130 such as a smartphone or a television owned by the user.

FIG. 25 illustrates an example of a processing sequence using the PTZ camera 100 illustrated in FIG. 24 and the external apparatus 120.

As illustrated in FIG. 25, the PTZ camera 100 executes the following processing.

Step S521=image capturing processing

Step S522=captured image output processing

Step S528=camera control processing

Meanwhile, for example, the external apparatus 120 such as a PC, a server (cloud), a switcher, or another image processing apparatus executes the following processing.

Step S523=captured image input processing

Step S524=image analysis processing

Step S525=image clipping processing

Step S526=camera control parameter generation and transmission processing

Step S527=clipping image output processing

The PTZ camera 100 is a camera that captures a moving image (video), and the PTZ camera 100 and the external apparatus 120 repeatedly execute the processing in steps S521 to S527 for each frame captured by the PTZ camera 100 or for each of a plurality of frames.

The image capturing processing in step S521 is capturing processing of an image (moving image) by the PTZ camera 100.

In step S522, the PTZ camera 100 transmits the captured image to the external apparatus 120.

In step S523, the external apparatus 120 inputs a captured image from the PTZ camera 100.

Next, the image analysis processing in step S524 executed by the external apparatus 120 is image analysis processing on the captured image captured by the PTZ camera 100. For example, detection of a person to be clipped, detection processing of a face region, and the like are performed.

The processing of detecting the image region of the notable subject that is a candidate for clipping from the captured image can be executed by applying existing processing such as pattern matching, face detection processing, skeleton detection processing, and segmentation processing.

Note that a mode of the person detection processing includes processing of detecting a head or a face region, processing of detecting an upper body, processing of detecting an entire body, and the like. Which mode of the person detection processing is performed is determined according to, for example, a subject follow-up algorithm determined in advance.

The image clipping processing in step S525 is processing of clipping a partial image region of the captured image captured by the PTZ camera 100 on the basis of the result of the image analysis processing in step S524.

Note that, in the image clipping processing in step S525, for example, processing of clipping an image with a predetermined angle of view according to a prescribed algorithm is performed while detecting and following a specific person using AI analysis using at least one of a machine learning model such as the deep neural network or a rule-based model described above.

The camera control parameter calculation and transmission processing in step S526 is processing of calculating and transmitting a camera control parameter, specifically, a zoom (angle of view) setting value and the like for setting a clipping region including a notable subject in the image clipping processing in step S524 and acquiring a high-quality clipping image. That is, the camera control parameter optimum for image capturing in the region of the clipping image is calculated, and the calculated camera control parameter is transmitted to the PTZ camera 100.

In step S528, the PTZ camera 100 captures an image by applying the camera control parameter calculated by the external apparatus 120.

The process described above with reference to the flowcharts in FIG. 15 and the like, that is, the following Embodiments 1 to 3, (Embodiment 1) Embodiment of changing imaging ratio according to at least one of speed and acceleration of notable subject (Embodiment 2) Embodiment of changing imaging ratio according to communication delay time between camera and external apparatus (Embodiment 3) Embodiment of changing imaging ratio according to speed and acceleration of notable subject and communication delay time between camera and external apparatus the processing according to these embodiments is executed as processing of the following steps illustrated in FIG. 25.

Step S524=image analysis processing;

Step S525=image clipping processing;

Step S526=camera control parameter calculation and transmission processing

The clipping image output processing in step S527 is processing of distributing the clipping image 25 including the notable subject clipped in the image clipping processing in step S525 to the outside or storing the clipping image in the storage unit.

For example, as illustrated in the drawing, the clipping image 25 is distributed (displayed) to the user terminal 80 such as a smartphone.

The processing in steps S521 to S528 is repeatedly executed in units of processed image frames captured by the PTZ camera 100.

As described above with reference to FIGS. 23 to 25, the image processing of the present disclosure can be executed by the camera alone, or can be executed as collaboration processing between the camera and another external apparatus.

8. Detailed Configuration of Image Processing Apparatus of Present Disclosure Next, a detailed configuration of the image processing apparatus of the present disclosure will be described.

As described above, the image processing of the present disclosure can be executed by a camera alone, or can be executed as collaboration processing between a camera and another external apparatus.

First, a configuration example of an image processing apparatus, that is, the PTZ camera 100 in a case where the image processing of the present disclosure is executed by a camera alone will be described with reference to FIG. 26.

As illustrated in FIG. 26, the PTZ camera 100 which is an example of the image processing apparatus of the present disclosure includes an imaging unit 201, an image analysis unit 202, a clipping region calculation unit 203, a notable subject motion (speed or acceleration) analysis unit 204, an optimum imaging ratio calculation unit 205, a clipping execution unit 206, an output unit 207, a recording processing unit 208, a recording medium 209, an optimum imaging region determination unit 211, a camera control parameter calculation unit 212, and a camera control unit 213.

The imaging unit 201 executes image capturing processing.

Note that a notable subject such as a follow-up target is determined in advance, and a moving image for capturing a follow-up image of the notable subject is captured.

As described above, by performing AI analysis using at least one of a machine learning model such as a deep neural network or a rule-based model, it is possible to execute processing of detecting and following a specific person from a captured image with high accuracy.

By using such AI analysis, the PTZ camera is automatically controlled (control of pan, tilt, and zoom) to capture a follow-up video of the notable subject.

The image analysis unit 202 executes image analysis processing on the captured image captured by the imaging unit 201. For example, detection of a person to be clipped, detection processing of a face region, follow-up processing, and the like are performed.

The image analysis unit 202 executes person detection processing by applying processing such as pattern matching, face detection processing, skeleton detection processing, and segmentation processing.

The clipping region calculation unit 203 executes processing of calculating a position and a size of an image clipping region including a notable subject determined in advance, for example, a clipping rectangular captured image.

The clipping region calculation unit 203 calculates a clipping region including the notable subject from the image according to a predefined algorithm.

As described above with reference to FIG. 3, there are various types of clipping region setting algorithms. Specifically, for example, a clipping region setting algorithm including the whole body region of the notable subject, a clipping region setting algorithm including only the upper body region of the notable subject, a clipping region setting algorithm including only the face region of the notable subject, or the like is used.

The notable subject motion (speed or acceleration) analysis unit 204 calculates the motion of the notable subject, specifically, at least one of speed or acceleration.

The notable subject motion (speed or acceleration) analysis unit 204 calculates at least one of the speed (v) or the acceleration (α) of the notable subject by analyzing the position change of the notable subject in each image frame constituting the moving image captured by the imaging unit 201.

These calculated values are input to the optimum imaging ratio calculation unit 205.

The optimum imaging ratio calculation unit 205 inputs the clipping region information calculated by the clipping region calculation unit 203 and at least one of the speed (v) or the acceleration (α) of the notable subject analyzed by the notable subject motion (speed or acceleration) analysis unit 204, and calculates an optimum imaging ratio according to at least one of the speed (v) or the acceleration (α) of the notable subject, that is, an "imaging ratio for clipping image generation".

That is, processing according to any one of the following embodiments described above, (Embodiment 1-1) Embodiment of changing imaging ratio according to speed of notable subject (Embodiment 1-2) Embodiment of changing imaging ratio according to acceleration of notable subject (Embodiment 1-3) Embodiment of changing imaging ratio according to speed and acceleration of notable subject is executed to calculate the optimum imaging ratio according to at least one of the speed (v) or the acceleration (α) of the notable subject.

The optimum imaging ratio corresponding to at least one of the speed (v) or the acceleration (α) of the notable subject calculated by the optimum imaging ratio calculation unit 205 is output to the optimum imaging region determination unit 211 together with the clipping region information calculated by the clipping region calculation unit 203.

The optimum imaging region determination unit 211 applies the clipping region information calculated by the clipping region calculation unit 203 and the optimum imaging ratio calculated by the optimum imaging ratio calculation unit 205 to determine the size of the imaging region of the image captured by the imaging unit 201.

Specifically, the height H of the imaging region 22 (=the entire image region of the captured image 20) is calculated according to the following calculation formula, that is, $$H=(\text{optimum imaging ratio})\times h.$$

Note that h is the height of the clipping region 23.

Note that the aspect ratio of the imaging region is defined in advance, and if the height H of the imaging region is calculated, the width L of the imaging region can also be calculated.

The size of the imaging region calculated by the optimum imaging region determination unit 211, for example, height×width (H×L) of the imaging region is input to the camera control parameter calculation unit 212.

The camera control parameter calculation unit 212 calculates a zoom control parameter necessary for capturing an image with an angle of view of the size of the imaging region (height×width (H×L) of the imaging region) calculated by the optimum imaging region determination unit 211.

The zoom control parameter calculated by the camera control parameter calculation unit 212 is output to the camera control unit 213.

The camera control unit 213 sets the zoom control parameter calculated by the camera control parameter calculation unit 212 in the PTZ camera, and causes the PTZ camera 100 to execute image capturing to which the zoom control parameter is applied.

Through these processes, it is possible to more reliably set the clipping region of the notable subject from the image captured by the PTZ camera 100, and it is also possible to reduce deterioration in image quality of the clipping image.

The clipping execution unit 206 executes image clipping processing from the captured image on the basis of the image clipping region calculated by the clipping region calculation unit 203.

As described above, the clipping region calculation unit 203 calculates the clipping region including the notable subject according to a predefined algorithm as described above with reference to FIG. 3. The clipping execution unit 206 executes image clipping processing according to a clipping region determined according to the predefined algorithm.

The output unit 207 outputs the clipping image clipped by the clipping execution unit 206 to at least one of various user terminals such as an external apparatus, a smartphone, and a television.

The recording processing unit 208 records the clipping image clipped by the clipping execution unit 206 on the recording medium 209.

Next, configurations and processing of the PTZ camera 100 and the external apparatus 120 in a case where the PTZ camera 100 and the external apparatus 120 jointly execute the image processing of the present disclosure will be described with reference to FIG. 27.

FIG. 27 is a diagram illustrating a configuration example of the PTZ camera 100 and the external apparatus 120.

Note that the external apparatus 120 includes, for example, at least one of a PC, a server (cloud), a switcher, a broadcasting device, another image processing apparatus, and the like.

Furthermore, the PTZ camera 100 and the external apparatus 120 are connected to each other in at least one of a wired manner and a wireless manner, and can communicate with each other.

The PTZ camera 100 illustrated in FIG. 27 includes an imaging unit 221, an output unit 222, a recording processing unit 223, a recording medium 224, and a camera control unit 225.

Furthermore, the external apparatus 120 includes an input unit 301, an image analysis unit 302, a clipping region calculation unit 303, a notable subject motion (speed or acceleration) analysis unit 304, an optimum imaging ratio calculation unit 305, a clipping execution unit 306, an output unit 307, a recording processing unit 308, a recording medium 309, an optimum imaging region determination unit 311, and a camera control parameter calculation unit 312.

The imaging unit 221 of the PTZ camera 100 executes image capturing processing.

Note that a notable subject such as a follow-up target is determined in advance, and a moving image for capturing a follow-up image of the notable subject is captured.

As described above, by performing AI analysis using at least one of a machine learning model such as a deep neural network or a rule-based model, it is possible to execute processing of detecting and following a specific person from a captured image with high accuracy.

By using such AI analysis, the PTZ camera is automatically controlled (control of pan, tilt, and zoom) to capture a follow-up video of the notable subject.

The image captured by the imaging unit 221 is output to the external apparatus 120 via the output unit 222 and recorded on the recording medium 224 via the recording processing unit 223.

The camera control unit 225 applies the camera control parameter input from the camera control parameter calculation unit 312 of the external apparatus 120 to cause the imaging unit 221 to capture an image.

With this processing, the PTZ camera 100 can execute image capturing to which the camera control parameter optimum for the clipping image determined by the external apparatus 120, specifically, the zoom setting parameter or the like is applied.

The input unit 301 of the external apparatus 120 inputs an image captured by the imaging unit 221 of the PTZ camera 100 from the output unit 222 of the PTZ camera 100 and outputs the image to the image analysis unit 302.

The processing of the image analysis unit 302 to the camera control parameter calculation unit 312 of the external apparatus 120 is similar to the processing of the image analysis unit 202 to the camera control parameter calculation unit 212 of the PTZ camera 100 described above with reference to FIG. 26.

In the configuration illustrated in FIG. 27, the external apparatus 120 executes image analysis processing, that is, detection of a person to be clipped and the like, and also executes image clipping processing.

Furthermore, the optimum imaging ratio calculation unit 305 of the external apparatus 120 executes optimum imaging ratio calculation processing.

That is, processing according to any one of the following embodiments described above, (Embodiment 1-1) Embodiment of changing imaging ratio according to speed of notable subject (Embodiment 1-2) Embodiment of changing imaging ratio according to acceleration of notable subject (Embodiment 1-3) Embodiment of changing imaging ratio according to speed and acceleration of notable subject is executed to calculate the optimum imaging ratio according to at least one of the speed (v) or the acceleration (α) of the notable subject.

The optimum imaging ratio corresponding to at least one of the speed (v) or the acceleration (α) of the notable subject calculated by the optimum imaging ratio calculation unit 305 is output to the optimum imaging region determination unit 311 together with the clipping region information calculated by the clipping region calculation unit 303 of the external apparatus 120.

The optimum imaging region determination unit 311 applies the clipping region information calculated by the clipping region calculation unit 303 and the optimum imaging ratio calculated by the optimum imaging ratio calculation unit 305 to decide the size of the imaging region of the image captured by the PTZ camera 100.

Specifically, the height H of the imaging region 22 (=the entire image region of the captured image 20) is calculated according to the following calculation formula, that is, $$H=(\text{optimum imaging ratio})\times h.$$

Note that h is the height of the clipping region 23.

The size of the imaging region calculated by the optimum imaging region determination unit 311, for example, height×width (H×L) of the imaging region is input to the camera control parameter calculation unit 312.

The camera control parameter calculation unit 312 calculates a zoom control parameter necessary for capturing an image with an angle of view of the size of the imaging region (height×width (H×L) of the imaging region) calculated by the optimum imaging region determination unit 211.

The zoom control parameter calculated by the camera control parameter calculation unit 312 is output to the camera control unit 225 of the PTZ camera 100.

The camera control unit 225 of the PTZ camera 100 sets the zoom control parameter calculated by the camera control parameter calculation unit 312 of the external apparatus 120 in the PTZ camera, and causes the PTZ camera 100 to execute image capturing to which the zoom control parameter is applied.

Through these processes, it is possible to more reliably set the clipping region of the notable subject from the image captured by the PTZ camera 100, and it is also possible to reduce deterioration in image quality of the clipping image.

FIG. 28 is a diagram illustrating a configuration example of the PTZ camera 100 and the external apparatus 120 that can execute Embodiment 2 and Embodiment 3 described above, that is, (Embodiment 2) Embodiment of changing imaging ratio according to communication delay time between camera and external apparatus (Embodiment 3) Embodiment of changing imaging ratio according to speed and acceleration of notable subject and communication delay time between camera and external apparatus.

The PTZ camera 100 illustrated in FIG. 28 has the same configuration as the PTZ camera 100 illustrated in FIG. 27. The external apparatus 120 illustrated in FIG. 28 has a configuration in which a communication delay time calculation unit 313 is added to the external apparatus 120 illustrated in FIG. 27.

Other configurations are similar to those illustrated in FIG. 27.

As described above with reference to FIG. 5, when a communication delay occurs between the PTZ camera 100 and the external apparatus 120 that inputs a captured image from the PTZ camera 100 and generates a clipping image, the probability of occurrence of a follow-up error of the notable subject or a clipping image generation error increases.

The external apparatus 120 illustrated in FIG. 28 has a configuration for preventing such a situation from occurring, and is capable of changing the imaging ratio according to the communication delay time between the PTZ camera 100 and the external apparatus 120.

The communication delay time calculation unit 313 of the external apparatus 120 calculates a communication delay time between the PTZ camera 100 and the external apparatus 120.

The frame rate of the captured image (moving image) of the PTZ camera 100 is defined in advance, and the communication delay time calculation unit 313 of the external apparatus 120 analyzes, for example, the reception timing of the image frame received by the input unit 301 from the PTZ camera 100 to calculate the communication delay time between the PTZ camera 100 and the external apparatus 120.

Information indicating the communication delay time between the PTZ camera 100 and the external apparatus 120 calculated by the communication delay time calculation unit 313 is output to the optimum imaging ratio calculation unit 305.

The optimum imaging ratio calculation unit 305 calculates the imaging ratio correction coefficient described above with reference to FIG. 19, and further executes processing according to any one of the following embodiments to calculate the optimum imaging ratio.

Figure 20:
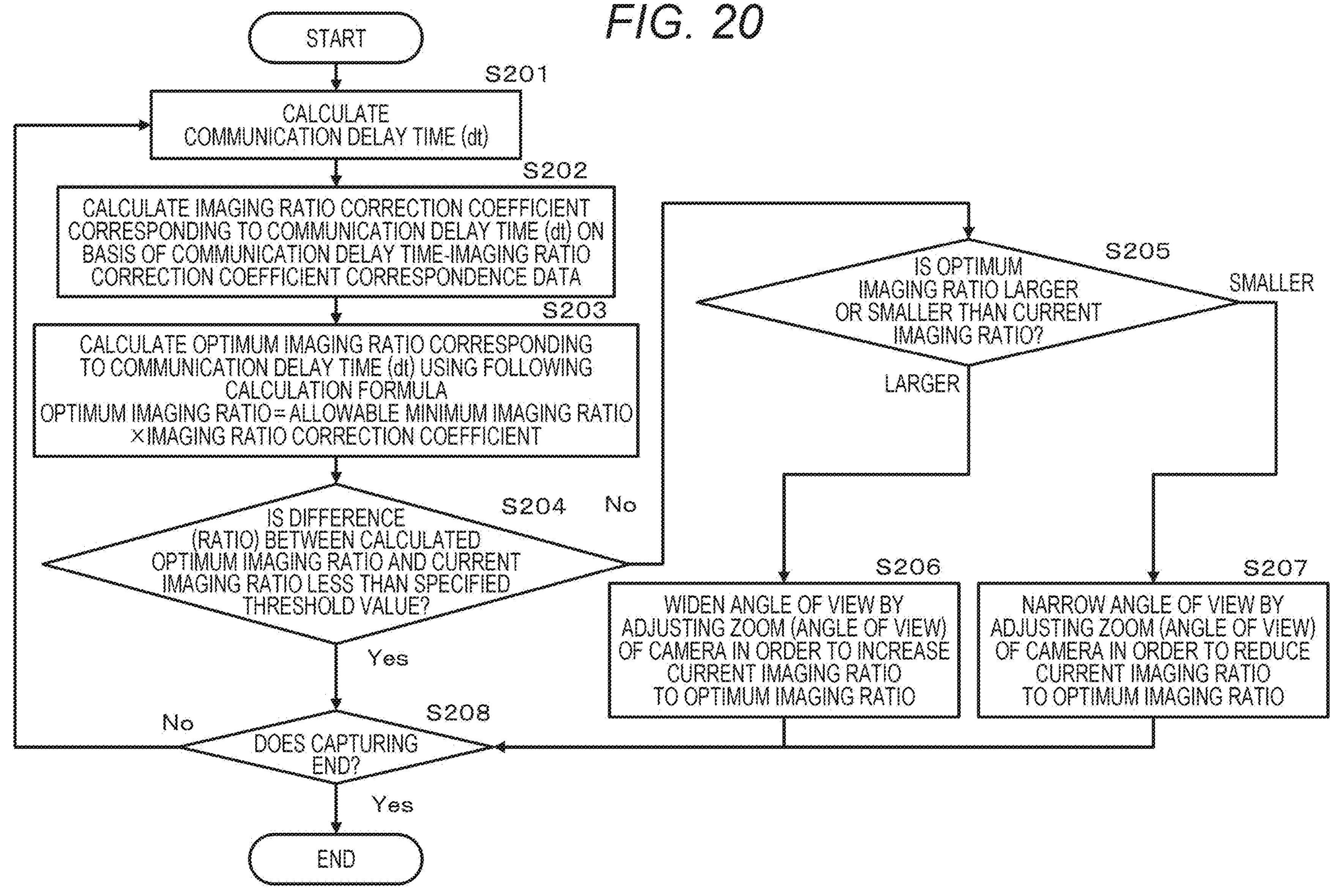
FIG. 20 is a diagram illustrating a flowchart for explaining a processing sequence of an embodiment of changing the imaging ratio according to the communication delay time between the camera and the external apparatus.

(Embodiment 2) Embodiment of changing imaging ratio according to communication delay time between camera and external apparatus (Embodiment 3) Embodiment of changing imaging ratio according to speed and acceleration of notable subject and communication delay time between camera and external apparatus For example, in a case where the processing according to the above (Embodiment 2) is executed, the processing according to the flowchart illustrated in FIG. 20 is executed to calculate the optimum imaging ratio.

Furthermore, in a case where the processing according to the above (Embodiment 3) is executed, the processing according to the flowcharts illustrated in FIGS. 21 and 22 is executed to calculate the optimum imaging ratio.

The optimum imaging ratio calculated by the optimum imaging ratio calculation unit 305 is output to the optimum imaging region determination unit 311 together with the clipping region information calculated by the clipping region calculation unit 303.

The subsequent processing is similar to the processing described with reference to FIG. 27.

By applying the configuration illustrated in FIG. 28, the processing according to (Embodiment 2) or (Embodiment 3) described above can be performed.

That is, as described in (Embodiment 2), it is possible to calculate the optimum imaging ratio according to the communication delay time between the PTZ camera 100 and the external apparatus 120 and capture an image at the calculated optimum imaging ratio.

Furthermore, as described in (Embodiment 3), it is possible to calculate the optimum imaging ratio according to the speed and acceleration of the notable subject and the communication delay time between the camera and the external apparatus, and capture an image at the calculated optimum imaging ratio.

9. Hardware Configuration Example of Image Processing Apparatus

Next, a hardware configuration example of the image processing apparatus that executes the processing according to the above-described embodiments will be described with reference to FIG. 29.

Figure 29:
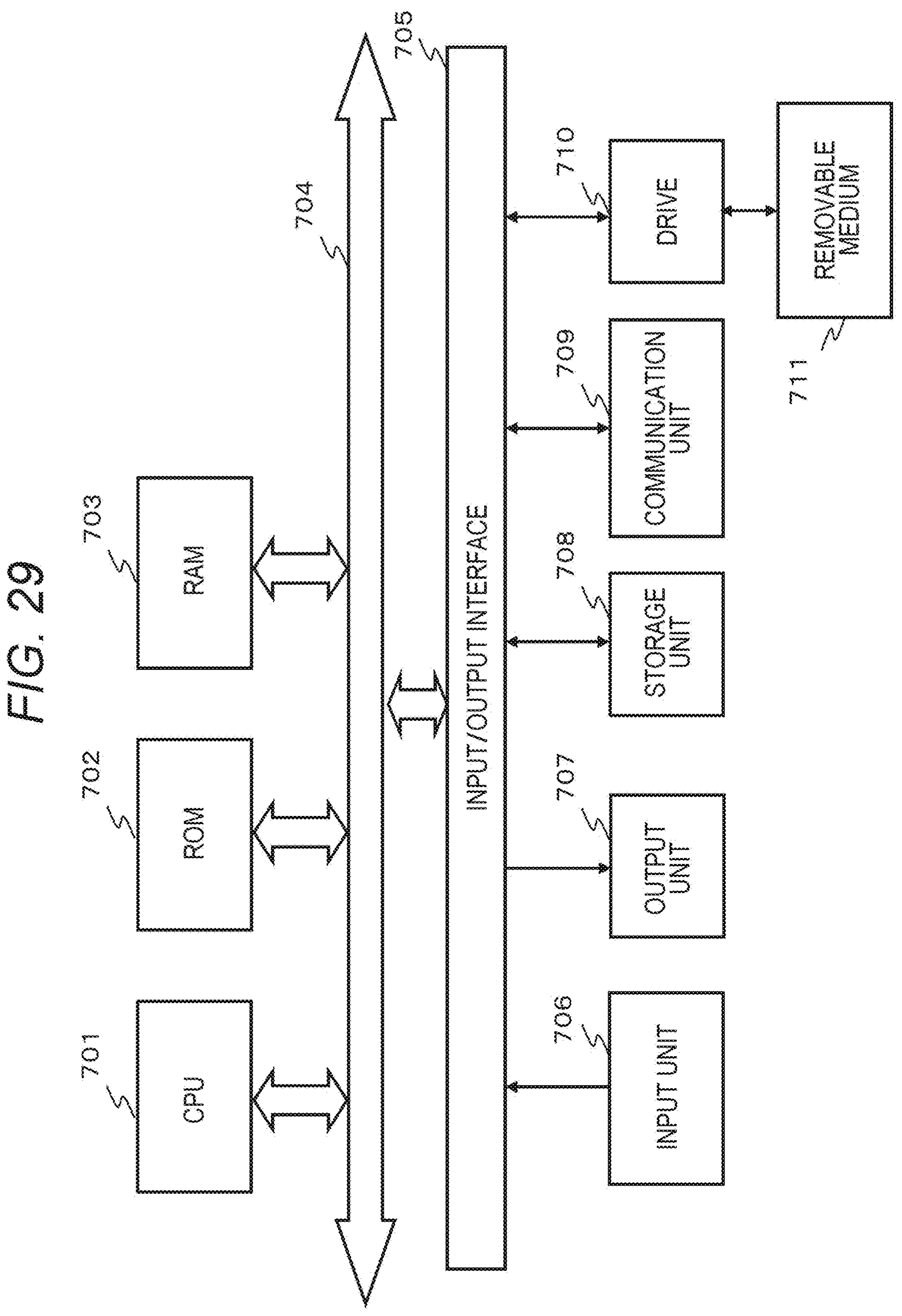
FIG. 29 is a diagram for explaining a hardware configuration example of the image processing apparatus of the present disclosure.

The hardware illustrated in FIG. 29 is an example of a hardware configuration of the camera and the external apparatus described above with reference to FIGS. 20 to 23, for example.

The hardware configuration illustrated in FIG. 29 will be described.

A central processing unit (CPU) 701 functions as a data processing unit that executes various processes according to a program stored in a read only memory (ROM) 702 or a storage unit 708. For example, processing according to the sequence described in the above-described embodiments is executed. A random access memory (RAM) 703 stores programs executed by the CPU701, data, and the like. The CPU701, the ROM702, and the RAM703 are mutually connected by a bus 704.

The CPU701 is connected to an input/output interface 705 via the bus 704, and an input unit 706 including various sensors, a camera, a switch, a keyboard, a mouse, a microphone, and the like, and an output unit 707 including a display, a speaker, and the like are connected to the input/output interface 705.

The storage unit 708 connected to the input/output interface 705 includes, for example, a hard disk and the like, and stores programs executed by the CPU701 and various data. The communication unit 709 functions as a transmission/reception unit for data communication via a network such as the Internet or a local area network, and communicates with an external apparatus.

A drive 710 connected to the input/output interface 705 drives a removable medium 711 such as a magnetic disk, an optical disk, a magneto-optical disk, or a semiconductor memory such as a memory card, and records or reads data.

10. Summary of Configuration of Present Disclosure

As described above, the embodiments of the present disclosure have been described in detail with reference to particular embodiments. However, it is obvious that those skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be considered.

Note that the technology disclosed herein may have the following configurations.

(1) An image processing apparatus including:

a clipping region calculation unit that calculates an image region including a notable subject from a captured image of a camera as an image clipping region;

a clipping execution unit that clips an image of the image clipping region calculated by the clipping region calculation unit and generate a clipping image;

an imaging ratio calculation unit that calculate an imaging ratio for clipping image generation that is a size ratio between a size of the clipping image and a size of an imaging region corresponding to an entire image region of the captured image of the camera, as an index value for executing clipping image generation processing including the notable subject; and a camera control parameter calculation unit that calculates a camera control parameter for causing the camera to capture an image according to an imaging region size determined on the basis of the imaging ratio for clipping image generation calculated, in which the camera is caused to perform image capturing to which the camera control parameter calculated by the camera control parameter calculation unit is applied.

(2) The image processing apparatus according to (1), in which the camera is a PTZ camera capable of pan, tilt, and zoom processing, and the camera control parameter calculation unit is configured to calculate a zoom control parameter for capturing an image according to the imaging region size of the camera calculated from the imaging ratio for clipping image generation.

(3) The image processing apparatus according to (1) or (2), in which the image processing apparatus includes a notable subject motion analysis unit that analyzes motion of the notable subject, and the imaging ratio calculation unit is configured to:

input an analysis result of the notable subject motion analysis unit; and calculate the imaging ratio for clipping image generation according to at least one of a speed or an acceleration of the notable subject.

(4) The image processing apparatus according to (3), in which the imaging ratio calculation unit is configured to calculate the imaging ratio for clipping image generation as a larger value as the speed of the notable subject increases, and the camera control parameter calculation unit is configured to calculate a zoom control parameter that increases the imaging region of the camera as the speed of the notable subject increases.

(5) The image processing apparatus according to (3) or (4), in which the imaging ratio calculation unit is configured to calculate the imaging ratio for clipping image generation as a larger value as the acceleration of the notable subject is larger, and the camera control parameter calculation unit is configured to calculate a zoom control parameter that increases the imaging region of the camera as the acceleration of the notable subject increases.

(6) The image processing apparatus according to any one of (3) to (5), in which the imaging ratio calculation unit is configured to calculate the imaging ratio for clipping image generation according to at least one of the speed or the acceleration of the notable subject as a value between an allowable minimum imaging ratio and an allowable maximum imaging ratio predefined.

(7) The image processing apparatus according to (6), in which the allowable maximum imaging ratio is an imaging ratio determined according to an allowable minimum number of pixels included in the clipping image.

(8) The image processing apparatus according to any one of (3) to (7), in which the imaging ratio calculation unit is configured to calculate the imaging ratio for clipping image generation using correspondence data between a notable subject speed and the imaging ratio for clipping image generation.

(9) The image processing apparatus according to any one of (3) to (8), in which the imaging ratio calculation unit is configured to calculate the imaging ratio for clipping image generation using correspondence data between a notable subject acceleration and the imaging ratio for clipping image generation.

(10) The image processing apparatus according to any one of (3) to (9), in which the imaging ratio calculation unit is configured to:

compare a speed-corresponding imaging ratio calculated from the speed of the notable subject, and an acceleration-corresponding imaging ratio calculated from the acceleration of the notable subject; and determine an imaging ratio having a larger value as a final imaging ratio for clipping image generation.

(11) The image processing apparatus according to any one of (1) to (10), in which the image processing apparatus is an external apparatus capable of communicating with the camera, the image processing apparatus includes a communication delay time calculation unit that calculates a communication delay time between the camera and the image processing apparatus, and the imaging ratio calculation unit is configured to calculate the imaging ratio for clipping image generation according to the communication delay time between the camera and the image processing apparatus calculated by the communication delay time calculation unit.

(12) The image processing apparatus according to (11), in which the imaging ratio calculation unit is configured to calculate the imaging ratio for clipping image generation as a larger value as the communication delay time between the camera and the image processing apparatus increases, and the camera control parameter calculation unit is configured to calculate a zoom control parameter that increases the imaging region of the camera as the communication delay time between the camera and the image processing apparatus increases.

(13) The image processing apparatus according to (11) or (12), in which the imaging ratio calculation unit is configured to calculate the imaging ratio for clipping image generation according to the communication delay time between the camera and the image processing apparatus as a value between an allowable minimum imaging ratio and an allowable maximum imaging ratio predefined.

(14) The image processing apparatus according to any one of (11) to (13), in which the imaging ratio calculation unit is configured to calculate the imaging ratio for clipping image generation using correspondence data between the communication delay time between the camera and the image processing apparatus and an imaging ratio correction coefficient.

(15) The image processing apparatus according to (14), in which the imaging ratio correction coefficient is a multiplication coefficient for calculating the imaging ratio for clipping image generation by multiplying an allowable minimum imaging ratio predefined.

(16) The image processing apparatus according to (14) or (15), in which the imaging ratio correction coefficient is a multiplication coefficient for calculating a final imaging ratio for clipping image generation by multiplying a subject motion-corresponding imaging ratio calculated according to motion of the notable subject by the imaging ratio correction coefficient.

(17) The image processing apparatus according to any one of (1) to (16), in which the image processing apparatus is an external apparatus capable of communicating with the camera, the image processing apparatus includes:

a notable subject motion analysis unit that analyzes motion of the notable subject; and a communication delay time calculation unit that calculates a communication delay time between the camera and the image processing apparatus, and the imaging ratio calculation unit is configured to:

input an analysis result of the notable subject motion analysis unit, and the communication delay time between the camera and the image processing apparatus calculated by the communication delay time calculation unit; and calculate the imaging ratio for clipping image generation according to a speed and an acceleration of the notable subject and the communication delay time between the camera and the image processing apparatus.

(18) An image processing method executed in an image processing apparatus, the method including:

a clipping region calculation step of calculating, by a clipping region calculation unit, an image region including a notable subject from a captured image of a camera as an image clipping region;

a clipping execution step of, by a clipping execution unit, clipping an image of the image clipping region calculated in the clipping region calculation step and generating a clipping image;

an imaging ratio calculation step of calculating, by an imaging ratio calculation unit, an imaging ratio for clipping image generation that is a size ratio between a size of the clipping image and a size of an imaging region corresponding to an entire image region of the captured image of the camera, as an index value for executing clipping image generation processing including the notable subject; and a camera control parameter calculation step of calculating, by a camera control parameter calculation unit, a camera control parameter for causing the camera to capture an image according to an imaging region size determined on the basis of the calculated imaging ratio for clipping image generation, in which the camera is caused to perform image capturing to which the camera control parameter calculated by the camera control parameter calculation unit is applied.

(19) A program for causing an image processing apparatus to execute image processing, the program causing the image processing apparatus to execute:

a clipping region calculation step of causing a clipping region calculation unit to calculate an image region including a notable subject from a captured image of a camera as an image clipping region;

a clipping execution step of causing a clipping execution unit to clip an image of the image clipping region calculated in the clipping region calculation step and generate a clipping image;

a clipping image generation imaging ratio calculation step of causing an imaging ratio calculation unit to calculate an imaging ratio for clipping image generation that is a size ratio between a size of the clipping image and a size of an imaging region corresponding to an entire image region of the captured image of the camera, as an index value for executing clipping image generation processing including the notable subject; and a camera control parameter calculation step of causing a camera control parameter calculation unit to calculate a camera control parameter for causing the camera to capture an image according to an imaging region size determined on the basis of the calculated imaging ratio for clipping image generation, in which the camera is caused to perform image capturing to which the camera control parameter calculated by the camera control parameter calculation unit is applied.

Furthermore, a series of processes described herein can be executed by hardware, software, or a configuration obtained by combining hardware and software. In a case of processing by software is executed, a program in which a processing sequence is recorded can be installed and performed in a memory in a computer incorporated in dedicated hardware, or the program can be installed and performed in a general-purpose computer capable of executing various types of processing. For example, the program can be recorded in advance in a recording medium. In addition to being installed in a computer from the recording medium, a program can be received via a network such as a local area network (LAN) or the Internet and installed in a recording medium such as an internal hard disk or the like.

Note that the various processes described herein may be executed not only in a chronological order in accordance with the description, but may also be executed in parallel or individually depending on processing capability of an apparatus that executes the processing or depending on the necessity. Furthermore, a system herein described is a logical set configuration of a plurality of apparatuses, and is not limited to a system in which apparatuses of respective configurations are in the same housing.

INDUSTRIAL APPLICABILITY

As described above, according to a configuration of an embodiment of the present disclosure, an apparatus and a method for calculating an optimum imaging ratio (an imaging ratio for clipping image generation) which is an index value for more reliably executing clipping image generation processing including a notable subject from a captured image of a PTZ camera are realized.

Specifically, for example, in the configuration in which the image clipping region including the notable subject is calculated from the captured image of the PTZ camera, and the image of the calculated region is clipped to generate the clipping image, the optimum imaging ratio (imaging ratio for clipping image generation) that is the size ratio of the imaging region of the camera to the clipping image is calculated as the index value for more reliably executing the clipping image generation processing including the notable subject. Furthermore, a zoom parameter for capturing an image according to the imaging region size of the camera calculated from the optimum imaging ratio is calculated, and the PTZ camera is caused to execute image capturing to which the calculated parameter is applied.

With this configuration, an apparatus and a method for calculating an optimum imaging ratio (an imaging ratio for clipping image generation), which is an index value for more reliably executing processing of generating a clipping image including the notable subject from the captured image of the PTZ camera, are realized.

REFERENCE SIGNS LIST

10 PTZ camera
20 Captured image
21 Notable subject
22 Imaging region
23 Clipping region
30 External apparatus
100 PTZ camera
201 Imaging unit
202 Image analysis unit
203 Clipping region calculation unit
204 Notable subject motion (speed or acceleration) analysis unit
205 Optimum imaging ratio calculation unit
206 Clipping execution unit
207 Output unit
208 Recording processing unit
209 Recording medium
211 Optimum imaging region determination unit
212 Camera control parameter calculation unit
213 Camera control unit
221 Imaging unit
222 Output unit
223 Recording processing unit
224 Recording medium
225 Camera control unit
301 Input unit
302 Image analysis unit
303 Clipping region calculation unit
304 Notable subject motion (speed or acceleration) analysis unit
305 Optimum imaging ratio calculation unit
306 Clipping execution unit
307 Output unit
308 Recording processing unit
309 Recording medium
311 Optimum imaging region determination unit
312 Camera control parameter calculation unit
313 Communication delay time calculation unit
701 CPU
702 ROM
703 RAM
704 Bus
705 Input/output interface
706 Input unit
707 Output unit
708 Storage unit
709 Communication unit
710 Drive
711 Removable medium

The invention claimed is:

1. An image processing apparatus, comprising:
a central processing unit (CPU) configured to:
calculate, as an image clipping region, an image region including a notable subject from a captured first image of a camera;
execute a clipping operation on a second image, wherein the second image corresponds to an image of the image clipping region;
generate a clipping image based on the execution of the clipping operation;
calculate an imaging ratio for the generation of the clipping image, wherein
the imaging ratio is a size ratio between a size of the clipping image and a size of an imaging region corresponding to an entire image region of the captured first image of the camera,
the imaging ratio is calculated as an index value to execute the generation of the clipping image, and
the clipping image includes the notable subject;
analyse a motion of the notable subject; and
calculate a camera control parameter to:
control the camera to capture a third image, wherein the third image is captured based on the size of the imaging region, and
the camera is controlled based on application of the calculated camera control parameter; and
change the imaging region of the camera based on the analysed motion of the notable subject.

2. The image processing apparatus according to claim 1, wherein
the camera is a PTZ camera capable of pan, tilt, and zoom processing operation, and
the CPU is further configured to calculate a zoom control parameter to capture a fourth image, wherein the fourth image is captured based on the size of the imaging region.

3. The image processing apparatus according to claim 1, wherein
the CPU is further configured to:
input an analysis result of the analysis of the motion of the notable subject; and
calculate the imaging ratio for the generation of the clipping image, wherein the imaging ratio is calculated based on at least one of a speed or an acceleration of the notable subject.

4. The image processing apparatus according to claim 3, wherein the CPU is further configured to:
calculate the imaging ratio for the generation of the clipping image as a specific value as the speed of the notable subject increases, wherein the specific value is larger than the index value; and
calculate a zoom control parameter that increases the imaging region of the camera as the speed of the notable subject increases.

5. The image processing apparatus according to claim 3, wherein the CPU is further configured to;
calculate the imaging ratio for the generation of the clipping image as a specific value as the acceleration of the notable subject increases, wherein the specific value is larger than the index value; and
calculate a zoom control parameter that increases the imaging region of the camera as the acceleration of the notable subject increases.

6. The image processing apparatus according to claim 3, wherein the CPU is further configured to calculate, based on the at least one of the speed or the acceleration of the notable subject, the imaging ratio for the generation of the clipping image as a specific value between an allowable minimum imaging ratio and an allowable maximum imaging ratio.

7. The image processing apparatus according to claim 6, wherein the CPU is further configured to determine the allowable maximum imaging ratio, and the allowable maximum imaging ratio is determined based on an allowable minimum number of pixels included in the clipping image.

8. The image processing apparatus according to claim 3, wherein the CPU is further configured to calculate the imaging ratio for the generation of the clipping image, and the imaging ratio is calculated based on correspondence data between the speed of the notable subject and the imaging ratio for the generation of the clipping image.

9. The image processing apparatus according to claim 3, wherein the CPU is further configured to calculate the imaging ratio for the generation of the clipping image, and the imaging ratio is calculated based on correspondence data between the acceleration of the notable subject and the imaging ratio for the generation of the clipping image.

10. The image processing apparatus according to claim 3, wherein the CPU is further configured to:

calculate a speed-corresponding imaging ratio from the speed of the notable subject;

calculate an acceleration-corresponding imaging ratio from the acceleration of the notable subject;

compare the calculated speed-corresponding imaging ratio and the calculated acceleration-corresponding imaging ratio; and determine, based on the comparison, the imaging ratio having a specific value as a final imaging ratio for the generation of the clipping image, wherein the specific value is larger than the index value.

11. The image processing apparatus according to claim 1, wherein the image processing apparatus is an external apparatus configured to communicate with the camera, and the CPU is further configured to:

calculate a communication delay time between the camera and the image processing apparatus; and calculate the imaging ratio for the generation of the clipping image, wherein the imaging ratio is calculated based on the calculated communication delay time between the camera and the image processing apparatus.

12. The image processing apparatus according to claim 11, wherein the CPU is further configured to:

calculate the imaging ratio for the generation of the clipping image as a specific value as the communication delay time between the camera and the image processing apparatus increases, wherein the specific value is larger than the index value; and calculate a zoom control parameter that increases the imaging region of the camera as the communication delay time between the camera and the image processing apparatus increases.

13. The image processing apparatus according to claim 11, wherein the CPU is further configured to calculate, based on the communication delay time between the camera and the image processing apparatus, the imaging ratio for the generation of the clipping image as a specific value between an allowable minimum imaging ratio and an allowable maximum imaging ratio.

14. The image processing apparatus according to claim 11, wherein the CPU is further configured to calculate the imaging ratio for the generation of the clipping image, and the imaging ratio is calculated based on correspondence data between the communication delay time of the camera and the image processing apparatus, and an imaging ratio correction coefficient.

15. The image processing apparatus according to claim 14, wherein the imaging ratio correction coefficient is a multiplication coefficient to calculate the imaging ratio for the generation of the clipping image, wherein the imaging ratio is calculated based on multiplication of the imaging ratio correction coefficient with an allowable minimum imaging ratio.

16. The image processing apparatus according to claim 14, wherein the imaging ratio correction coefficient is a multiplication coefficient to calculate a final imaging ratio for the generation of the clipping image, and the final imaging ratio is calculated based on multiplication of the imaging ratio correction coefficient with a subject motion-corresponding imaging ratio that is calculated based on the motion of the notable subject.

17. The image processing apparatus according to claim 1, wherein the image processing apparatus is an external apparatus capable to communicate with the camera, the image processing apparatus includes the CPU that is further configured to:

calculate a communication delay time between the camera and the image processing apparatus;

input an analysis result of the analysis of the motion of the notable subject, and the calculated communication delay time between the camera and the image processing apparatus; and calculate the imaging ratio for the generation of the clipping image, wherein the imaging ratio is calculated based on a speed and an acceleration of the notable subject and the communication delay time between the camera and the image processing apparatus.

18. An image processing method executed in an image processing apparatus, the image processing method comprising:

calculating, as an image clipping region, an image region including a notable subject from a captured first image of a camera;

clipping a second image which corresponds to an image of the image clipping region;

generating a clipping image based on the clipping;

calculating an imaging ratio for the generation of the clipping image, wherein the imaging ratio is a size ratio between a size of the clipping image and a size of an imaging region corresponding to an entire image region of the captured first image of the camera, the imaging ratio is calculated as an index value for executing the generation of the clipping image, and the clipping image includes the notable subject;

analysing a motion of the notable subject; and calculating a camera control parameter to:

control the camera to capture a third image, wherein the third image is captured based on the size of the imaging region, and the camera is controlled based on application of the calculated camera control parameter; and change the imaging region of the camera based on the analysed motion of the notable subject.

19. A non-transitory computer-readable medium having stored thereon, computer-executable instructions which, when executed by a computer, cause the computer to execute operations, the operations comprising:

calculating, as an image clipping region, an image region including a notable subject from a captured first image of a camera;

clipping a second image which corresponds to an image of the image clipping region;

generating a clipping image based on the clipping;

calculating an imaging ratio for the generation of the clipping image, wherein the imaging ratio is a size ratio between a size of the clipping image and a size of an imaging region corresponding to an entire image region of the captured first image of the camera, the imaging ratio is calculated as an index value for executing the generation of the clipping image, and the clipping image includes the notable subject;

analysing motion of the notable subject; and calculating a camera control parameter to:

control the camera to capture a third image, wherein the third image is captured based on the size of the imaging region, and the camera is controlled based on application of calculated camera control parameter; and changing the imaging region of the camera based on the analysed motion of the notable subject.

* * * * *